(12) United States Patent
Oge et al.

(10) Patent No.: US 11,032,208 B2
(45) Date of Patent: Jun. 8, 2021

(54) INFORMATION PROCESSING APPARATUS, INFORMATION PROCESSING METHOD, AND COMPUTER PROGRAM PRODUCT

(71) Applicant: KABUSHIKI KAISHA TOSHIBA, Minato-ku (JP)

(72) Inventors: Yasin Oge, Sagamihara (JP); Yuta Kobayashi, Ota (JP); Takahiro Yamaura, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 94 days.

(21) Appl. No.: 16/551,791

(22) Filed: Aug. 27, 2019

(65) Prior Publication Data
US 2020/0296050 A1    Sep. 17, 2020

(30) Foreign Application Priority Data

Mar. 14, 2019   (JP) .............................. JP2019-047699

(51) Int. Cl.
*H04L 12/875*   (2013.01)
*H04L 29/08*    (2006.01)

(52) U.S. Cl.
CPC ............ *H04L 47/56* (2013.01); *H04L 47/562* (2013.01); *H04L 47/566* (2013.01); *H04L 67/2847* (2013.01)

(58) Field of Classification Search
CPC ....... H04L 49/90; H04L 47/50; H04L 47/562; H04L 47/566
See application file for complete search history.

(56) References Cited

U.S. PATENT DOCUMENTS 6,661,774 B1 * 12/2003 Lauffenburger .... H04L 12/5601
370/230.1
6,813,249 B1 * 11/2004 Lauffenburger ........ H04L 47/28
370/253

(Continued)

FOREIGN PATENT DOCUMENTS

EP    3 487 133 A1    5/2019
JP    2002-124985 A   4/2002

(Continued)

OTHER PUBLICATIONS

Extended European Search Report dated Feb. 24, 2020 in corresponding European Patent Application No. 19194057.6, 11 pages.

*Primary Examiner* — Raj Jain
(74) *Attorney, Agent, or Firm* — Oblon, McClelland, Maier & Neustadt, L.L.P.

(57) ABSTRACT

According to an embodiment, an information processing apparatus includes one or more processors. The processors prefetch a scheduling entry corresponding a future time period in advance from scheduling information including one or more scheduling entries, each entry of which contains a transmission state and an interval for each of one or more transmission queues. The processors determine a starting time of transmission for one or more frames waiting for transmission in each queue, based on the scheduling entry. At least one of timing of the prefetching process and timing of the scheduling process is determined based on a result of comparison of a time difference and one or more thresholds. The time difference is a difference between current time and future time where the future time is a candidate for starting time of transmission.

14 Claims, 99 Drawing Sheets

(56) References Cited

U.S. PATENT DOCUMENTS

| | | | |
|---|---|---|---|
| 10,218,628 B2 | 2/2019 | Bush | |
| 2004/0019745 A1* | 1/2004 | Espeseth | G06F 3/0613 |
| | | | 711/137 |
| 2005/0232155 A1 | 10/2005 | Morikawa et al. | |
| 2017/0118631 A1* | 4/2017 | Zou | H04L 49/901 |
| 2018/0302331 A1 | 10/2018 | Bush | |
| 2018/0309655 A1 | 10/2018 | Joseph et al. | |
| 2019/0081903 A1 | 3/2019 | Kobayashi et al. | |
| 2019/0158620 A1 | 5/2019 | Oge et al. | |
| 2019/0230186 A1* | 7/2019 | Yellin | H04L 67/2847 |
| 2019/0297025 A1 | 9/2019 | Kobayashi et al. | |
| 2020/0296050 A1* | 9/2020 | Oge | H04L 49/3027 |

FOREIGN PATENT DOCUMENTS

| | | |
|---|---|---|
| JP | 2005-260780 A | 9/2005 |
| JP | 2006-245882 A | 9/2006 |
| JP | 2011-24027 A | 2/2011 |
| JP | 2019-54350 A | 4/2019 |
| JP | 2019-96930 A | 6/2019 |
| JP | 2019-165380 A | 9/2019 |

* cited by examiner

FIG.3

| | 38A |
|---|---|
| FUTURE TIME | 12:00:00.000000000 ON OCTOBER 16, 2017 |

| TRANSMISSION QUEUE | AVAILABLE TIME FOR TRANSMISSION |
|---|---|
| AVAILABLE TIME FOR TRANSMISSION OF TRANSMISSION QUEUE 7 | 0.000002500 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |

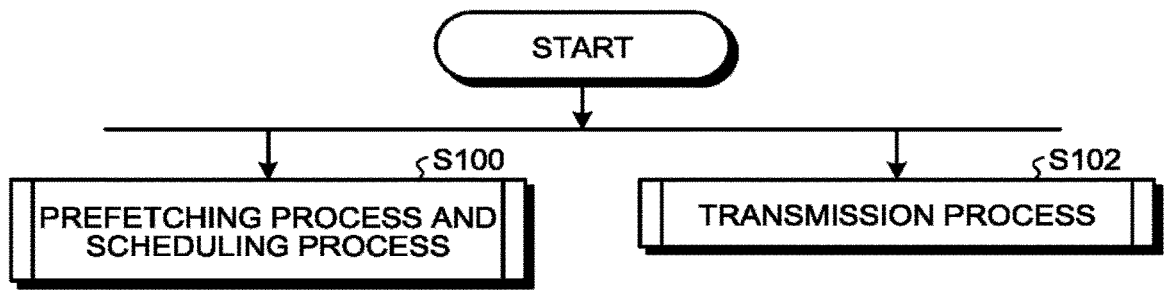

FIG.23

[STATE IMMEDIATELY AFTER INITIALIZATION]

| CURRENT TIME, FUTURE TIME, AVAILABLE TIME FOR TRANSMISSION, AND REQUIRED TRANSMISSION TIME | VALUE | SCHEDULED FRAME | STARTING TIME FOR TRANSMISSION | STATE |
|---|---|---|---|---|
| CURRENT TIME | 11:59:59.000000000 ON OCTOBER 16, 2017 | N/A | N/A | N/A |
| FUTURE TIME | 12:00:00.000000000 ON OCTOBER 16, 2017 | | | |
| TIME DIFFERENCE BETWEEN CURRENT TIME AND FUTURE TIME | 1.000000000 SECOND | | | |
| AVAILABLE TIME FOR TRANSMISSION OF TRANSMISSION QUEUE 7 | 0.000002500 SECOND | | | |
| AVAILABLE TIME FOR TRANSMISSION OF TRANSMISSION QUEUE 6 | 0.000000000 SECOND | | | |
| AVAILABLE TIME FOR TRANSMISSION OF TRANSMISSION QUEUE 5 | 0.000000000 SECOND | | | |
| AVAILABLE TIME FOR TRANSMISSION OF TRANSMISSION QUEUE 4 | 0.000000000 SECOND | | | |
| AVAILABLE TIME FOR TRANSMISSION OF TRANSMISSION QUEUE 3 | 0.000000000 SECOND | | | |
| AVAILABLE TIME FOR TRANSMISSION OF TRANSMISSION QUEUE 2 | 0.000000000 SECOND | | | |
| AVAILABLE TIME FOR TRANSMISSION OF TRANSMISSION QUEUE 1 | 0.000000000 SECOND | | | |
| AVAILABLE TIME FOR TRANSMISSION OF TRANSMISSION QUEUE 0 | 0.000000000 SECOND | | | |
| REQUIRED TRANSMISSION TIME OF FRAME TRANSMITTED NEXT FROM TRANSMISSION QUEUE 7 | N/A | | | |
| REQUIRED TRANSMISSION TIME OF FRAME TRANSMITTED NEXT FROM TRANSMISSION QUEUE 6 | N/A | | | |
| REQUIRED TRANSMISSION TIME OF FRAME TRANSMITTED NEXT FROM TRANSMISSION QUEUE 5 | N/A | | | |
| REQUIRED TRANSMISSION TIME OF FRAME TRANSMITTED NEXT FROM TRANSMISSION QUEUE 4 | N/A | | | |
| REQUIRED TRANSMISSION TIME OF FRAME TRANSMITTED NEXT FROM TRANSMISSION QUEUE 3 | N/A | | | |
| REQUIRED TRANSMISSION TIME OF FRAME TRANSMITTED NEXT FROM TRANSMISSION QUEUE 2 | N/A | | | |
| REQUIRED TRANSMISSION TIME OF FRAME TRANSMITTED NEXT FROM TRANSMISSION QUEUE 1 | N/A | | | |
| REQUIRED TRANSMISSION TIME OF FRAME TRANSMITTED NEXT FROM TRANSMISSION QUEUE 0 | N/A | | | |

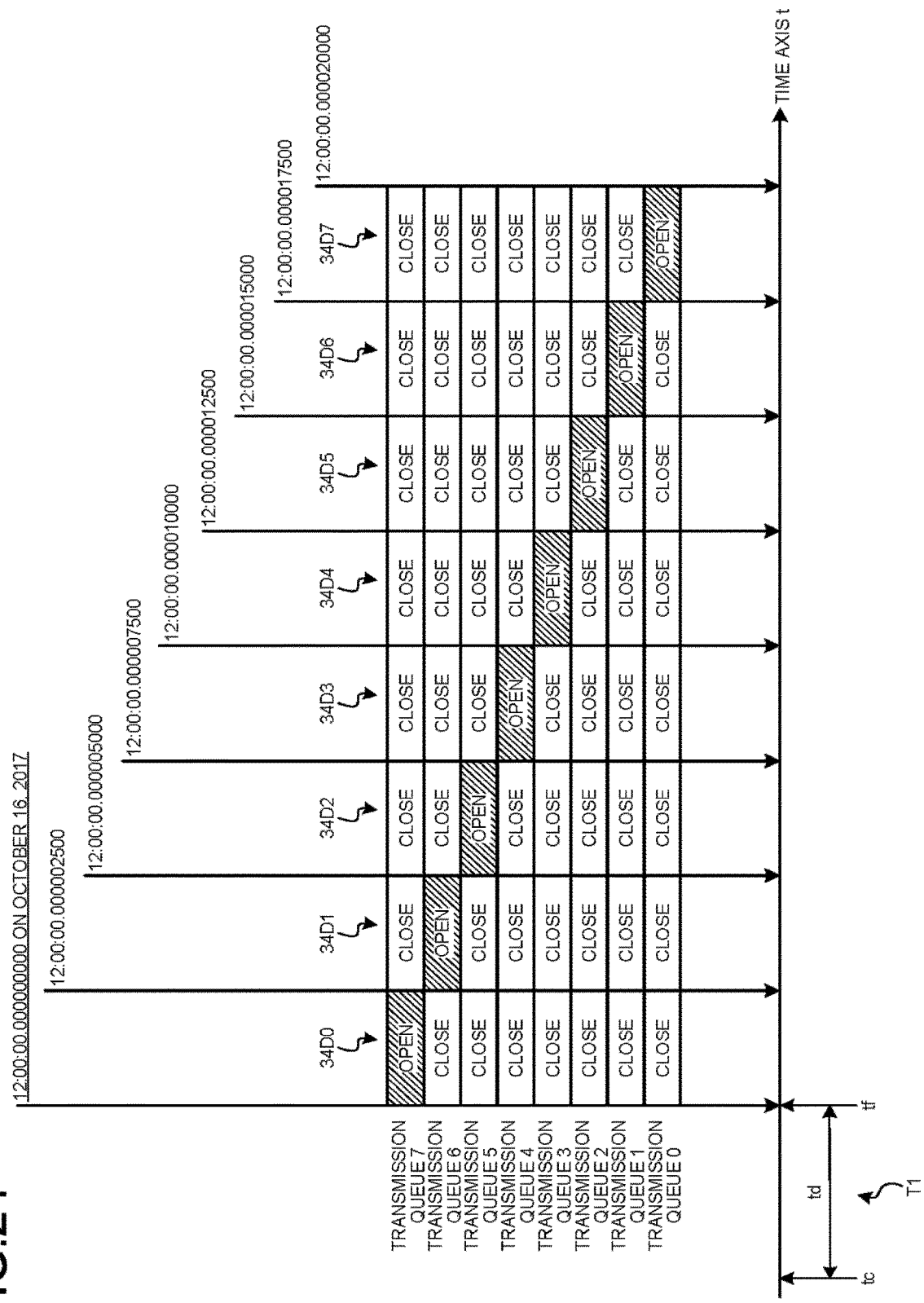

FIG.25

EXAMPLE OF CASE WHERE FRAME f0 WITH REQUIRED TRANSMISSION TIME OF 1,000 NANOSECONDS IS WRITTEN TO TRANSMISSION QUEUE 7
[STATE AT THE TIME 0.001 SECOND AFTER INITIALIZATION]

| CURRENT TIME, FUTURE TIME, AVAILABLE TIME FOR TRANSMISSION, AND REQUIRED TRANSMISSION TIME | VALUE | SCHEDULED FRAME | STARTING TIME FOR TRANSMISSION | STATE |
|---|---|---|---|---|
| CURRENT TIME | 11:59:59.0010000000 ON OCTOBER 16, 2017 | N/A | N/A | N/A |
| FUTURE TIME | 12:00:00.0000000000 ON OCTOBER 16, 2017 | | | |
| TIME DIFFERENCE BETWEEN CURRENT TIME AND FUTURE TIME | 0.999000000 SECOND | | | |
| AVAILABLE TIME FOR TRANSMISSION OF TRANSMISSION QUEUE 7 | 0.000002500 SECOND | | | |
| AVAILABLE TIME FOR TRANSMISSION OF TRANSMISSION QUEUE 6 | 0.000000000 SECOND | | | |
| AVAILABLE TIME FOR TRANSMISSION OF TRANSMISSION QUEUE 5 | 0.000000000 SECOND | | | |
| AVAILABLE TIME FOR TRANSMISSION OF TRANSMISSION QUEUE 4 | 0.000000000 SECOND | | | |
| AVAILABLE TIME FOR TRANSMISSION OF TRANSMISSION QUEUE 3 | 0.000000000 SECOND | | | |
| AVAILABLE TIME FOR TRANSMISSION OF TRANSMISSION QUEUE 2 | 0.000000000 SECOND | | | |
| AVAILABLE TIME FOR TRANSMISSION OF TRANSMISSION QUEUE 1 | 0.000000000 SECOND | | | |
| AVAILABLE TIME FOR TRANSMISSION OF TRANSMISSION QUEUE 0 | 0.000000000 SECOND | | | |
| REQUIRED TRANSMISSION TIME OF FRAME TRANSMITTED NEXT FROM TRANSMISSION QUEUE 7 | 0.000001000 SECOND (FRAME f0) | | | |
| REQUIRED TRANSMISSION TIME OF FRAME TRANSMITTED NEXT FROM TRANSMISSION QUEUE 6 | N/A | | | |
| REQUIRED TRANSMISSION TIME OF FRAME TRANSMITTED NEXT FROM TRANSMISSION QUEUE 5 | N/A | | | |
| REQUIRED TRANSMISSION TIME OF FRAME TRANSMITTED NEXT FROM TRANSMISSION QUEUE 4 | N/A | | | |
| REQUIRED TRANSMISSION TIME OF FRAME TRANSMITTED NEXT FROM TRANSMISSION QUEUE 3 | N/A | | | |
| REQUIRED TRANSMISSION TIME OF FRAME TRANSMITTED NEXT FROM TRANSMISSION QUEUE 2 | N/A | | | |
| REQUIRED TRANSMISSION TIME OF FRAME TRANSMITTED NEXT FROM TRANSMISSION QUEUE 1 | N/A | | | |
| REQUIRED TRANSMISSION TIME OF FRAME TRANSMITTED NEXT FROM TRANSMISSION QUEUE 0 | N/A | | | |

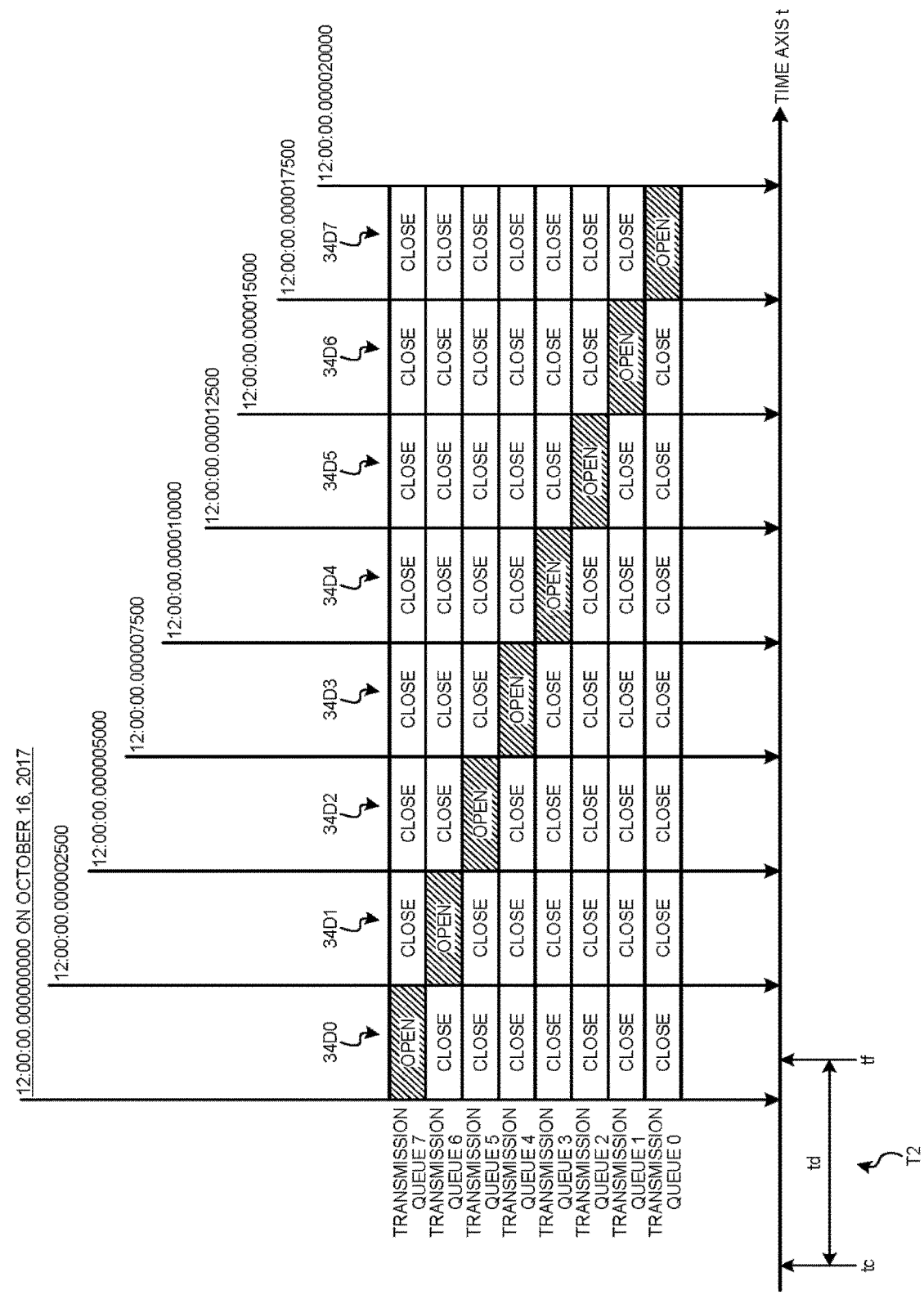

FIG.27

EXAMPLE AFTER FRAME f0 HAS BEEN SCHEDULED [STATE AT THE TIME 0.002 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.002000000 ON OCTOBER 16, 2017 |
| FUTURE TIME | 12:00:00.000001000 ON OCTOBER 16, 2017 |
| TIME DIFFERENCE BETWEEN CURRENT TIME AND FUTURE TIME | 0.998001000 SECOND |
| AVAILABLE TIME FOR TRANSMISSION OF TRANSMISSION QUEUE 7 | 0.000001500 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | N/A |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |

FIG.29

EXAMPLE OF CASE WHERE FRAME f1 WITH REQUIRED TRANSMISSION TIME OF 1,200 NANOSECONDS HAS BEEN WRITTEN TO TRANSMISSION QUEUE 7 [STATE AT THE TIME 0.003 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.003000000 ON OCTOBER 16, 2017 |
| FUTURE TIME | 12:00:00.000001000 ON OCTOBER 16, 2017 |
| TIME DIFFERENCE BETWEEN CURRENT TIME AND FUTURE TIME | 0.997001000 SECOND |
| AVAILABLE TIME FOR TRANSMISSION OF TRANSMISSION QUEUE 7 | 0.000001500 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001200 SECOND (FRAME f1) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |

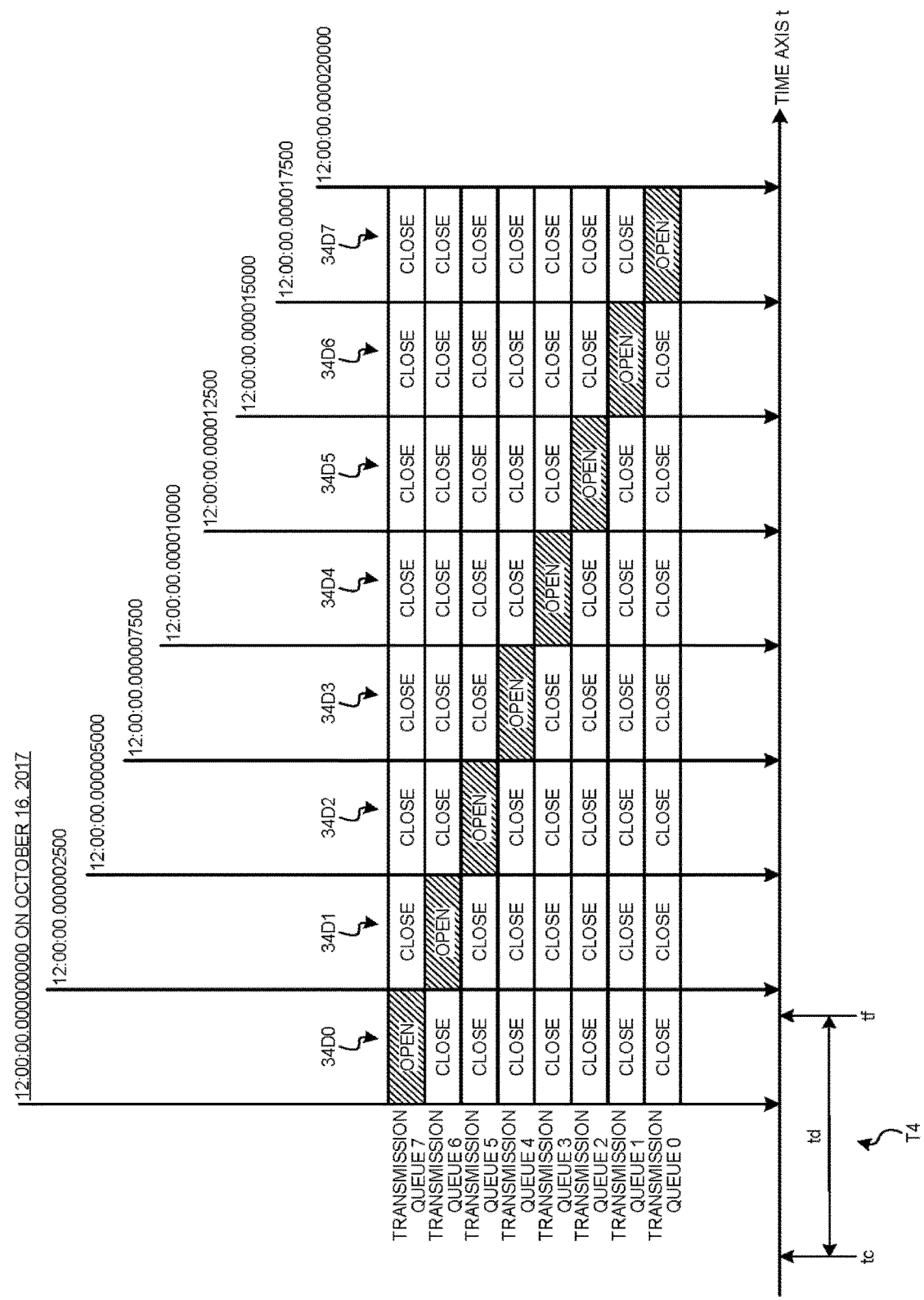

FIG.31

EXAMPLE AFTER FRAME f1 HAS BEEN SCHEDULED [STATE AT THE TIME 0.004 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.004000000 ON OCTOBER 16, 2017 |
| FUTURE TIME | 12:00:00.000002200 ON OCTOBER 16, 2017 |
| TIME DIFFERENCE BETWEEN CURRENT TIME AND FUTURE TIME | 0.996002200 SECOND |
| AVAILABLE TIME FOR TRANSMISSION OF TRANSMISSION QUEUE 7 | 0.000000300 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | N/A |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |

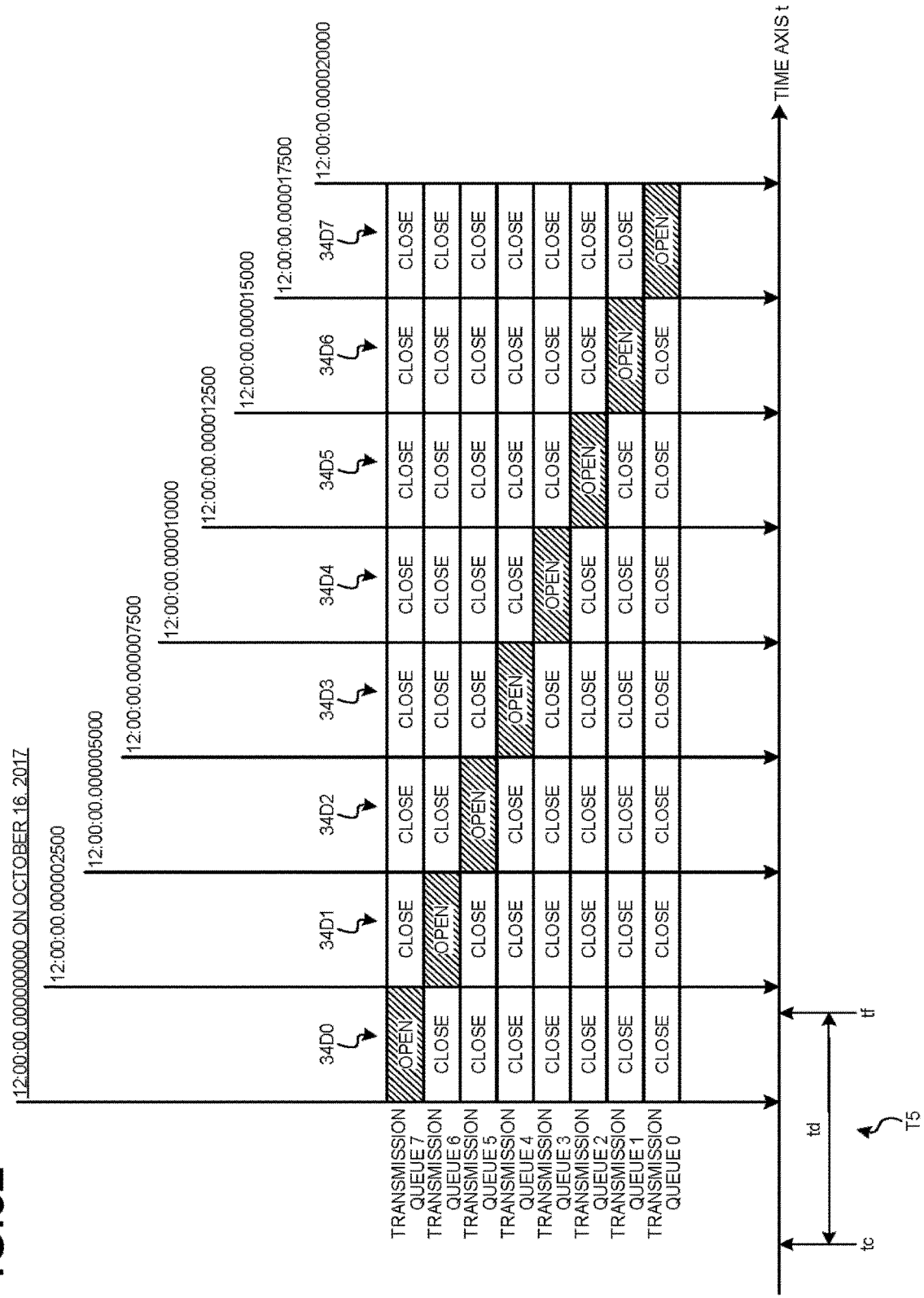

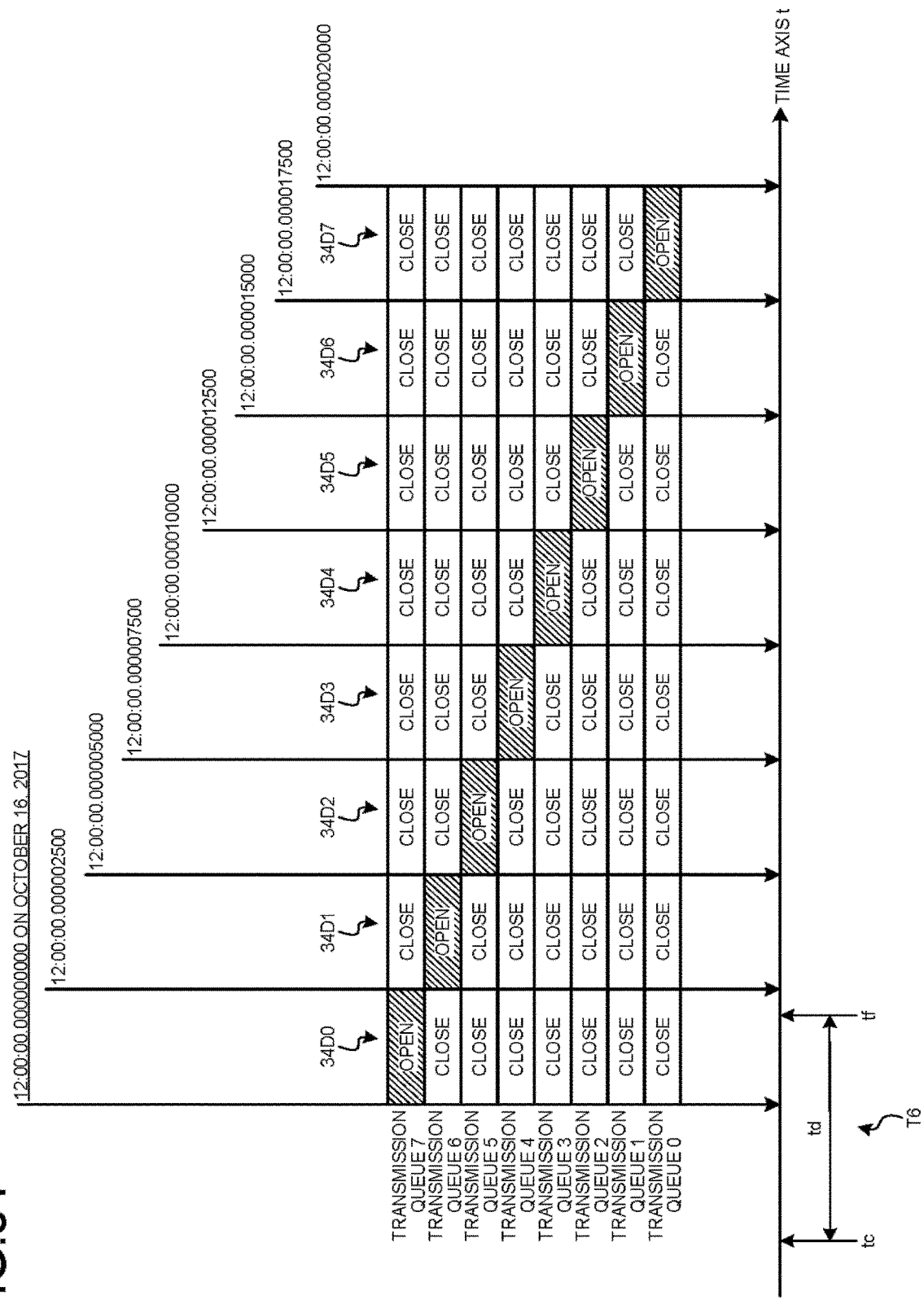

FIG.35

EXAMPLE AFTER AVAILABLE TIME FOR TRANSMISSION OF TRANSMISSION QUEUE 7 HAS BEEN REDUCED TO ZERO
[STATE AT THE TIME 0.006 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.006000000 ON OCTOBER 16, 2017 |
| FUTURE TIME | 12:00:00.000002200 ON OCTOBER 16, 2017 |
| TIME DIFFERENCE BETWEEN CURRENT TIME AND FUTURE TIME | 0.994002200 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |

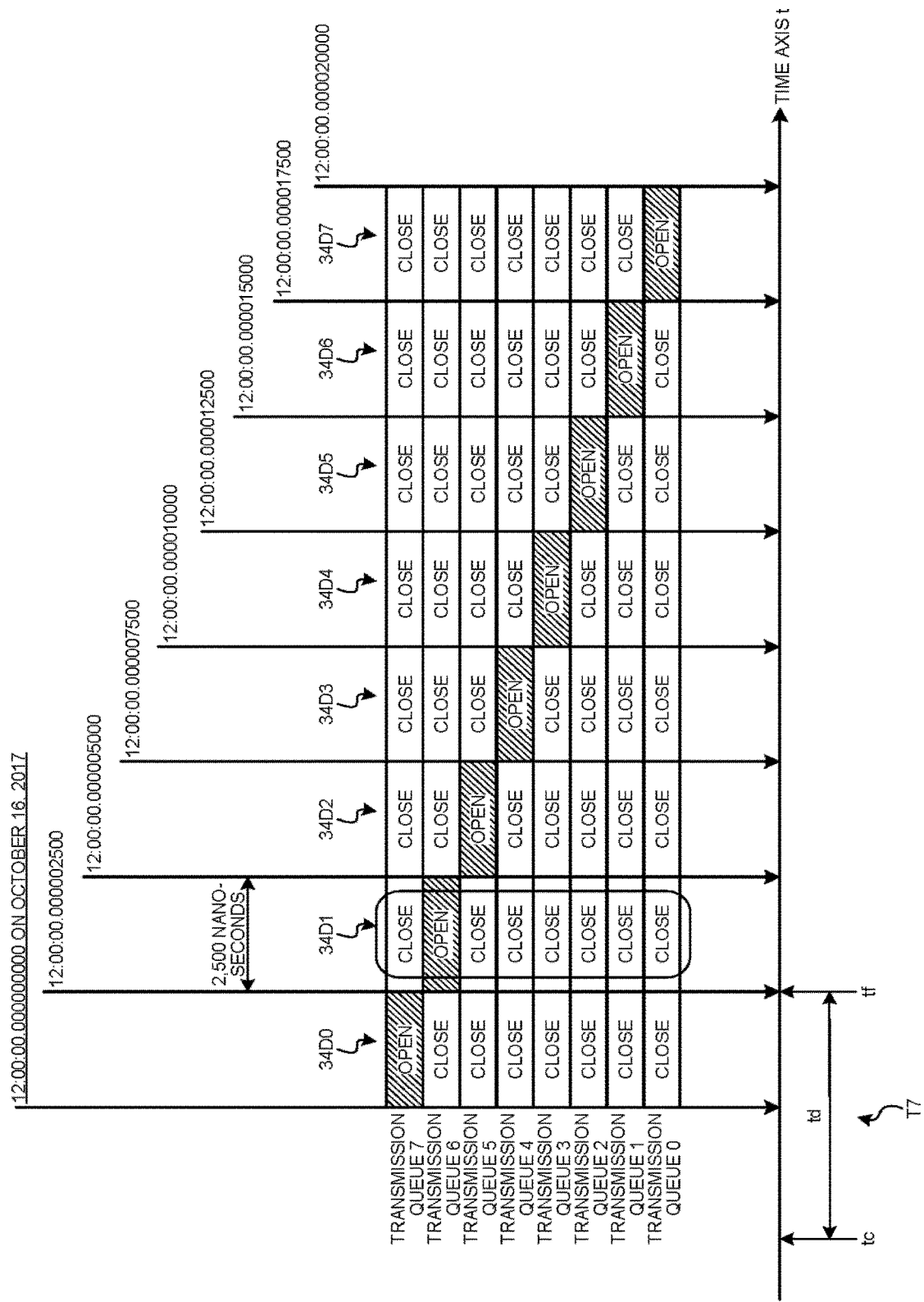

FIG.37

EXAMPLE AFTER ENTRY OF LIST INDEX 1 HAS BEEN PREFETCHED [STATE AT THE TIME 0.007 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.007000000 ON OCTOBER 16, 2017 |
| FUTURE TIME | 12:00:00.000002500 ON OCTOBER 16, 2017 |
| TIME DIFFERENCE BETWEEN CURRENT TIME AND FUTURE TIME | 0.993002500 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000002500 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |

FIG.39

EXAMPLE OF CASE WHERE FRAME f3 WITH REQUIRED TRANSMISSION TIME OF 1,000 NANOSECONDS IS WRITTEN TO TRANSMISSION QUEUE 6
[STATE AT THE TIME 0.008 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.008000000 ON OCTOBER 16, 2017 |
| FUTURE TIME | 12:00:00.000002500 ON OCTOBER 16, 2017 |
| TIME DIFFERENCE BETWEEN CURRENT TIME AND FUTURE TIME | 0.992002500 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000002500 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | 0.000001000 SECOND (FRAME f3) |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |

FIG.41

EXAMPLE AFTER FRAME f3 HAS BEEN SCHEDULED [STATE AT THE TIME 0.009 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.009000000 ON OCTOBER 16, 2017 |
| FUTURE TIME | 12:00:00.000003500 ON OCTOBER 16, 2017 |
| TIME DIFFERENCE BETWEEN CURRENT TIME AND FUTURE TIME | 0.991003500 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000001500 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |

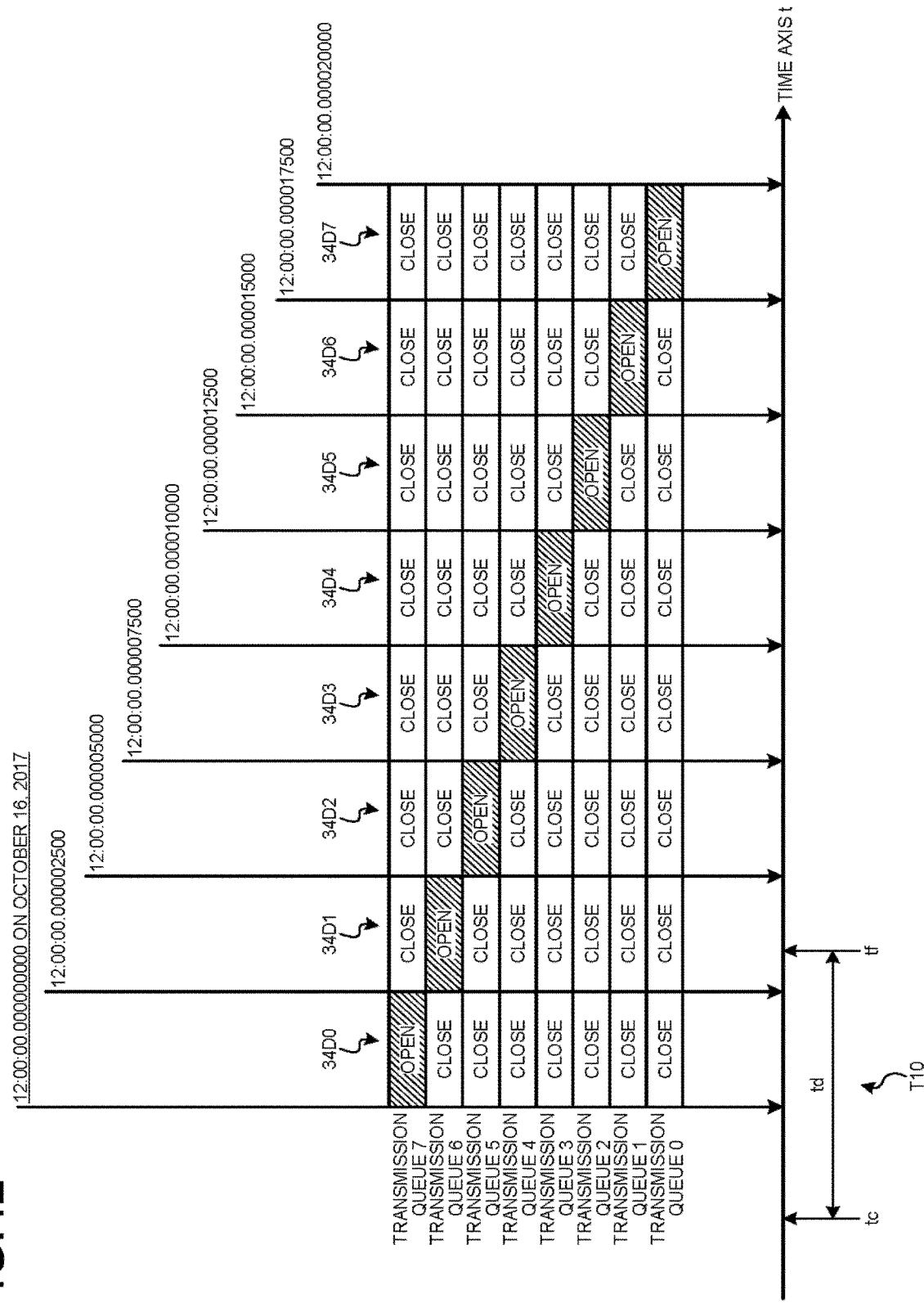

FIG.43

EXAMPLE OF CASE WHERE FRAME f4 WITH REQUIRED TRANSMISSION TIME OF 1,500 NANOSECONDS IS WRITTEN TO TRANSMISSION QUEUE 6
[STATE AT THE TIME 0.010 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.010000000 ON OCTOBER 16, 2017 |
| FUTURE TIME | 12:00:00.000003500 ON OCTOBER 16, 2017 |
| TIME DIFFERENCE BETWEEN CURRENT TIME AND FUTURE TIME | 0.990003500 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000001500 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | 0.000001500 SECOND (FRAME f4) |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |

70

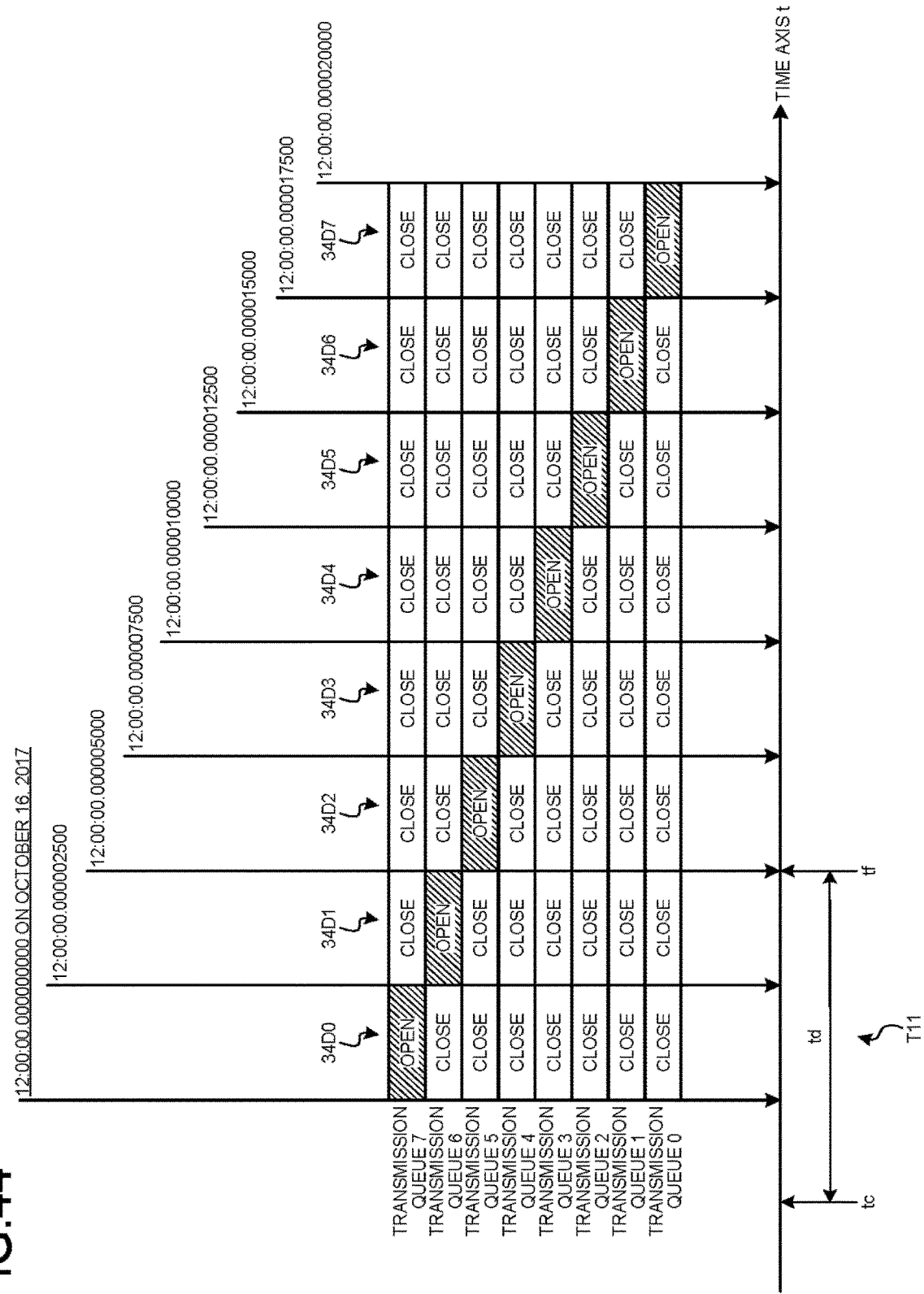

FIG.45

EXAMPLE AFTER FRAME f4 HAS BEEN SCHEDULED [STATE AT THE TIME 0.011 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.011000000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.989005000 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.0000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.47

EXAMPLE AFTER ENTRY OF LIST INDEX 2 HAS BEEN PREFETCHED [STATE AT THE TIME 0.012 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.012000000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.988005000 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000002500 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

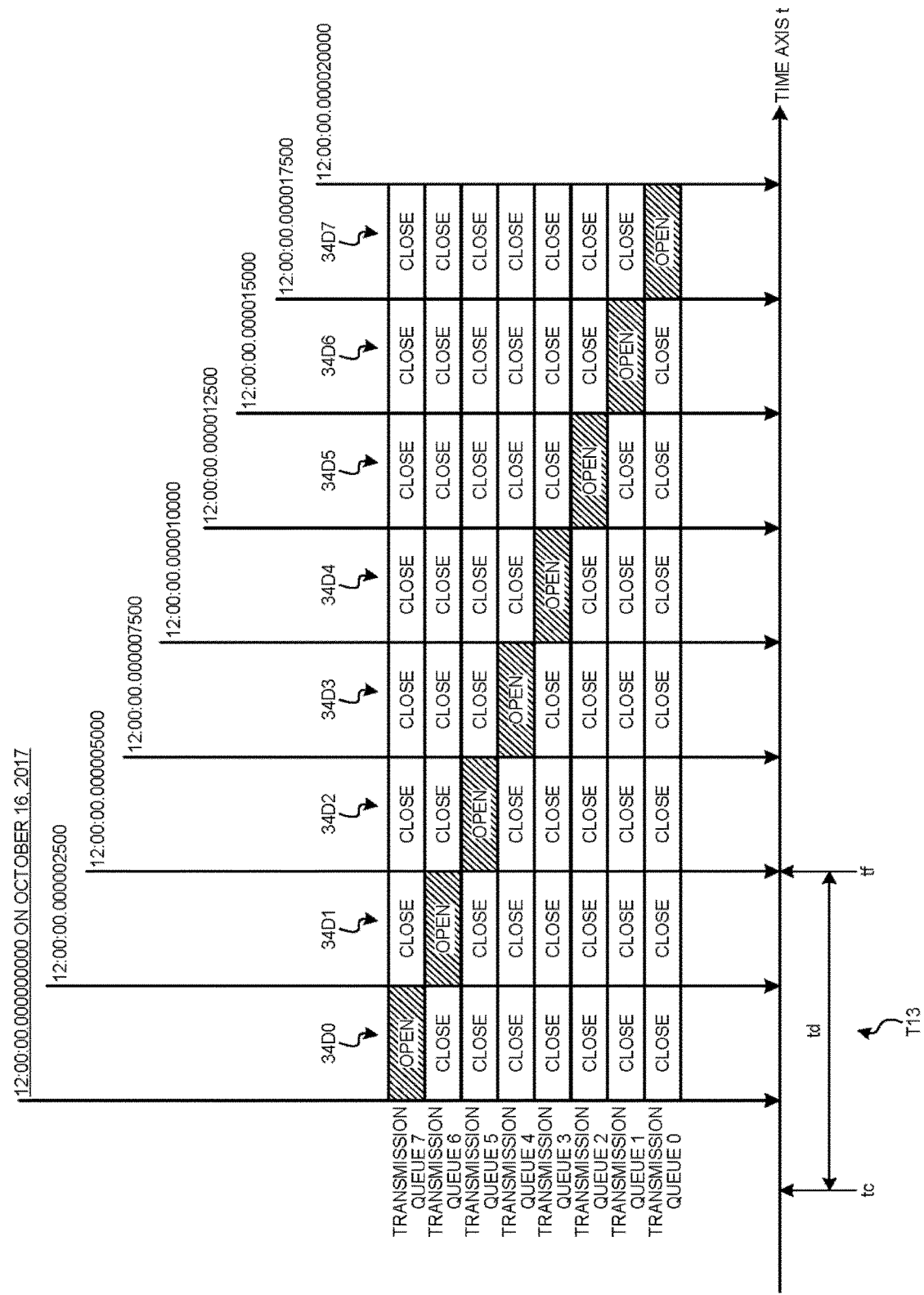

FIG.49

EXAMPLE OF CASE WHERE NO FRAME FOR WHICH SCHEDULING IS POSSIBLE EXISTS [STATE AT THE TIME 0.013 SECOND AFTER INITIALIZATION]

| | VALUE |
|---|---|
| CURRENT TIME, AVAILABLE TIME FOR TRANSMISSION, AND REQUIRED TRANSMISSION TIME | |
| CURRENT TIME | 11:59:59.013000000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.987005000 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000002500 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

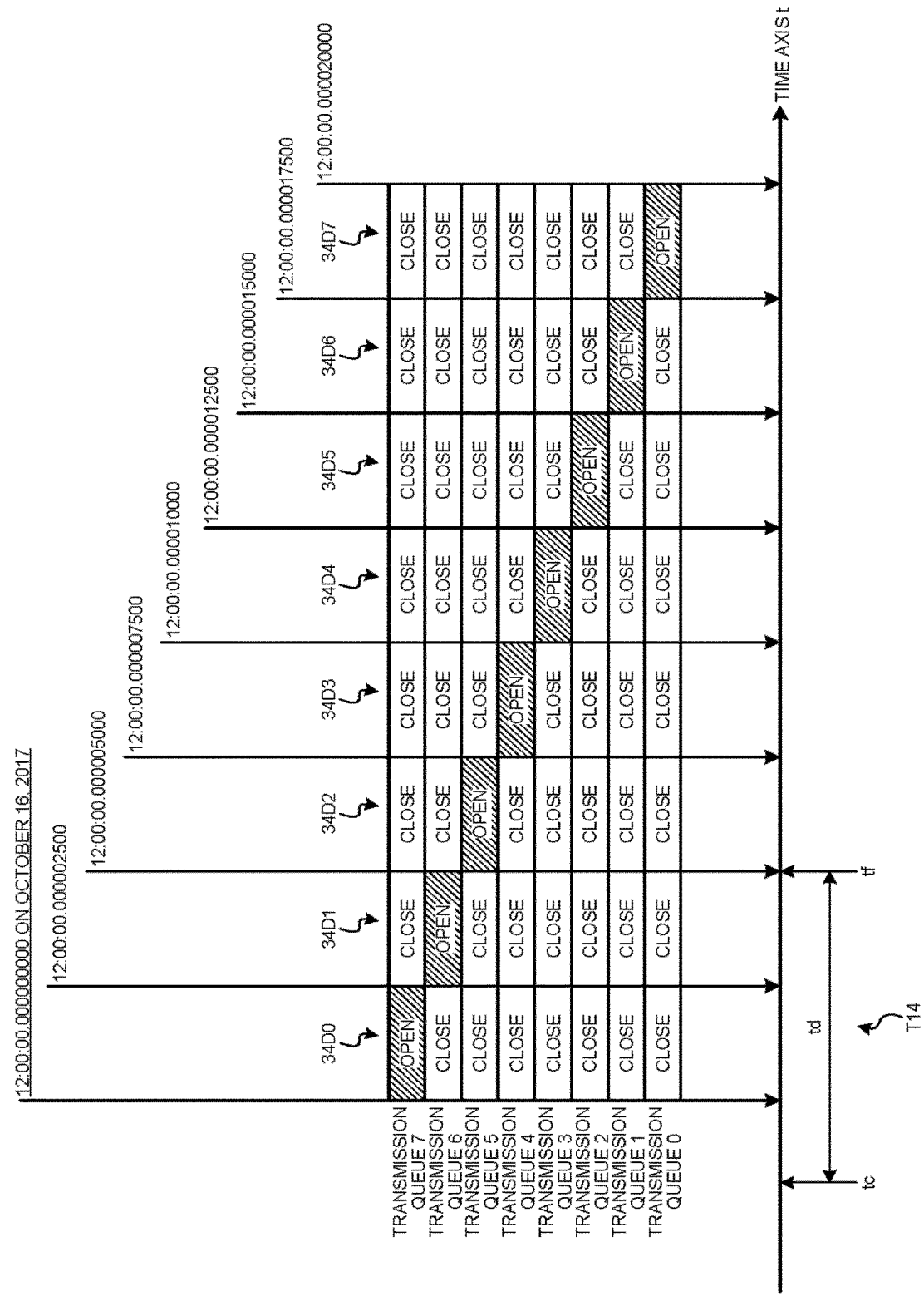

FIG.51

EXAMPLE IN WHICH UPDATE OF FUTURE TIME IS STOPPED [STATE AT THE TIME 0.014 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.014000000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.986005000 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000002500 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

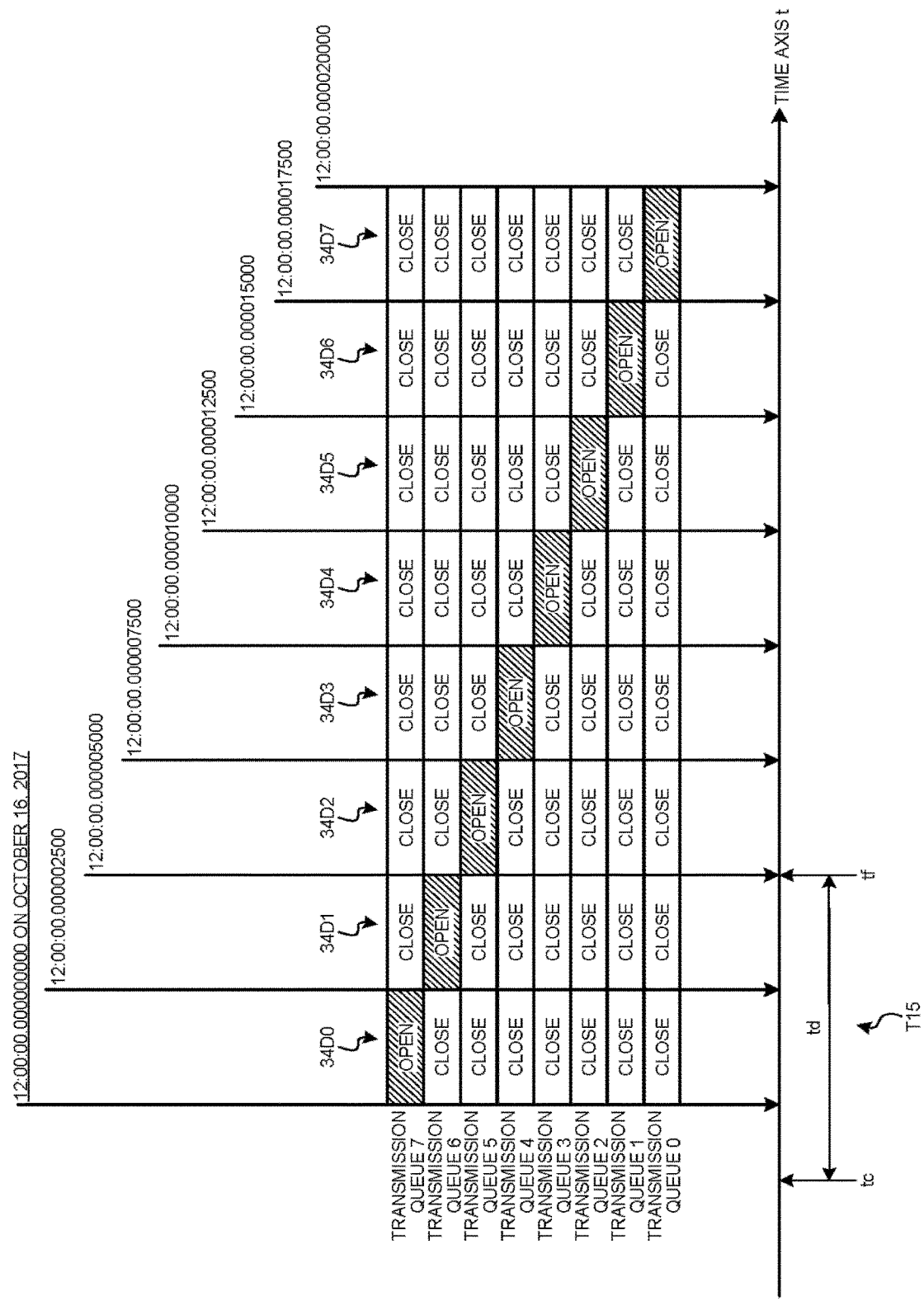

FIG.53

EXAMPLE IN WHICH UPDATE OF FUTURE TIME IS STOPPED [STATE AT THE TIME 0.015 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.015000000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.985005000 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000002500 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMITTED TIME OF FRAME TRANSMITTED NEXT FROM TRANSMISSION QUEUE 7 | 0.000001500 SECOND (FRAME f2) |
| REQUIRED TRANSMITTED TIME OF FRAME TRANSMITTED NEXT FROM TRANSMISSION QUEUE 6 | N/A |
| REQUIRED TRANSMITTED TIME OF FRAME TRANSMITTED NEXT FROM TRANSMISSION QUEUE 5 | N/A |
| REQUIRED TRANSMITTED TIME OF FRAME TRANSMITTED NEXT FROM TRANSMISSION QUEUE 4 | N/A |
| REQUIRED TRANSMITTED TIME OF FRAME TRANSMITTED NEXT FROM TRANSMISSION QUEUE 3 | N/A |
| REQUIRED TRANSMITTED TIME OF FRAME TRANSMITTED NEXT FROM TRANSMISSION QUEUE 2 | N/A |
| REQUIRED TRANSMITTED TIME OF FRAME TRANSMITTED NEXT FROM TRANSMISSION QUEUE 1 | N/A |
| REQUIRED TRANSMITTED TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.55

EXAMPLE IN WHICH UPDATE OF FUTURE TIME IS STOPPED [STATE AT THE TIME 0.016 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.016000000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.984005000 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000002500 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

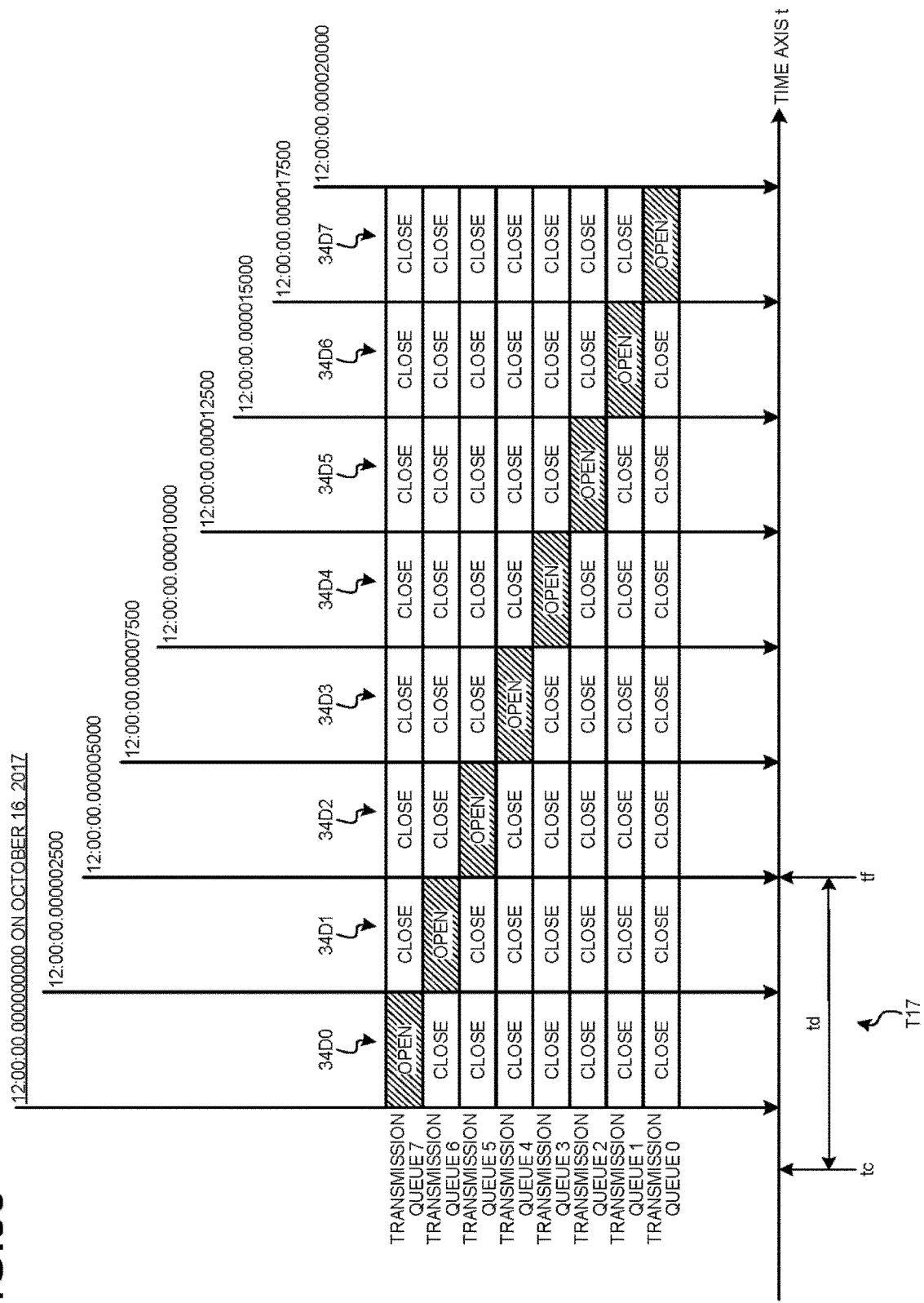

FIG.57

EXAMPLE IN WHICH UPDATE OF FUTURE TIME IS STOPPED [STATE AT THE TIME 0.017 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.017000000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.983005000 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000002500 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

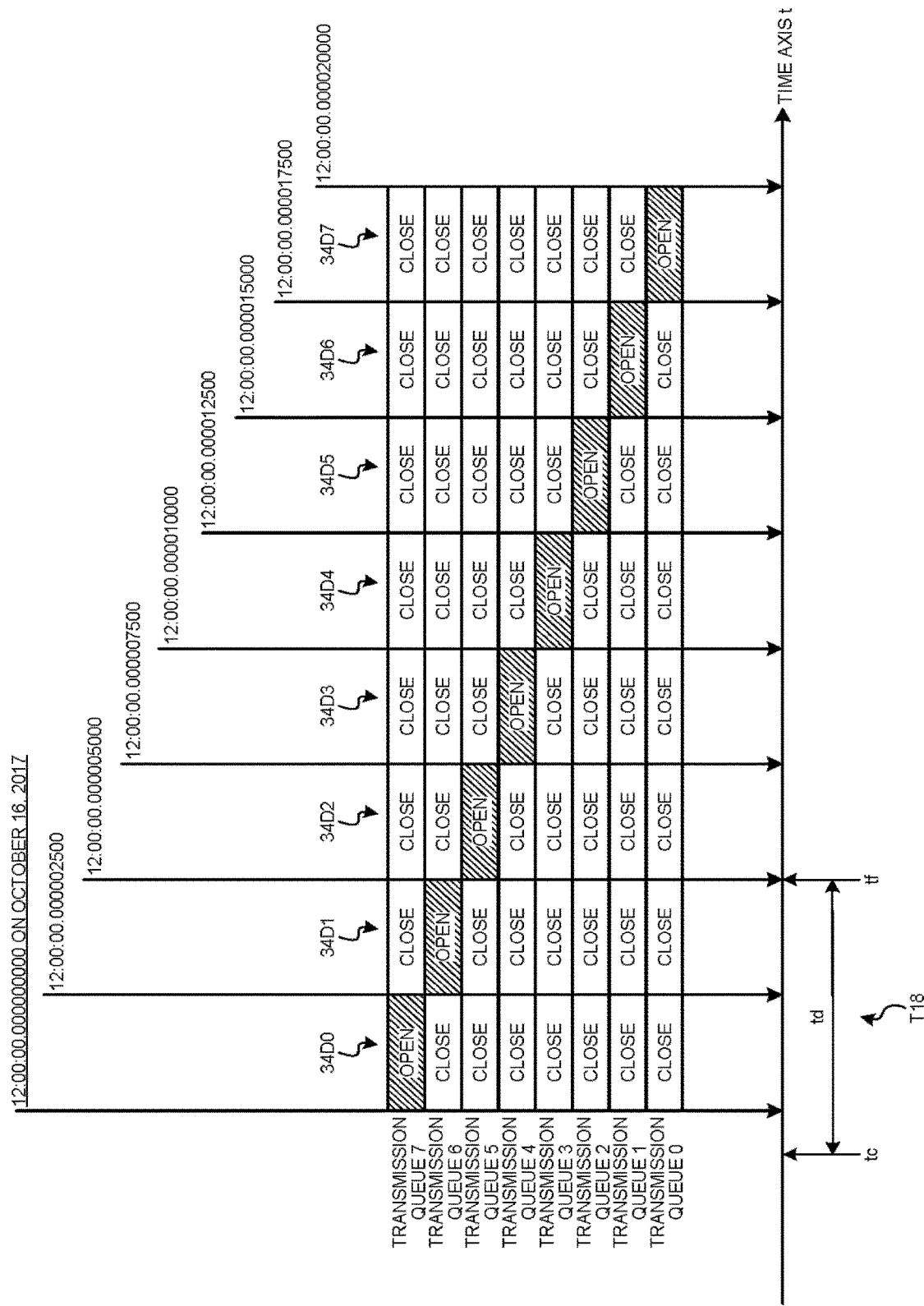

FIG.59

EXAMPLE IN WHICH THRESHOLD OF TIME DIFFERENCE IS 20 MICROSECONDS [STATE AT THE TIME 0.999985 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.999985000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.000020000 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000002500 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

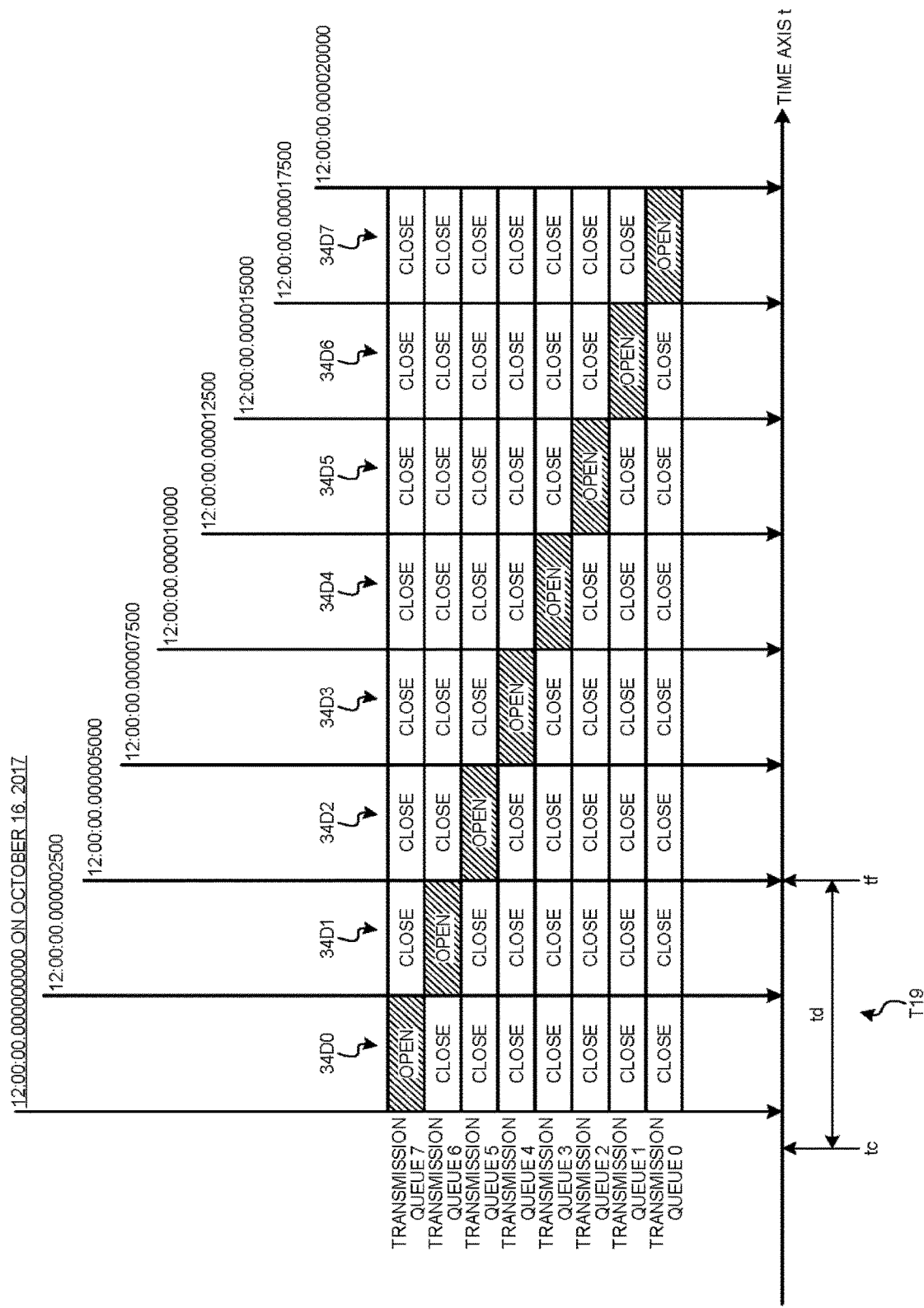

FIG.61

EXAMPLE OF PROCESS OF REDUCING AVAILABLE TIME FOR TRANSMISSION OF TRANSMISSION QUEUE 5
[STATE AT THE TIME 0.999986 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.999986000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.000019000 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000001500 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.63

EXAMPLE OF PROCESS OF REDUCING AVAILABLE TIME FOR TRANSMISSION OF TRANSMISSION QUEUE 5
[STATE AT THE TIME 0.999987 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.999987000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.000018000 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000000500 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

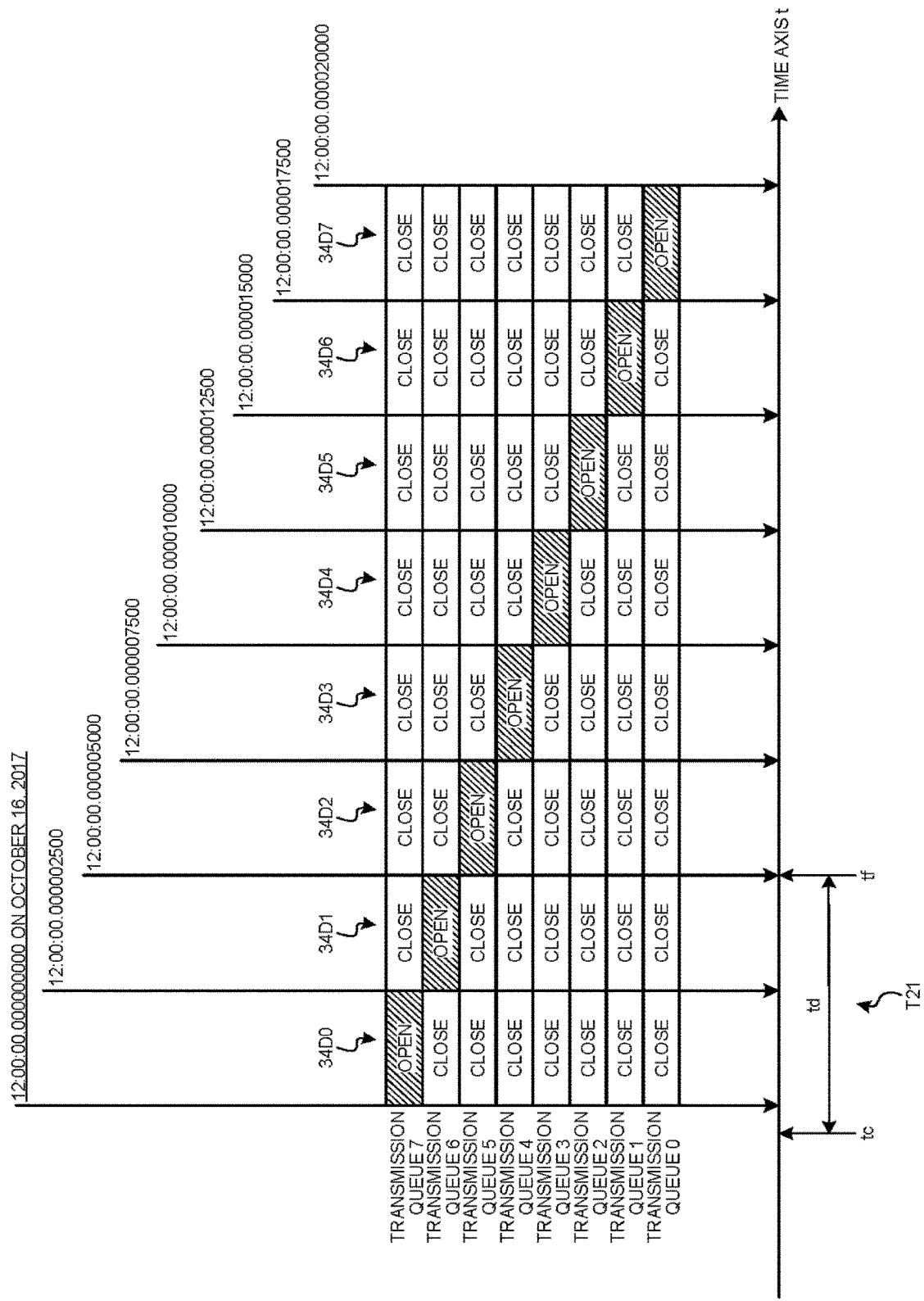

FIG.65

EXAMPLE OF PROCESS OF REDUCING AVAILABLE TIME FOR TRANSMISSION OF TRANSMISSION QUEUE 5
[STATE AT THE TIME 0.9999875 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.999987500 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.000017500 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

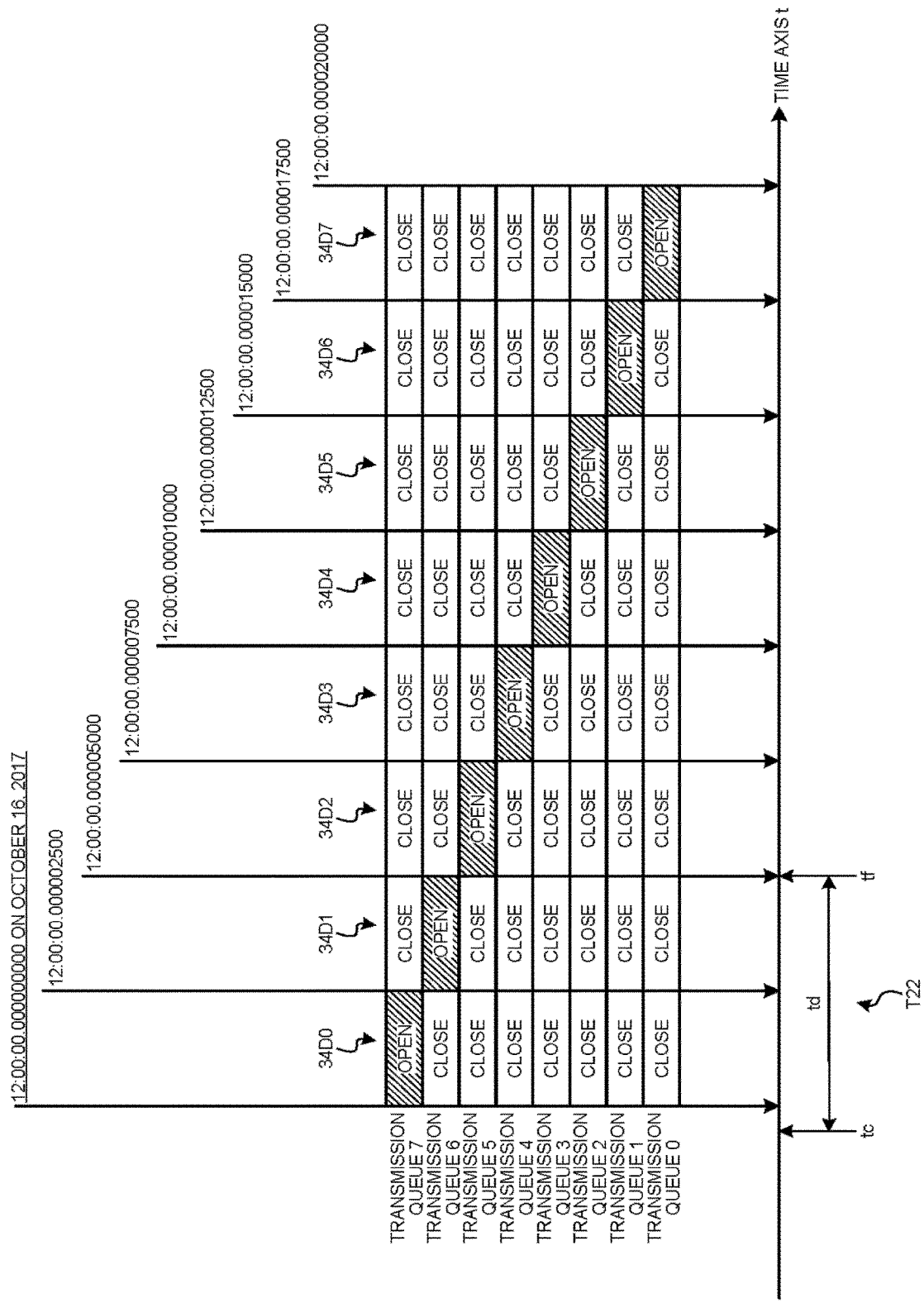

FIG.67

EXAMPLE AFTER AVAILABLE TIME FOR TRANSMISSION OF TRANSMISSION QUEUE 5 HAS BEEN REDUCED TO ZERO
[STATE AT THE TIME 0.999988 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.999988000 ON OCTOBER 16, 2017 |
| FUTURE TIME | 12:00:00.000005000 ON OCTOBER 16, 2017 |
| TIME DIFFERENCE BETWEEN CURRENT TIME AND FUTURE TIME | 0.000017000 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

FIG.69

EXAMPLE AFTER ENTRY OF LIST INDEX 3 HAS BEEN PREFETCHED [STATE AT THE TIME 0.9999885 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.999988500 ON OCTOBER 16, 2017 |
| FUTURE TIME | 12:00:00.000007500 ON OCTOBER 16, 2017 |
| TIME DIFFERENCE BETWEEN CURRENT TIME AND FUTURE TIME | 0.000019000 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000002500 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

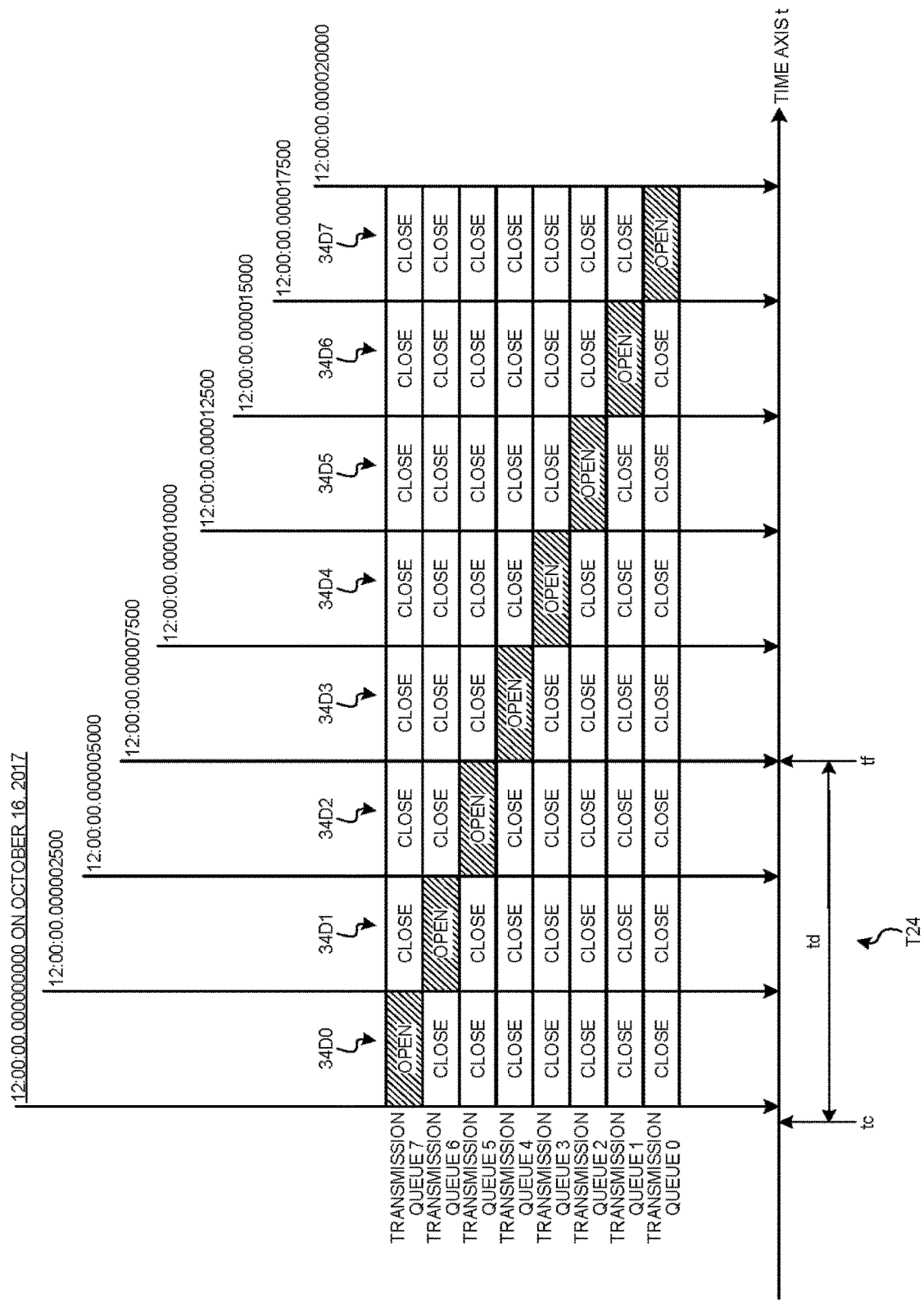

FIG.71

EXAMPLE OF CASE WHERE FRAME f5 WITH REQUIRED TRANSMISSION TIME OF 1,000 NANOSECONDS IS WRITTEN TO TRANSMISSION QUEUE 4
[STATE AT THE TIME 0.999989 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.999989000 ON OCTOBER 16, 2017 |
| FUTURE TIME | 12:00:00.000007500 ON OCTOBER 16, 2017 |
| TIME DIFFERENCE BETWEEN CURRENT TIME AND FUTURE TIME | 0.000018500 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000000000 SECOND |
| AVAILABLE TIME FOR TRANSMISSION OF TRANSMISSION QUEUE 4 | 0.000002000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | 0.000001000 SECOND (FRAME f5) |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |

EXAMPLE AFTER FRAME f5 HAS BEEN SCHEDULED [STATE AT THE TIME 0.9999895 SECOND AFTER INITIALIZATION]

| CURRENT TIME, FUTURE TIME, AVAILABLE TIME FOR TRANSMISSION, AND REQUIRED TRANSMISSION TIME | VALUE |
|---|---|
| CURRENT TIME | 11:59:59.999989500 ON OCTOBER 16, 2017 |
| FUTURE TIME | 12:00:00.000008500 ON OCTOBER 16, 2017 |
| TIME DIFFERENCE BETWEEN CURRENT TIME AND FUTURE TIME | 0.000019000 SECOND |
| AVAILABLE TIME FOR TRANSMISSION OF TRANSMISSION QUEUE 7 | 0.000000000 SECOND |
| AVAILABLE TIME FOR TRANSMISSION OF TRANSMISSION QUEUE 6 | 0.000000000 SECOND |
| AVAILABLE TIME FOR TRANSMISSION OF TRANSMISSION QUEUE 5 | 0.000001000 SECOND |
| AVAILABLE TIME FOR TRANSMISSION OF TRANSMISSION QUEUE 4 | 0.000000000 SECOND |
| AVAILABLE TIME FOR TRANSMISSION OF TRANSMISSION QUEUE 3 | 0.000000000 SECOND |
| AVAILABLE TIME FOR TRANSMISSION OF TRANSMISSION QUEUE 2 | 0.000000000 SECOND |
| AVAILABLE TIME FOR TRANSMISSION OF TRANSMISSION QUEUE 1 | 0.000000000 SECOND |
| AVAILABLE TIME FOR TRANSMISSION OF TRANSMISSION QUEUE 0 | 0.000000000 SECOND |
| REQUIRED TRANSMISSION TIME OF FRAME TRANSMITTED NEXT FROM TRANSMISSION QUEUE 7 | 0.000001500 SECOND (FRAME f2) |
| REQUIRED TRANSMISSION TIME OF FRAME TRANSMITTED NEXT FROM TRANSMISSION QUEUE 6 | N/A |
| REQUIRED TRANSMISSION TIME OF FRAME TRANSMITTED NEXT FROM TRANSMISSION QUEUE 5 | N/A |
| REQUIRED TRANSMISSION TIME OF FRAME TRANSMITTED NEXT FROM TRANSMISSION QUEUE 4 | N/A |
| REQUIRED TRANSMISSION TIME OF FRAME TRANSMITTED NEXT FROM TRANSMISSION QUEUE 3 | N/A |
| REQUIRED TRANSMISSION TIME OF FRAME TRANSMITTED NEXT FROM TRANSMISSION QUEUE 2 | N/A |
| REQUIRED TRANSMISSION TIME OF FRAME TRANSMITTED NEXT FROM TRANSMISSION QUEUE 1 | N/A |
| REQUIRED TRANSMISSION TIME OF FRAME TRANSMITTED NEXT FROM TRANSMISSION QUEUE 0 | N/A |

| SCHEDULED FRAME | STARTING TIME FOR TRANSMISSION | STATE |
|---|---|---|
| FRAME f0 | 12:00:00.000000000 ON OCTOBER 16, 2017 | WAITING FOR TRANSMISSION |
| FRAME f1 | 12:00:00.000001000 ON OCTOBER 16, 2017 | WAITING FOR TRANSMISSION |
| FRAME f3 | 12:00:00.000002500 ON OCTOBER 16, 2017 | WAITING FOR TRANSMISSION |
| FRAME f4 | 12:00:00.000003500 ON OCTOBER 16, 2017 | WAITING FOR TRANSMISSION |
| FRAME f5 | 12:00:00.000007500 ON OCTOBER 16, 2017 | WAITING FOR TRANSMISSION |

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2019-047699, filed on Mar. 14, 2019; the entire contents of which are incorporated herein by reference.

FIELD

Embodiments described herein relate generally to an information processing apparatus, an information processing method, and a computer program product.

BACKGROUND

In the fields of industrial networks connecting industrial apparatuses in a factory, in-vehicle networks connecting a controller in the vehicle, and the like, high real-time performance is required. In recent years, Ethernet (registered trademark) has been used increasingly in industrial networks, in-vehicle networks, and the like, and various real-time Ethernet standards have been proposed. For example, a technique has been disclosed. In the technique, transmission control is performed based on the priority, the guaranteed bandwidth, the transmission cycle or the transmission interval of the frame, and the like.

However, conventional art has difficulty in performing scheduling to perform strict transmission timing control in the unit of frames within the range of the available time for transmission dynamically changing based on transmission scheduling information assigned in advance to the transmission queue. Specifically, conventional art has difficulty in performing scheduling to perform transmission timing control with high accuracy.

BRIEF DESCRIPTION OF THE DRAWINGS

FIG. 3 is a schematic diagram illustrating future time information and available time for transmission information;
FIG. 4 is a flowchart illustrating a process of information processing;
FIG. 23 is a diagram illustrating the state immediately after initialization;
FIG. 24 is a diagram illustrating a state at the time 0.001 second after initialization;
FIG. 25 is a diagram illustrating a state at the time 0.001 second after initialization;
FIG. 26 is a diagram illustrating a state at the time 0.002 second after initialization;
FIG. 27 is a diagram illustrating a state at the time 0.002 second after initialization;
FIG. 29 is a diagram illustrating a state at the time 0.003 second after initialization;
FIG. 30 is a diagram illustrating a state at the time 0.004 second after initialization;
FIG. 31 is a diagram illustrating a state at the time 0.004 second after initialization;
FIG. 32 is a diagram illustrating a state at the time 0.005 second after initialization;
FIG. 34 is a diagram illustrating a state at the time 0.006 second after initialization;
FIG. 35 is a diagram illustrating a state at the time 0.006 second after initialization;
FIG. 36 is a diagram illustrating a state at the time 0.007 second after initialization;
FIG. 37 is a diagram illustrating a state at the time 0.007 second after initialization;
FIG. 39 is a diagram illustrating a state at the time 0.008 second after initialization;
FIG. 41 is a diagram illustrating a state at the time 0.009 second after initialization;
FIG. 42 is a diagram illustrating a state at the time 0.010 second after initialization;
FIG. 43 is a diagram illustrating a state at the time 0.010 second after initialization;
FIG. 44 is a diagram illustrating a state at the time 0.011 second after initialization;
FIG. 45 is a diagram illustrating a state at the time 0.011 second after initialization;
FIG. 47 is a diagram illustrating a state at the time 0.012 second after initialization;
FIG. 48 is a diagram illustrating a state at the time 0.013 second after initialization;

FIG. 49 is a diagram illustrating a state at the time 0.013 second after initialization;

FIG. 50 is a diagram illustrating a state at the time 0.014 second after initialization;

FIG. 51 is a diagram illustrating a state at the time 0.014 second after initialization;

FIG. 52 is a diagram illustrating a state at the time 0.015 second after initialization;

FIG. 53 is a diagram illustrating a state at the time 0.015 second after initialization;

FIG. 55 is a diagram illustrating a state at the time 0.016 second after initialization;

FIG. 56 is a diagram illustrating a state at the time 0.017 second after initialization;

FIG. 57 is a diagram illustrating a state at the time 0.017 second after initialization;

FIG. 58 is a diagram illustrating a state at the time 0.999985 second after initialization;

FIG. 59 is a diagram illustrating a state at the time 0.999985 second after initialization;

FIG. 60 is a diagram illustrating a state at the time 0.999986 second after initialization;

FIG. 61 is a diagram illustrating a state at the time 0.999986 second after initialization;

FIG. 63 is a diagram illustrating a state at the time 0.999987 second after initialization;

FIG. 64 is a diagram illustrating a state at the time 0.9999875 second after initialization;

FIG. 65 is a diagram illustrating a state at the time 0.9999875 second after initialization;

FIG. 66 is a diagram illustrating a state at the time 0.999988 second after initialization;

FIG. 67 is a diagram illustrating a state at the time 0.999988 second after initialization;

FIG. 69 is a diagram illustrating a state at the time 0.9999885 second after initialization;

FIG. 70 is a diagram illustrating a state at the time 0.999989 second after initialization;

FIG. 71 is a diagram illustrating a state at the time 0.999989 second after initialization;

FIG. 73 is a diagram illustrating a state at the time 0.9999895 second after initialization.

DETAILED DESCRIPTION

Figure 1:
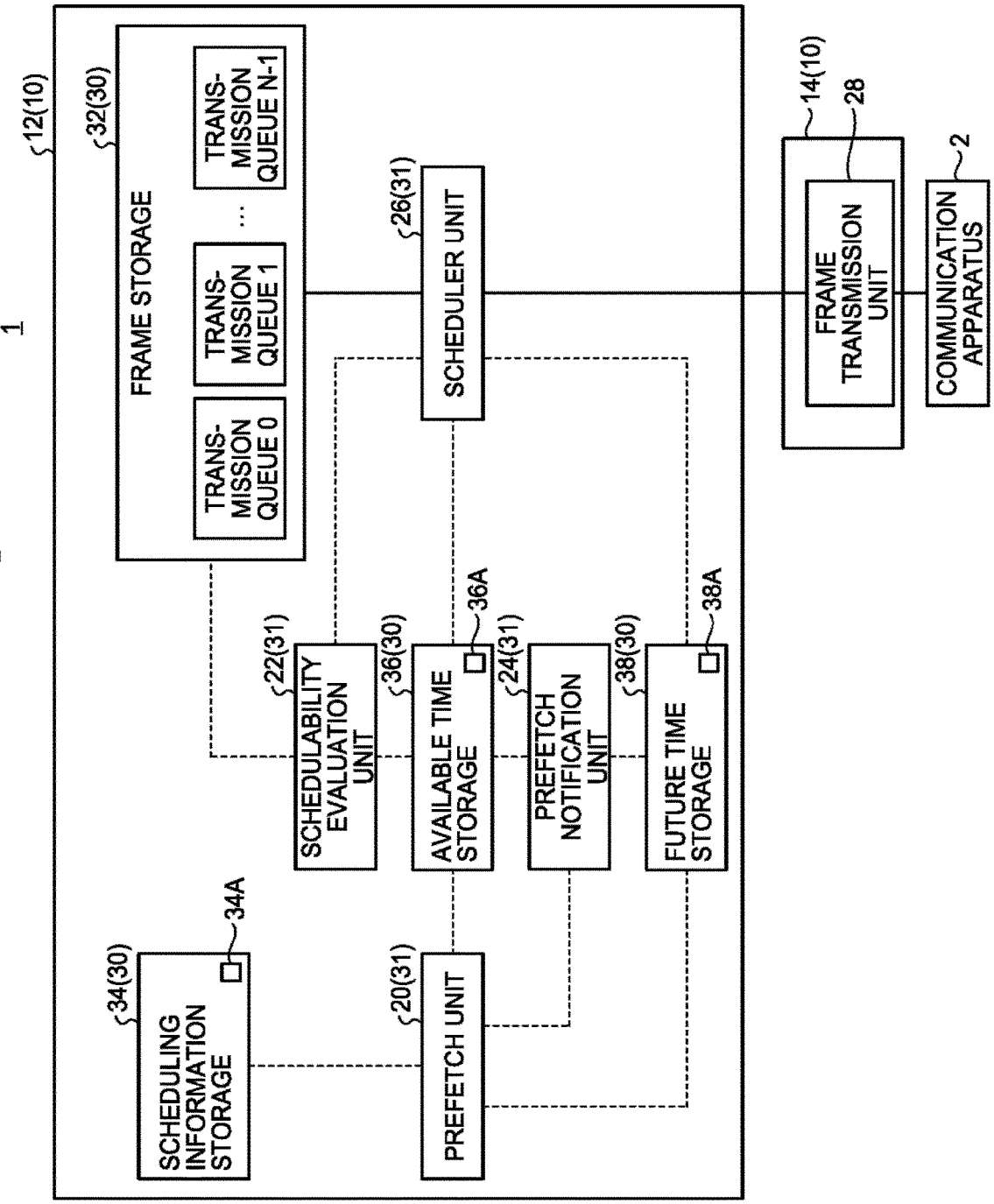
FIG. 1 is a diagram illustrating a functional configuration of an information processing system.

According to an embodiment, an information processing apparatus includes one or more processors. The processors prefetch a scheduling entry corresponding a future time period in advance from scheduling information including one or more scheduling entries, each entry of which contains a transmission state and an interval for each of one or more transmission queues. The processors determine a starting time of transmission for one or more frames waiting for transmission in each queue, based on the scheduling entry. At least one of timing of the prefetching process and timing of the scheduling process is determined based on a result of comparison of a time difference and one or more thresholds. The time difference is a difference between current time and future time that is a candidate for starting time of transmission.

The following is a detailed explanation of an information processing apparatus, an information processing method, and a computer program product, with reference to the attached drawings. The information processing apparatus according to the present embodiment is suitably applied to, in particular, fields requiring high real-time performance.

First, the following is an explanation of an example of the standard used in fields requiring high real-time performance. The term "high real-time performance" means, for example, low delay performance and high time synchronization accuracy. Examples of the fields requiring high real-time performance include industrial networks and in-vehicle networks.

For example, as a standard achieving real-time performance on Ethernet (registered trademark), standardization of Time-Sensitive Networking (TSN) is being made progress with IEEE 802.1 TSN Task. TSN is formed of a plurality of standards. TSN is a standard obtained by expanding Audio/Video Bridging (AVB) achieving low delay performance used in pro-audios. TSN is a standard aimed at achieving high reliability, in addition to real-time performance higher than AVB, to enable application to industrial networks and in-vehicle networks.

IEEE 802.1Qbv serving as a TSN standard is a communication standard to control the transmission queues of an end node or a relay node (switch), based on a predetermined schedule. Specifically, IEEE 802.1Qbv controls the timing of frame transmission from each of transmission queues, by separately and properly switching each of transmission queues assigned to the respective traffic classes to a valid (open) or invalid (close) state.

The IEEE 802.1Qbv standard provides controlling each of the states of transmission queues using transmission scheduling information referred to as a gate control list. The gate control list is formed of gate control entries including gate states and time intervals. The gate state includes a transmission state of each of the transmission queues. The transmission state of each transmission queue can be either open or closed. When the transmission state is open, the transmission queue is valid and transmission is allowed from the corresponding queue as long as the open state is maintained. On the contrary, when the transmission state is closed, the transmission queue is invalid and any transmission is not allowed. The time interval indicates the time for which the corresponding gate state is maintained. The gate control list is set in advance, in accordance with the application of the upper layer and/or the communication requirements of the whole network.

A plurality of transmission queues and open/close processing of the gates corresponding to the respective transmission queues are controlled, at the timing set in the gate control list. In this manner, the transmission timing from each of the transmission queues is controlled, at the timing scheduled based on the gate control list. For example, this structure enables control of the transmission state of each of the transmission queues changing with lapse of time, based on the predetermined schedule, at each of nodes on the network. This structure enables reduction in network delay and/or jitter in data transmission requiring high real-time performance, by strictly controlling timing to permit frame transmission from each of the transmission queues.

Accurate control of the time intervals with the order of several nanoseconds to several microseconds is required, to cause a transmission control method provided with the IEEE 802.1Qbv standard to function effectively. However, conventional art has difficulty in achieving such accuracy required, and performing scheduling for transmission timing control with high accuracy.

First Embodiment

Accordingly, the information processing apparatus according to the first embodiment adopts the following configuration, to achieve scheduling for transmission timing control with high accuracy.

The information processing apparatus according to the present embodiment performs transmission timing control of frames transmitted from the transmission queues, based on transmission schedule information. The present embodiment illustrates the case of using IEEE 802.1Qbv as the standard used for transmission control, as an example. However, the standard used with the information processing apparatus of the present embodiment for transmission control is not limited to IEEE 802.1Qbv.

Example of Functional Configuration

The following is a specific explanation of the information processing apparatus 10 according to the present embodiment.

FIG. 1 is a diagram illustrating an example of a functional configuration of an information processing system 1 according to the present embodiment. The information processing system 1 includes the information processing apparatus 10, and a communication apparatus 2. The information processing apparatus 10 outputs frames to the communication apparatus 2 through a network or the like.

In the present embodiment, the information processing apparatus 10 includes a host 12 and a transmission device 14. The host 12 and the transmission device 14 are connected with each other through, for example, a PCI Express and a bus.

The communication apparatus 2 is an apparatus connected with the transmission device 14. The communication apparatus 2 is, for example, a communication apparatus. The connection method of the transmission device 14 and the communication apparatus 2 may be a wireless method, or a wired method. The number of the communication apparatus 2 connected with the transmission device 14 is not limited to one, but may be two or more.

The information processing apparatus 10 may be formed of only the host 12. Specifically, the information processing apparatus 10 may have a structure in which no transmission device 14 is included. As another example, the information processing apparatus 10 may be formed of only the transmission device 14. In such a case, it suffices that the transmission device 14 is equipped with functional units of the host 12 described later. The present embodiment illustrates the case where the information processing apparatus 10 includes the host 12 and the transmission device 14, as an example.

The host 12 includes a processor 31 and a storage unit 30. The processor 31 and the storage unit 30 are connected with each other to mutually transmit and receive data and/or signals.

The processor 31 controls the whole host 12. Specifically, the processor 31 schedules the starting time of transmission for the frame (details thereof will be described later).

The processor 31 may have any specific form. The processor 31 is, for example, software, a personal computer, a server device, a dedicated large-scale integration (LSI), or a field programmable gate array (FPGA). When the processor 31 is achieved with software, the processor 31 is achieved by causing, for example, a central processing unit (CPU), or a micro-processing unit (MPU) to execute the software.

The specific application serving as a target of control with the processor 31 may be any application. Examples of the specific application include an in-vehicle system and a factory automation system. In an in-vehicle system, for example, the processor 31 controls communications requiring real-time performance, such as communications relating to various controls of automated driving. In a factory automation system, the processor 31 controls communications requiring real-time performance, such as communications of control signals of various control devices, such as a programmable logic controller (PLC) and I/O devices.

The storage unit 30 stores various types of data therein. The storage unit 30 may have any specific form. The storage unit 30 is a storage device, such as a static random access memory (SRAM), a synchronous dynamic random access memory (SDRAM), a solid state drive (SSD), a hard disk drive (HDD), and a SD card.

In the present embodiment, the storage unit 30 includes a frame storage 32, a scheduling information storage 34, an available time storage 36, and a future time storage 38.

The frame storage 32, the scheduling information storage 34, the available time storage 36, and the future time storage 38 may be formed of a plurality of physically different storage devices. As another example, the frame storage 32, the scheduling information storage 34, the available time storage 36, and the future time storage 38 may be achieved by logically dividing an area of the same storage device.

As another example, at least part of the storage unit 30 and the processor 31 may be formed as physically divided separate units. For example, the storage unit 30 may be stored in a server device connected to the network. For example, at least part of information stored in the storage unit 30 may be stored in the server device.

The frame storage 32 includes one or more transmission queues. The present embodiment illustrates the case where the frame storage 32 includes N (N is an integer of 2 or more) transmission queues (transmission queue 0 to transmission queue N−1), as an example. Each of the transmission queues stores frames therein. The frames are, for example, traffic data requiring real-time performance. The frames are transmitted to the communication apparatus 2 by processing described later.

The frame storage 32 stores frames in one of transmission queue 0 to transmission queue N−1, based on the traffic class to which the frame belongs. For example, an application of the upper layer writes a new frame to the transmission queue at any desired timing.

The scheduling information storage 34 stores transmission scheduling information 34A therein. The transmission scheduling information 34A includes information required to strictly control the timing to permit frame transmission from the transmission queue.

The transmission scheduling information 34A indicates the timing to permit frame transmission from the transmission queue, and whether frame transmission actually occurs is determined based on whether the frame has been written to the transmission queue. Specifically, whether transmission of the frame actually occurs is determined based on operation, and the like, of the application located in the upper layer.

Specifically, the transmission scheduling information 34A includes one or more entries. The present embodiment illustrates the case where the transmission scheduling information 34A includes a plurality of entries, as an example.

An entry at least contains a transmission state and interval for each of one or more transmission queues. In other words, an entry provides the transmission state of each of one or more transmission queues, and the maintaining timing of the transmission state. For example, an entry corresponds to a gate control entry provided in the IEEE 802.1Qbv standard.

The transmission state is indicated with "valid" (open) indicating that transmission is possible, or "invalid" (close) indicating that transmission is impossible. For example, the transmission state corresponds to a gate state provided in the IEEE 802.1Qbv standard.

The maintaining timing of the transmission state indicates the timing to maintain the corresponding transmission state. Specifically, the future time period is specified with a starting time and an end time of a period for which the corresponding transmission state is valid, or a starting time and a specific amount of time for which the corresponding transmission state is valid. In other words, the maintaining timing is specified with the start time and the end time of the period for which the corresponding transmission state is maintained, or the period for which the corresponding transmission state is maintained and the start time of the period. The period for which the corresponding transmission state is maintained corresponds to the time interval provided in the IEEE 802.1Qbv standard. The start time of the period corresponds to the gate control start time provided in the IEEE 802.1Qbv standard.

The present embodiment illustrates the case where the transmission scheduling information 34A includes information provided in the IEEE 802.1Qbv standard, as an example. Specifically, the present embodiment illustrates the case where the transmission scheduling information 34A includes a gate control list and other parameters, such as the gate control start time (i.e., operational value of base time), as an example. In the following explanation, the transmission state may also be referred to as a gate state, and the period for which the transmission state is maintained may also be referred to as a time interval.

Figure 2:
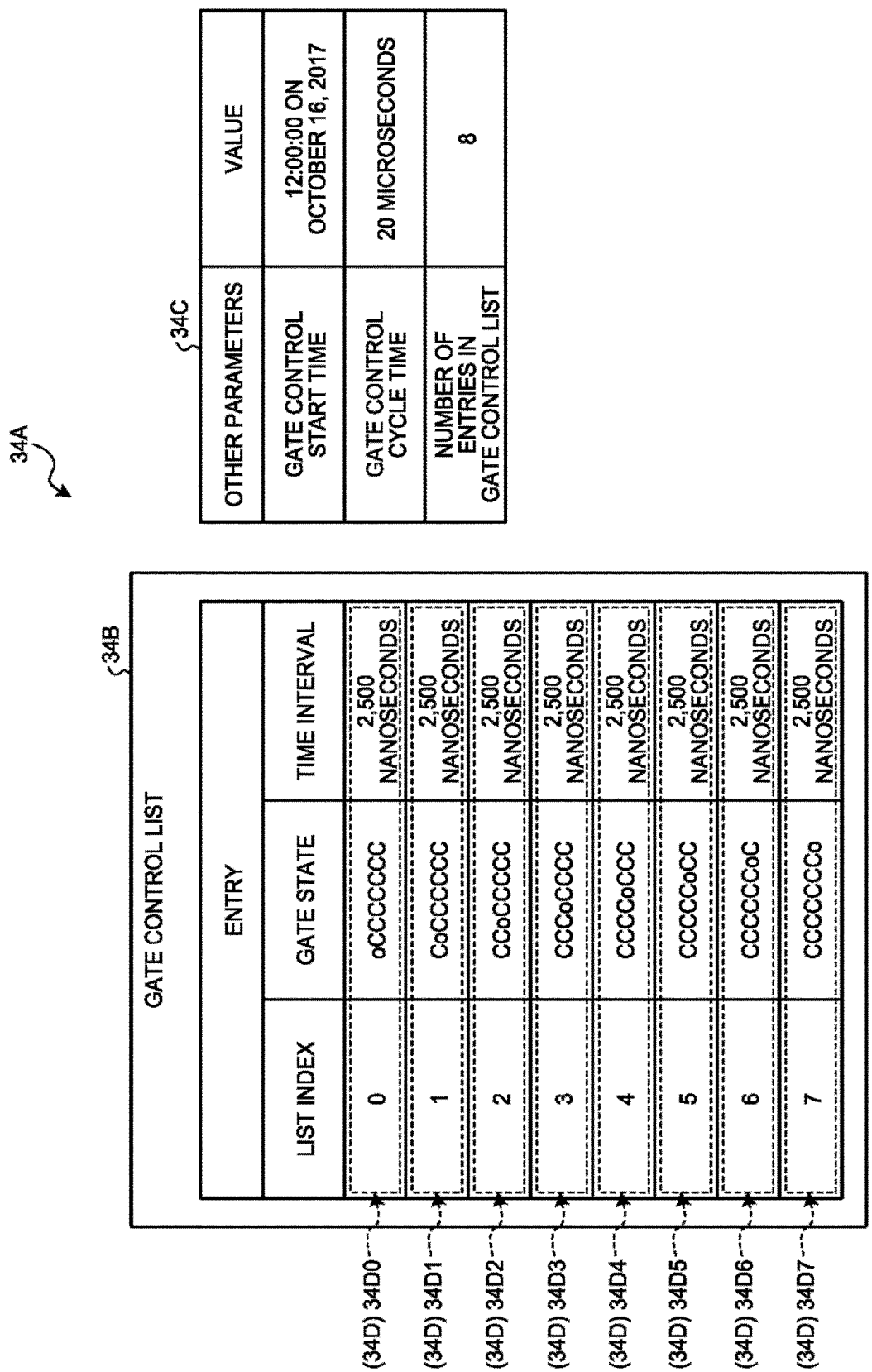
FIG. 2 is a schematic diagram illustrating a data configuration of transmission scheduling information.

FIG. 2 is a schematic diagram illustrating an example of a data configuration of the transmission scheduling information 34A.

In the present embodiment, the transmission scheduling information 34A includes a gate control list 34B and other parameters 34C.

The gate control list 34B includes a plurality of entries 34D. Each of the entries 34D includes a list index, a gate state, and a time interval. The list index is information indicating the index of the entry 34D. FIG. 2 illustrates the case where eight entries 34D (entry 34D0 to entry 34D7) are registered in the gate control list 34B, as an example.

Each of the entries 34D includes a list index, a gate state, and a time interval. As described above, the gate state indicating the transmission state indicates the transmission state for each of the transmission queues assigned to the respective traffic classes. In FIG. 2, the mark "o" expressed in the gate state indicates "valid" (open) indicating that transmission is possible, and the mark "C" indicates "invalid" (close) indicating that transmission is impossible.

Specifically, for example, the gate state "CCCCCCCo" of the entry 34D7 with the list index "7" in FIG. 2 indicates the transmission state (open or close) of each of the transmission queues in the frame storage 32. As described above, the present embodiment illustrates the case where the frame storage 32 includes eight transmission queues (transmission queue 0 to transmission queue 7). Accordingly, the gate state "CCCCCCCo" of the entry 34D7 with the list index "7" indicates that transmission queue 1 to transmission queue 7 are invalid (close), and transmission queue 0 is valid (open). The corresponding interval "2,500 nanoseconds" indicates that the period for which the transmission queue 0 is made valid is 2,500 nanoseconds.

The other parameters 34C include, for example, the gate control start time, the gate control cycle time, and the number of entries in the gate control list 34B. The gate control cycle time indicates the time for one cycle indicated in the gate control list 34B. For example, the total value of the time intervals in the gate control list 34B may be set as the gate control cycle time.

The explanation will be continued, with reference to FIG. 1 again. The future time storage 38 stores future time information 38A therein. The available time storage 36 stores available time for transmission information 36A therein.

FIG. 3 is a diagram illustrating an example of the future time information 38A and the available time for transmission information 36A.

The future time information 38A is information indicating the future time.

The future time represents a time in the very near future and serves as a candidate for the next starting time of transmission. The starting time of transmission is scheduled time at which frame transmission is started, and scheduled by processing performed with the processor 31 described later (details of the processing will be described later). The next starting time of transmission is time serving as a candidate for the starting time of transmission for the frame to be scheduled next with the scheduler unit 26 described later.

A local clock of the information processing apparatus 10 may be used as the current time. The current time may be the time synchronized between the information processing apparatus 10 and the other apparatuses, or the time synchronized in the network.

The future time is used when the starting time of transmission for the next frame is scheduled (details thereof will be described later).

The future time information 38A indicates one future time. Specifically, the term "future time" in the present embodiment indicates one future time stored in the future time storage 38. The future time is updated by processing performed with the processor 31 described later (details of the processing will be described later).

The available time for transmission information 36A is information indicating the available time for transmission for each of the transmission queues. In more detail, the available time for transmission indicates the remaining time for which the frame can be transmitted from the corresponding transmission queue. The available time for transmission is assigned to each of the transmission queues, and the value thereof changes together with change of the current time and the future time. Specifically, the available time for transmission of each of the transmission queues is updated by the processing performed with the processor 31 described later (details of the processing will be described later).

The explanation will be continued, with reference to FIG. 1 again. The following is an explanation of the processor 31. The processor 31 includes a prefetch unit 20, a schedulability evaluation unit 22, a prefetch notification unit 24, and a scheduler unit 26.

The prefetch unit 20 is configured to prefetch a scheduling entry corresponding a future time period in advance from scheduling information including one or more entries. In other words, the prefetch unit 20 prefetches the entry 34D corresponding to the future maintaining timing coming after the current time, in the transmission scheduling information 34A. In other words, the prefetch unit 20 prefetches the entry 34D serving as a target of transmission control in the future timing coming after the current time. The term "prefetching" means reading the entry 34D serving as a target of transmission control at the future time coming after the current time, in advance before the future time.

In the present embodiment, the prefetch unit 20 is configured to prefetch the next entry 34D, when the prefetch unit 20 receives a notification from the prefetch notification unit 24. IN other words, the prefetch unit 20 prefetches the next entry 34D from the scheduling information storage 34, when the prefetch unit 20 receives a prefetching instruction from the prefetch notification unit 24.

The prefetch unit 20 is configured to update a future time, which is a prospective time to schedule future transmission, and an available time for transmission for each queue at the future time, based on the prefetched entry. In other words, based on the prefetched next entry 34D, the prefetch unit 20 updates the future time serving as a candidate for the starting time of transmission of the frame to be scheduled next with the scheduler unit 26 described later, and the available time for transmission assigned to the transmission queue at the future time.

For example, the prefetch unit 20 assigns the value of the time interval included in the prefetched entry 34D, as the available time for transmission, to the transmission queue included in the prefetched entry 34D with the gate state being the valid (open) state.

There are cases where "valid" (open) indicating that transmission is possible is successively set for the same transmission queue in a plurality of entries 34D in the gate control list 34B. In such cases, the prefetch unit 20 prefetches these entries 34D. Accordingly, in such cases, the prefetch unit 20 assigns the total value of the time intervals included in the prefetched entries 34D, as the available time for transmission of the transmission queue.

The prefetch notification unit 24 is configured to notify the prefetch unit 20 to prefetch a next entry from the scheduling information. In other words, the prefetch notification unit 24 notifies the prefetch unit 20 of the prefetching instruction.

For example, the prefetch notification unit 24 is configured to send notification to the prefetch unit 20, based on an available time for transmission for each and every queue at a future time, which is a prospective time to schedule future transmission. In other words, the prefetch notification unit 24 notifies the prefetch unit 20 of the prefetching instruction, based on the available time for transmission assigned to the transmission queue at the future time.

Specifically, for example, the prefetch notification unit 24 notifies the prefetch unit 20 of the prefetching instruction, when all the values of the available time for transmission assigned to the respective transmission queues stored in the available time storage 36 are "0" at the future time stored in the future time storage 38.

In addition, the prefetch notification unit 24 may notify the prefetch unit 20 of the prefetching instruction, when the schedulability evaluation unit 22 described later determines that scheduling of each of the transmission queues is impossible.

The prefetch notification unit 24 may be configured to send notification to the prefetch unit 20, based on the available time of each queue at the future time, and a time difference between a current time and the future time. In other words, the prefetch notification unit 24 may notify the prefetch unit 20 of the prefetching instruction, based on the available time for transmission of each of the transmission queues, and a time difference between the future time and the current time.

Specifically, the prefetch notification unit 24 presets a threshold of the time difference between the future time and the current time. When the time difference between the future time and the current time is equal to or less than the threshold, the prefetch notification unit 24 notifies the prefetch unit 20 of the prefetching instruction.

As another example, the prefetch notification unit 24 may update the available time for transmission of each of the transmission queues, based on the time difference between the future time and the current time, and notify the prefetch unit 20 of the prefetching instruction.

In this case, the prefetch notification unit 24 is configured to update the available time of each queue, based on a time difference between a current time and the future time. In other words, the prefetch notification unit 24 updates the values of the available time for transmission to be assigned to the respective transmission queues at the future time, based on the time difference between the future time and the current time. For example, when there are schedulable frames, the update processing is executed as post processing after the scheduling process is executed with the scheduler unit 26 described later. In the following explanation, the update processing performed with the prefetch notification unit 24 may be referred to as second post processing.

For example, the prefetch notification unit 24 reduces the values of the available time for transmission corresponding to the respective transmission queues in the available time for transmission information 36A, when the time difference between the future time stored in the future time storage 38 and the current time is equal to or less than the threshold, and the time difference is less than the value calculated in the previous iteration. For example, the prefetch notification unit 24 reduces the available time for transmission, by subtracting a predetermined value from each of the values of the available time for transmission in the available time for transmission information 36A. The value used for subtraction may be any value satisfying the condition that the available time for transmission of each of the transmission queues is reduced to zero before the current time reaches the future time. Specifically, a predetermined fixed value may be used as the value used for the subtraction in the second post processing. As another example, a plurality of fixed values may be set in advance, and the value used for the subtraction may be dynamically selected therefrom, in accordance with the value of the time difference. As another example, the value itself used for the subtraction may be dynamically calculated. As an example, the available time for transmission may be reduced, in accordance with a difference between the threshold and the time difference.

The prefetch notification unit 24 may notify the prefetch unit 20 of the prefetching instruction, when all the values of the available time for transmission of the respective transmission queues indicated in the available time for transmission information 36A after subtraction by the second post processing becomes "0".

The following is an explanation of the schedulability evaluation unit 22.

The schedulability evaluation unit 22 is configured to evaluate each frame waiting for transmission in each queue and determine one or more schedulable frames, if any exist. In other words, the schedulability evaluation unit 22 determines a frame for which scheduling of the starting time of transmission is possible, among the frames retained in the transmission queue and waiting for transmission.

For example, the schedulability evaluation unit 22 is configured to determine whether or not each frame waiting for transmission can be schedulable, which means each frame can be transmitted within the available time of each corresponding queue at the future time. In other words, the schedulability evaluation unit 22 determines a frame with the required transmission time less than the available time for transmission assigned to the transmission queue at the future time serving as a candidate for the next starting time of transmission, among the frames retained in the transmission queue and waiting for transmission, as the frame for which scheduling of the starting time of transmission is possible.

The required transmission time is time required for transmission of the frame from a frame transmission unit 28 to the communication apparatus 2. It suffices that the schedulability evaluation unit 22 reads parameters used for calculation of the required transmission time from the frame storage 32, and calculates the required transmission time for each of the frames stored in the frame storage 32. Examples of the parameters used for calculation of the required transmission time include a frame size, presence/absence of retransmission, and/or the number and intervals of transmission retrials.

The schedulability evaluation unit 22 may determine a frame with the required transmission time less than the available time for transmission assigned to the transmission queue at the future time, among the frames retained in the transmission queue and in "transmission possible state", instead of frames waiting for transmission, as the schedulable frame. For example, any traffic shaping algorithm may be applied to a specific transmission queue, and a frame, transmission of which is permitted as a result of the application, may be regarded as a frame in "transmission possible state". For example, Credit Based Shaper provided in the IEEE 802.1Qav standard may be used, as a specific example of the traffic shaping algorithm. However, the traffic shaping algorithm is not limited to IEEE 802.1Qav.

The following is an explanation of the scheduler unit 26.

The scheduler unit 26 is configured to determine a starting time of transmission for each frame waiting for transmission in each queue, based on the prefetched entry. In other words, the scheduler unit 26 schedules the starting time of transmission for the frame retained in the transmission queue and waiting for transmission, based on the entry 34D prefetched with the prefetch unit 20.

Specifically, the scheduler unit 26 is configured to schedule a starting time of transmission for a predetermined schedulable frame. In other words, the scheduler unit 26 schedules the starting time of transmission of the frame determined with the schedulability evaluation unit 22 as a schedulable frame. More specifically, the scheduler unit 26 reads a frame determined with the schedulability evaluation unit 22 as a schedulable frame, from the frame storage 32. Thereafter, the scheduler unit 26 schedules the starting time of transmission of the read frame.

In the present embodiment, the scheduler unit 26 selects a frame serving as a scheduling target, from the frame determined with the schedulability evaluation unit 22 as a schedulable frame. When a plurality of frames exists as frames determined as schedulable frames, the scheduler unit 26 can select frames of the number equal to the number of frame transmission units 28 provided in the information processing apparatus 10. The present embodiment illustrates an example in which the information processing apparatus 10 includes one frame transmission unit 28. Accordingly, in the present embodiment, the scheduler unit 26 selects one frame as a scheduling target, from the frames determined with the schedulability evaluation unit 22 as schedulable frames. The algorithm used in the selection may be any algorithm. As specific examples of the selection algorithm, for example, a fixed-priority algorithm or a round-robin algorithm may be used. However, the algorithm is not limited thereto.

Thereafter, the scheduler unit 26 schedules the starting time of transmission for the selected frame.

For example, the scheduler unit 26 schedules the future time stored in the future time storage 38, as the starting time of transmission of the selected frame. Specifically, the scheduler unit 26 schedules the future time set or updated with the prefetch unit 20 based on the prefetched entry 34D, or updated by the first post processing (details thereof will be described later) after the previous scheduling process, as the starting time of transmission of the selected frame.

As described above, the scheduler unit 26 is capable of scheduling the starting time of transmission of each of the frames, within the range satisfying the restriction defined with the transmission scheduling information 34A.

In addition, as described above, the scheduler unit 26 schedules the starting time of transmission of the frame, based on the entry 34D prefetched with the prefetch unit 20. With this structure, the scheduler unit 26 is capable of scheduling the starting time of transmission for transmission timing control with high accuracy.

The scheduler unit 26 is configured to update the future time and the available time of each queue, using a required amount of time to transmit a scheduled frame. In other words, when the scheduler unit 26 schedules the starting time of transmission of the frame determined as a schedulable frame, the scheduler unit 26 performs first post processing, as post processing.

The first post processing is processing of updating the future time serving as a candidate for the next starting time of transmission, and the values of the available time for transmission assigned to the respective transmission queues at the future time, using the required transmission time of the scheduled frame, after scheduling.

For example, the scheduler unit 26 calculates the time obtained by adding the required transmission time of the frame for which the starting time of transmission has been scheduled to the future time stored in the future time storage 38, as the updated future time.

In addition, for example, the scheduler unit 26 calculates the time obtained by subtracting the required transmission time of the frame for which the starting time of transmission has been scheduled from each of the values of the available time for transmission assigned to the respective transmission queues stored in the available time storage 36, as the updated values of the available time for transmission.

Thereafter, the scheduler unit 26 updates the values of the available time for transmission and the future time stored in the available time storage 36 and the future time storage 38, respectively, to the calculated updated values of the available time for transmission and the updated future time. As described above, the scheduler unit 26 performs the first post processing, after scheduling the starting time of transmission.

The following is an explanation of the transmission device 14.

The transmission device 14 is, for example, a Network Interface Card (NIC). The transmission device 14 includes the frame transmission unit 28.

The frame transmission unit 28 is configured to start transmission of a frame, based on a predetermined starting time of transmission. In other words, the frame transmission unit 28 starts transmission of the frame, based on the starting time of transmission scheduled with the scheduler unit 26. In the present embodiment, the frame transmission unit 28 transmits the frame to the communication apparatus 2.

The frame transmission unit 28 starts transmission of the frame, when the transmission start condition is satisfied for the frame with the starting time of transmission scheduled with the scheduler unit 26.

The transmission start condition is, for example, a condition that the current time agrees with the starting time of transmission, a condition that the time difference between the current time and the starting time of transmission becomes less than the predetermined threshold, or a condition that the time difference between the current time and the starting time of transmission falls within a range of the predetermined threshold and the current time has passed the starting time of transmission. The following explanation illustrates the case where the transmission start condition is a condition that the current time agrees with the starting time of transmission, as an example.

Specifically, in the present embodiment, the frame transmission unit 28 performs transmission of the frame to the communication apparatus 2 when the starting time of transmission scheduled for the frame with the scheduler unit 26 agrees with the current time. In other words, the frame transmission unit 28 starts transmission of the frame for which the starting time of transmission has been scheduled when the starting time of transmission agrees with the current time.

The scheduler unit 26 and the frame transmission unit 28 may include areas in which the scheduler unit 26 and the frame transmission unit 28 can buffer the frame temporarily.

As described above, the frame transmission unit 29 starts transmission of the frame for which the starting time of transmission has been scheduled, based on the starting time of transmission scheduled with the scheduler unit 26. With this structure, the information processing apparatus 10 is capable of transmitting each of the frames to the communication apparatus 2 at the starting time of transmission that has been scheduled. Specifically, the information processing apparatus 10 according to the present embodiment is capable of guaranteeing the transmission timing of data requiring real-time communication.

The following is an explanation of an example of a process of information processing performed with the information processing apparatus 10.

Information Processing

FIG. 4 is a flowchart illustrating an example of a process of information processing performed with the information processing apparatus 10 according to the present embodiment. The information processing apparatus 10 performs prefetching process and scheduling process (Step S100) performed with the processor 31 and transmission process (Step S102) performed with the frame transmission unit 28 simultaneously in parallel.

Prefetching Process and Scheduling Process

Figure 5:
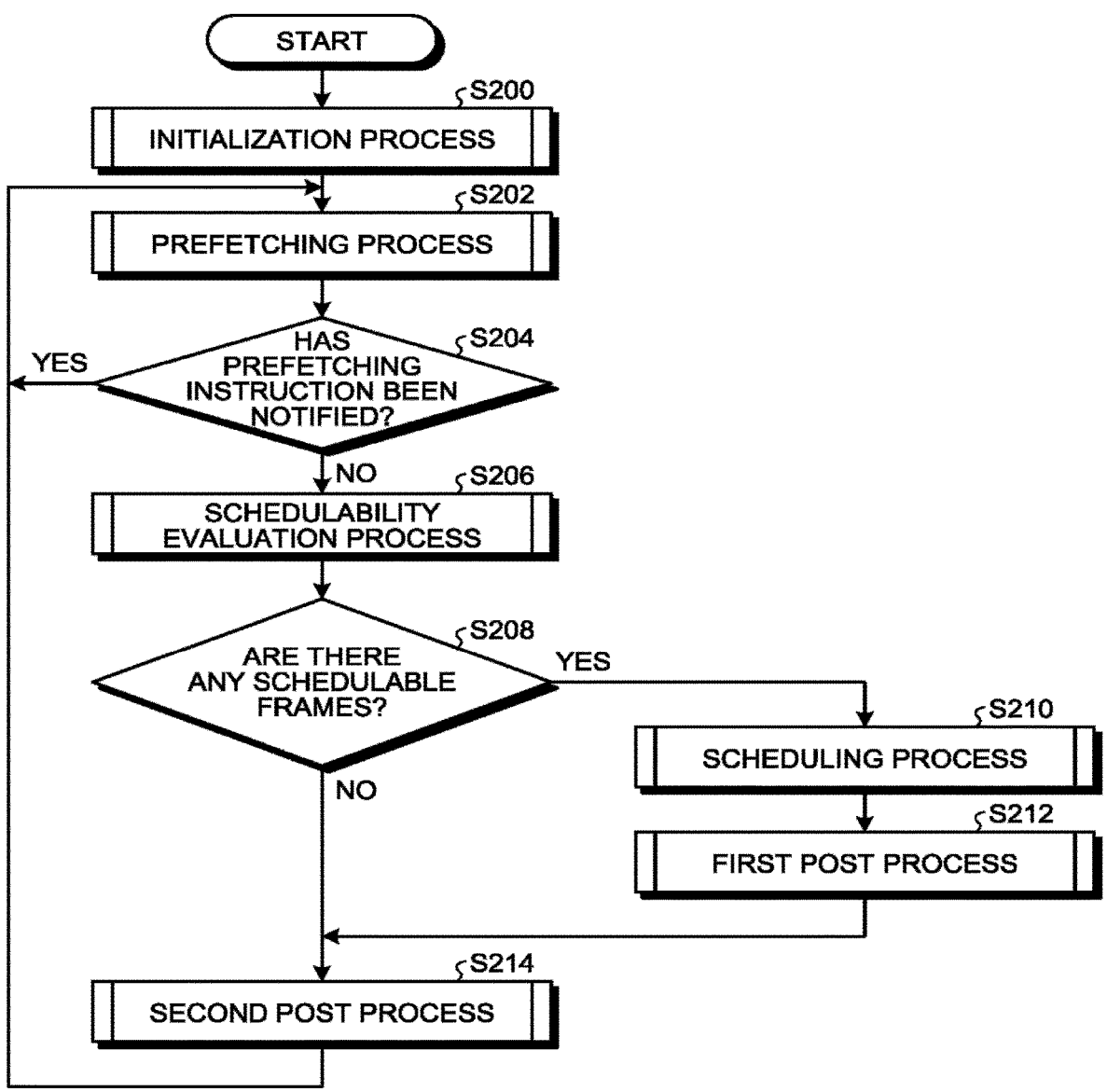
FIG. 5 is a detailed flowchart of prefetching process and scheduling process.

FIG. 5 is a detailed flowchart of the processing at Step S100 (see FIG. 4). As illustrated in FIG. 5, first, the prefetch unit 20 performs initialization processing (Step S200). At Step S200, the prefetch unit 20 calculates the available time for transmission and the future time to be used as initial values. The detailed flowchart of the initialization processing at Step S200 will be described later.

Thereafter, the prefetch unit 20 performs prefetching process (Step S202). By the processing at Step S202, the prefetch unit 20 prefetches the next entry 34D, and updates the available time for transmission and the future time. The detailed flowchart of the prefetching process at Step S202 will be described later.

Thereafter, in prefetching process at Step S202, it is determined whether a prefetching instruction has been notified from the prefetch notification unit 24 (Step S204). When it is determined that the prefetching instruction has been notified (Yes at Step S204), the process returns to Step S202.

The case where affirmative determination (Yes at Step S204) is made at Step S204 is the case where, for example, "valid" (open) indicating that transmission is possible is successively set for the same transmission queue in a plurality of entries 34D in the gate control list 34B. In such a case, the prefetch unit 20 prefetches these entries 34D, by repeating the prefetching process at Step S202.

By contrast, when it is determined that no prefetching instruction has been notified (No at Step S204), the process proceeds to Step S206. At Step S206, the schedulability evaluation unit 22 performs schedulability evaluation process (Step S206). By the schedulability evaluation process at Step S206, the schedulability evaluation unit 22 determines whether there are any schedulable frames. The detailed flowchart of the schedulability evaluation process at Step S206 will be described later.

When it is determined that there are no schedulable frames (No at Step S208) by the schedulability evaluation process at Step S206, the process proceeds to Step S214 described later. By contrast, when it is determined that there are schedulable frames (Yes at Step S208) by the schedulability evaluation process at Step S206, the process proceeds to Step S210.

At Step S210, the scheduler unit 26 performs scheduling process (Step S210). By the processing at Step S210, the scheduler unit 26 schedules the starting time of transmission for the frame. The detailed flowchart of the scheduling process at Step S210 will be described later.

Thereafter, the scheduler unit 26 performs the first post processing (Step S212). By the processing at Step S212, the scheduler unit 26 updates the future time serving as a candidate for the next starting time of transmission, and the values of the available time for transmission assigned to the respective transmission queues at the future time, using the required transmission time of the frame scheduled at Step S210. The detailed flowchart of the first post processing at Step S212 will be described later. Thereafter, the process proceeds to Step S214.

At Step S214, the prefetch notification unit 24 performs the second post processing (Step S214). By the processing at Step S214, the prefetch notification unit 24 updates the available time for transmission assigned to the transmission queue at the future time, based on the time difference between the future time and the current time. The detailed flowchart of the second post processing at Step S214 will be described later.

By the processing at Step S214, the process for one loop relating to the prefetching process and the scheduling process in the flowchart of FIG. 5 is ended. Thereafter, the process returns to Step S202 described above, and the information processing apparatus 10 repeatedly performs the above process. With the process, the information processing apparatus 10 is capable of continuously performing the prefetching process and the scheduling process.

Initialization Processing

Figure 6:
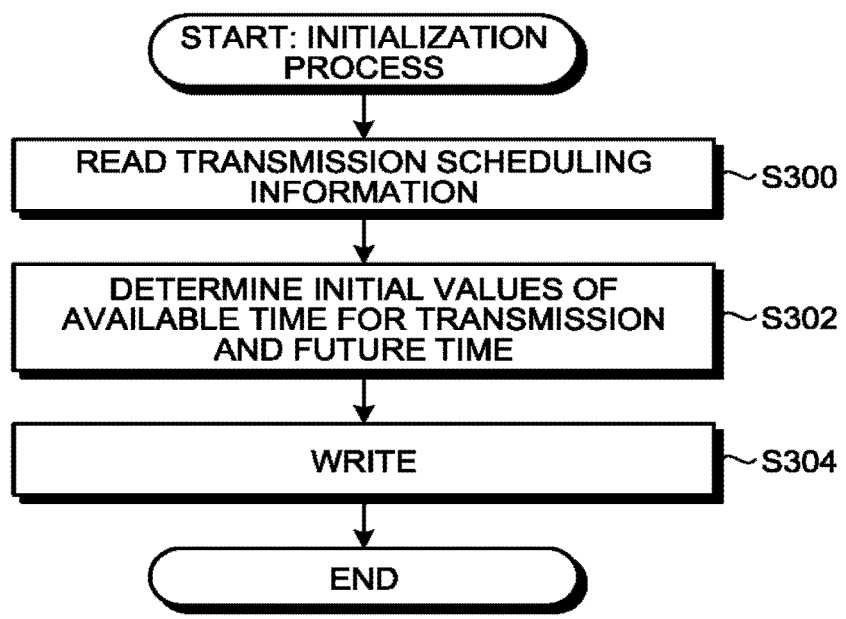
FIG. 6 is a detailed flowchart of initialization processing.
Figure 7:
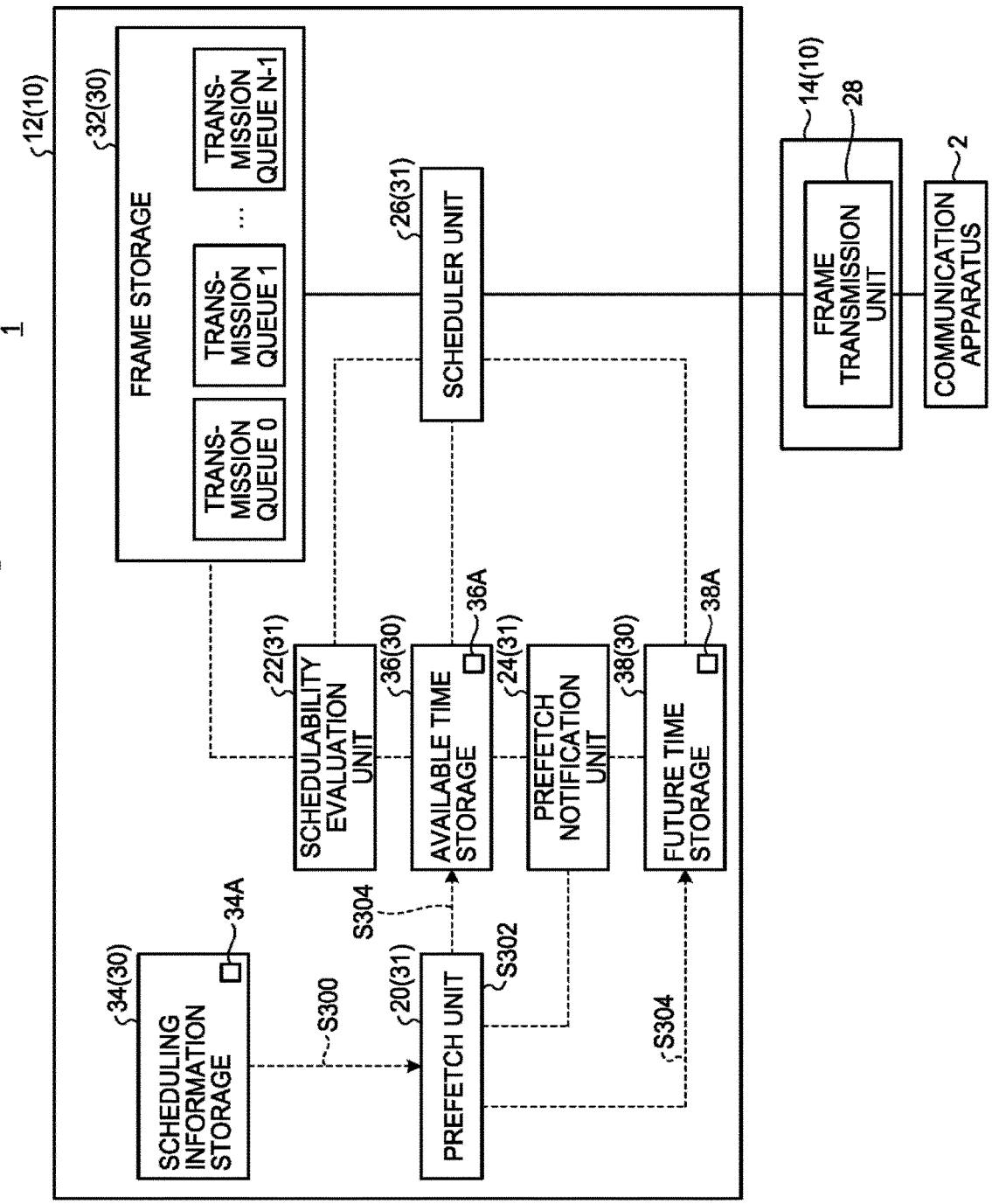
FIG. 7 is a schematic diagram illustrating a flow of the initialization processing.

FIG. 6 is a detailed flowchart of the initialization processing at Step S200 (see FIG. 5). FIG. 7 is a schematic diagram illustrating a flow of the initialization processing.

First, the prefetch unit 20 reads the transmission scheduling information 34A from the scheduling information storage 34 (Step S300). In more detail, the prefetch unit 20 reads the transmission scheduling information 34A including the gate control list 34B and the other parameters 34C (see FIG. 2).

Thereafter, the prefetch unit 20 determines the initial values of the available time for transmission and the future time using the transmission scheduling information 34A read at Step S300 (Step S302).

For example, the prefetch unit 20 sets the gate control start time (see FIG. 2) included in the other parameters 34C, as the initial value of the future time.

In addition, for example, the prefetch unit 20 sets the values of the available time for transmission assigned to the respective transmission queues at the future time, based on the gate state of the queues and the time interval included in the entry 34D.

Specifically, for example, the prefetch unit 20 specifies the entry 34D (for example, entry 34D0) on which transmission control is performed first in the gate control list 34B (see also FIG. 2). Thereafter, the prefetch unit 20 determines the time interval (for example, 2,500 nanoseconds) indicated in the entry 34D0, as the initial value of the available time for transmission, for the transmission queue (for example, transmission queue 7) for which the "valid" (open) is set in the gate state of the entry 34D0.

In addition, for example, the prefetch unit 20 sets the value "0", as the initial value of the available time for transmission, for each of the transmission queues (for example, transmission queue 6 to transmission queue 0) other than the transmission queue for which "valid" (open) is set, in the gate state of the entry 34D on which transmission control is performed first.

Thereafter, the prefetch unit 20 writes the initial values of the available time for transmission and the future time determined at Step S302, to the available time for transmission information 36A and the future time information 38A, respectively (Step S304). Thereafter, the present routine is ended.

Prefetching Process

Figure 8:
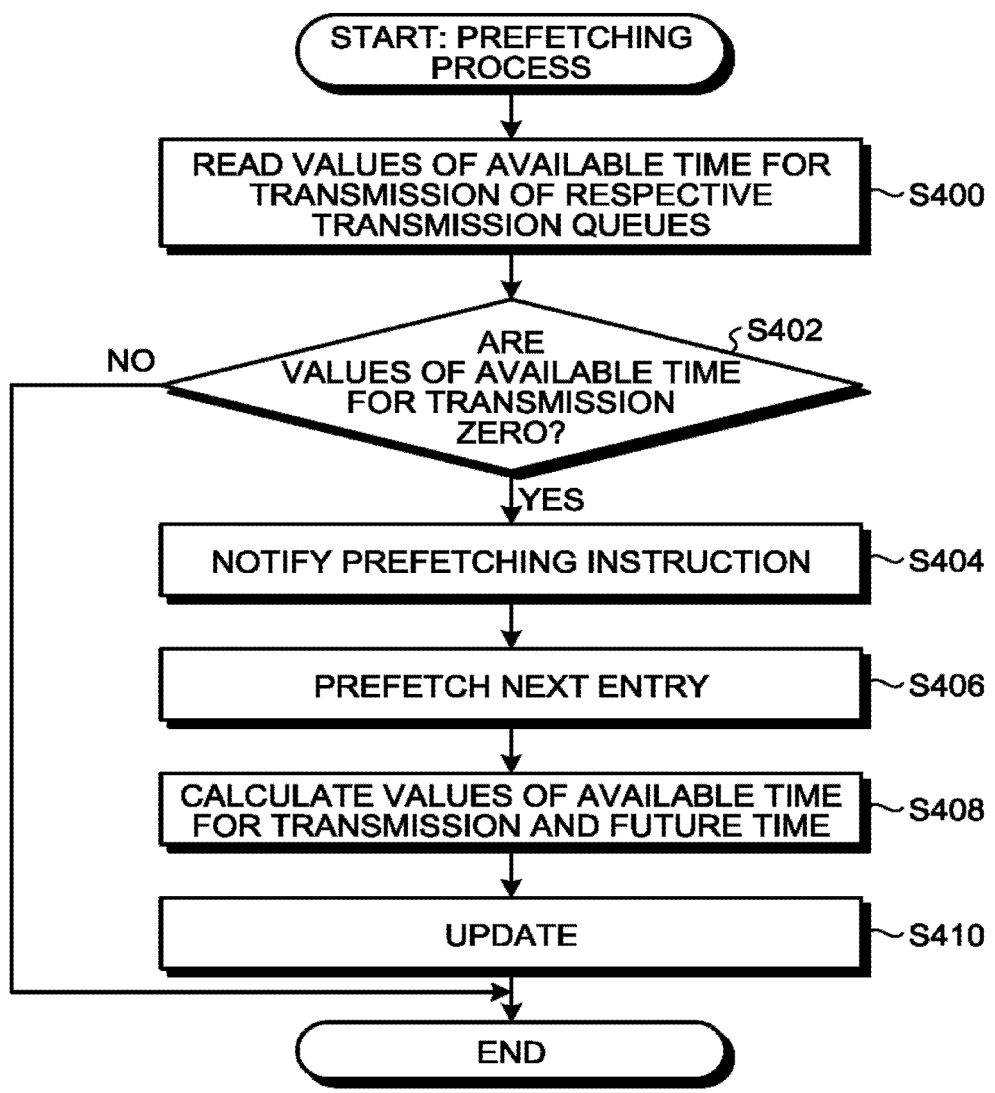
FIG. 8 is a detailed flowchart of the prefetching process.
Figure 9:
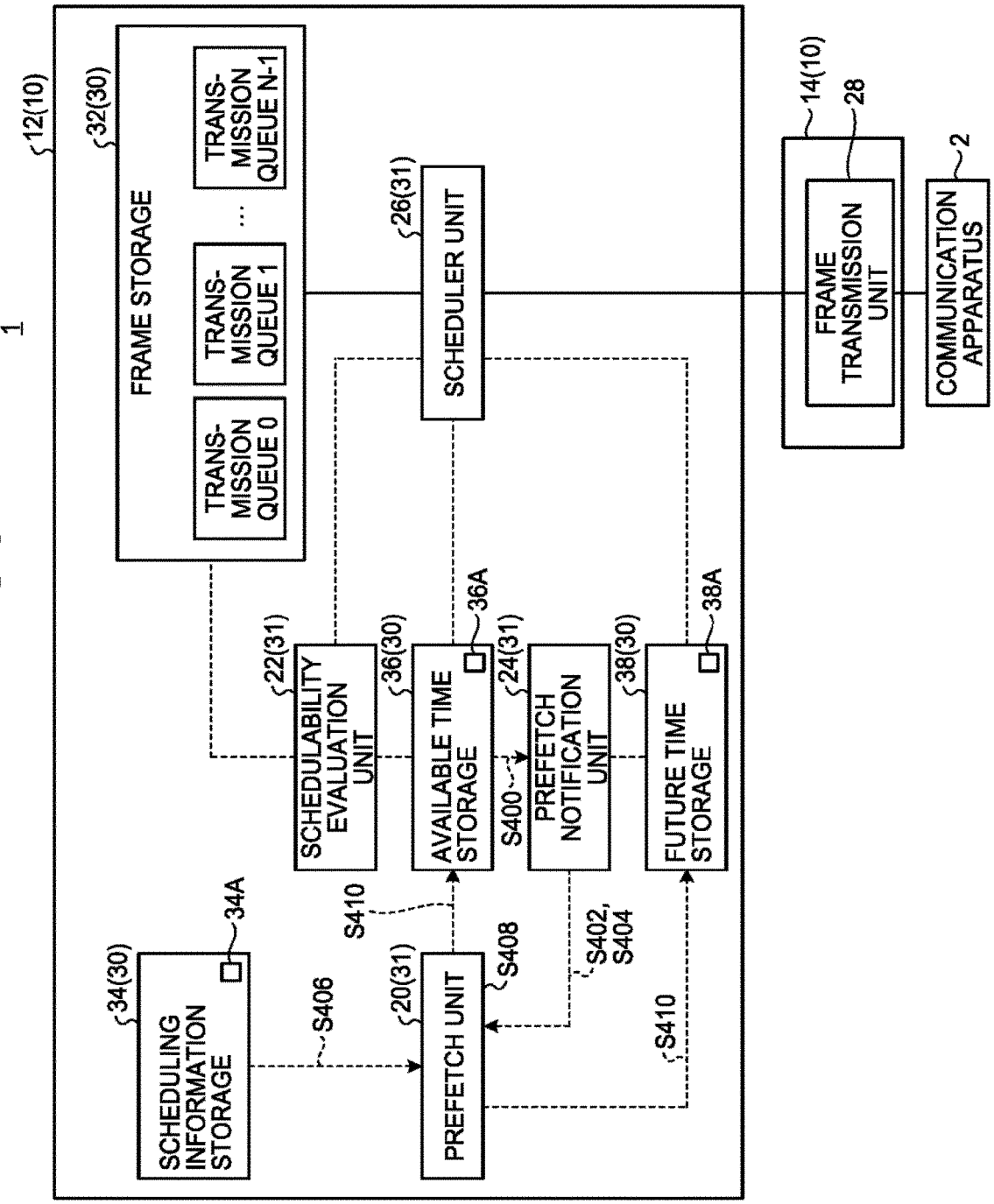
FIG. 9 is a schematic diagram illustrating a flow of the prefetching process.

FIG. 8 is a detailed flowchart of the prefetching process at Step S202 (see FIG. 5). FIG. 9 is a schematic diagram illustrating a flow of the prefetching process.

First, the prefetch notification unit 24 reads the values of the available time for transmission assigned to the respective transmission queues from the available time storage 36 (Step S400).

Thereafter, the prefetch notification unit 24 determines whether the values of the available time for transmission read at Step S400 are "0" (Step S402). Specifically, the prefetch notification unit 24 determines whether the remaining time for which the frame can be transmitted is zero for each of the transmission queues. The expression that the remaining time is zero means that no remaining time is left.

When the prefetch notification unit 24 determines that the available time for transmission remains for any of the transmission queues (No at Step S402), the present routine is ended. By contrast, when the prefetch notification unit 24 determines that the available time for transmission is zero for all the transmission queues (Yes at Step S402), the process proceeds to Step S404.

The present embodiment illustrates the case where the value "0" is set, as the available time for transmission, for the transmission queues other than the transmission queue for which "valid" (open) is set. Specifically, the available time for transmission of each of the transmission queues set to "invalid" (close) is "0". Accordingly, when the prefetch notification unit 24 determines that all the values of the available time for transmission assigned to all the respective transmission queues registered in the available time for transmission information 36A are "0", the prefetch notification unit 24 makes affirmative determination (Yes at Step S402) at Step S402.

At Step S404, the prefetch notification unit 24 notifies the prefetch unit 20 of a prefetching instruction (Step S404). Specifically, the prefetch notification unit 24 notifies the prefetch unit 20 of the prefetching instruction, when no available time for transmission remains for the transmission queues at the future time stored in the available time storage 36.

The prefetch unit 20 that has received the prefetching instruction prefetches the next entry 34D from the scheduling information storage 34 (Step S406). The next entry 34D is the entry 34D following the entry 34D processed immediately before, in the gate control list 34B. The order of the prefetching process is indicated, for example, with the values expressed in the list index. In the initial state, it suffices that the prefetch unit 20 prefetches the entry 34D (for example, entry 34D0 in FIG. 2) listed first in the list index.

Thereafter, the prefetch unit 20 calculates the future time serving as a candidate for the starting time of transmission of the frame to be scheduled next, and the available time for transmission assigned to the transmission queue at the future time (Step S408), based on the next entry 34D prefetched at Step S404 (Step S408).

For example, the prefetch unit 20 may calculates the start time of the entry 34D prefetched at Step S406, as the updated future time to be stored in the future time storage 38.

In addition, for example, the prefetch unit 20 calculates the value of the time interval included in the entry 34D prefetched at Step S406, as the available time for transmission to be assigned to the transmission queue for which "valid" (open) is set, indicated in the gate state of the entry 34D. When the prefetch unit 20 prefetches a plurality of entries 34D, it suffices that the prefetch unit 20 calculates the total value of the time intervals included in the respective prefetched entries 34D, as the available time for transmission.

Thereafter, the prefetch unit 20 writes the available time for transmission and the future time calculated at Step S408 to the available time for transmission information 36A and the future time information 38A, respectively. By the writing, the prefetch unit 20 updates the available time for transmission and the future time in the available time for transmission information 36A and the future time information 38A (Step S410).

Specifically, the prefetch unit 20 updates the future time, by writing the future time calculated at Step S408 over the future time information 38A of the future time storage 38. The prefetch unit 20 also assigns the available time for transmission calculated at Step S408 to the transmission queue corresponding to the available time for transmission. Thereafter, the present routine is ended.

Schedulability Evaluation Process

Figure 10:
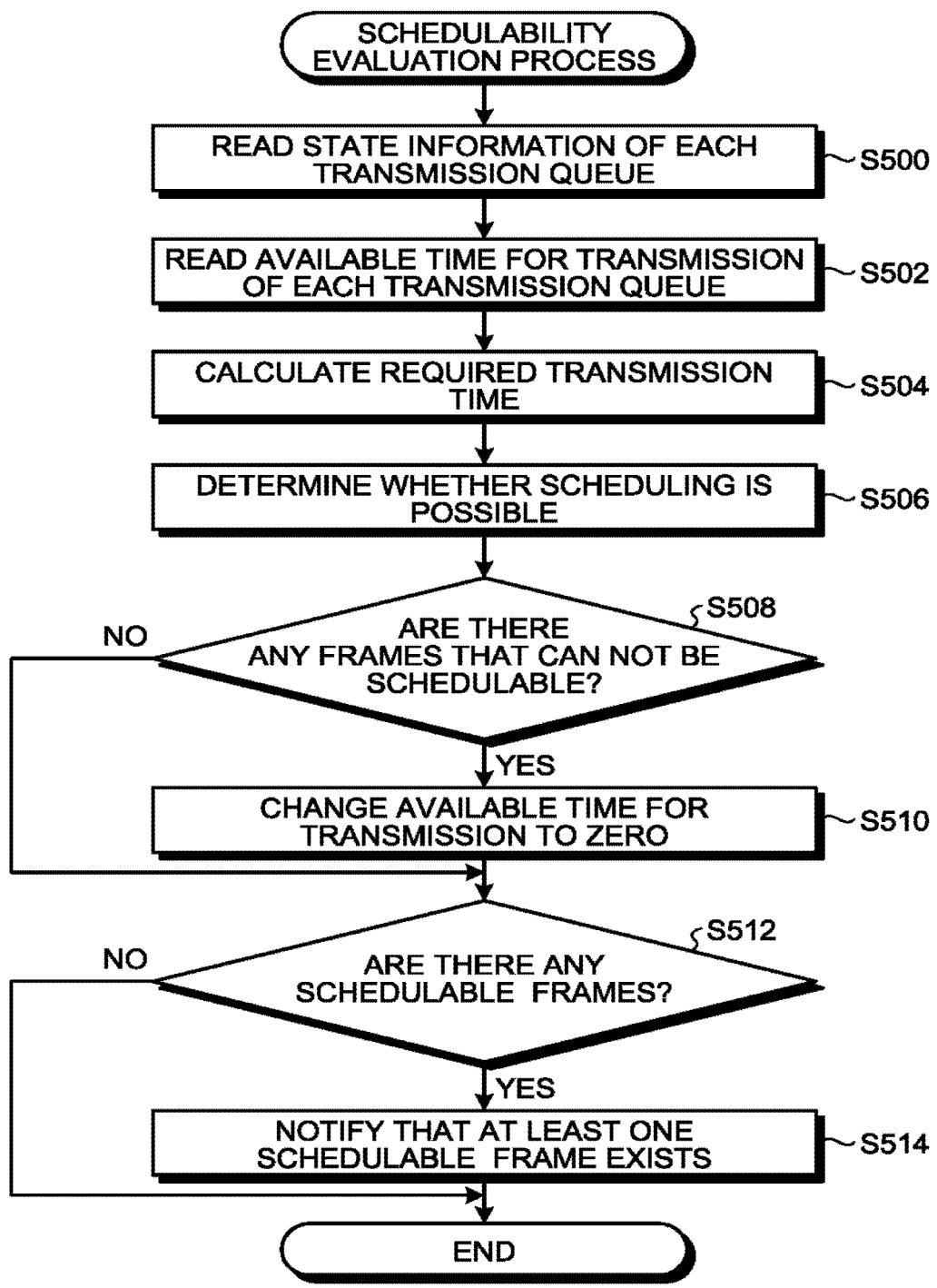
FIG. 10 is a detailed flowchart of schedulability evaluation process.
Figure 11:
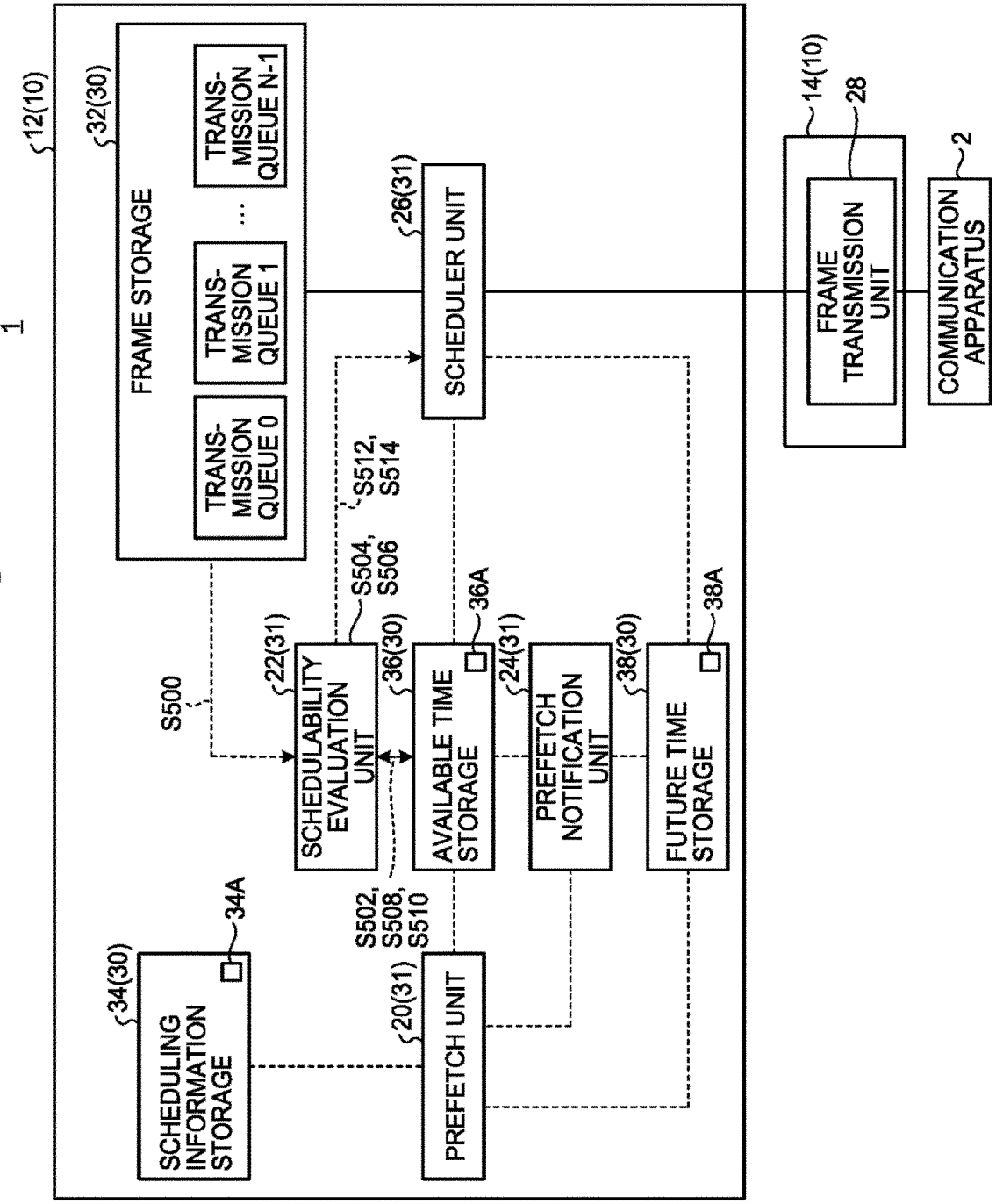
FIG. 11 is a schematic diagram illustrating a flow of the schedulability evaluation process.

FIG. 10 is a detailed flowchart of the schedulability evaluation process at Step S206 (see FIG. 5). FIG. 11 is a schematic diagram illustrating a flow of the schedulability evaluation process.

First, the schedulability evaluation unit 22 reads state information of each of the transmission queues from the frame storage 32 (Step S500).

The state information is parameters used for determination of presence/absence of the frame retained in the transmission queue and waiting for transmission, and calculation of the required transmission time of the frame retained in each of the transmission queues. Examples of the state information include a frame size, presence/absence of retransmission, and/or the number and intervals of transmission retrials.

The schedulability evaluation unit 22 may read state information further including information used for determination of priorities of the respective transmission queues, in preparation for the case where a plurality of frames for which scheduling of the starting time of transmission is possible exist. The information used for determination of priorities of the respective transmission queues may be, for example, preset fixed values, or dynamically changing values. Specifically, the information used for determination of priorities of the respective transmission queues may be values corresponding to traffic classes of the respective transmission queues indicated in the IEEE 802.1Qbv standard.

Thereafter, the schedulability evaluation unit 22 reads the values of the available time for transmission assigned to the respective transmission queues from the available time storage 36 (Step S502). Specifically, the schedulability evaluation unit 22 reads the values of the available time for transmission assigned to the respective transmission queues at the future time stored in the future time storage 38, from the available time storage 36.

Thereafter, the schedulability evaluation unit 22 calculates the required transmission time for each of the frames retained in each of the transmission queues using the state information read at Step S500 (Step S504).

Thereafter, the schedulability evaluation unit 22 determines whether scheduling of the starting time of transmission is possible, for each of the frames retained in the transmission queue and waiting for transmission (Step S506). For example, the schedulability evaluation unit 22 determines a frame with the required transmission time that is calculated at Step S504 and is less than the available time for transmission read at Step S502, among the frames retained in the transmission queue and waiting for transmission, as a frame for which scheduling of the starting time of transmission is possible. Specifically, when the required transmission time of the frame is equal to or less than the available time for transmission assigned to the transmission queue, the schedulability evaluation unit 22 determines the frame as a schedulable frame.

Thereafter, the schedulability evaluation unit 22 determines whether there are any frames that can not be schedulable (Step S508). The schedulability evaluation unit 22 performs determination at Step S508, by determining whether the determination result at Step S506 includes a frame that can not be schedulable.

When the schedulability evaluation unit 22 determines that there are no frames that can not be schedulable (No at Step S508), the process proceeds to Step S512.

By contrast, when the schedulability evaluation unit 22 determines that there are frames that can not be schedulable (Yes at Step S508), the process proceeds to Step S510. At Step S510, the schedulability evaluation unit 22 changes the available time for transmission assigned to the transmission queue retaining the frame for which it is determined that scheduling of the frame is impossible to "0", in the available time for transmission information 36A (see FIG. 3) (Step S510).

Specifically, the processing at Step S510 is performed, when the required transmission time exceeds the available time for transmission assigned to the transmission queue. With this structure, the schedulability evaluation unit 22 is capable of suppressing scheduling of the erroneous starting time of transmission for the frame, transmission of which is not completed within the available time for transmission. This structure enables the information processing apparatus 10 to perform transmission control satisfying, for example, restriction of the guard band defined in the IEEE 802.1Qbv standard.

Thereafter, the schedulability evaluation unit 22 determines whether there are schedulable frames (Step S512). The schedulability evaluation unit 22 performs determination at Step 3512, by determining whether the determination result at Step S506 includes a schedulable frame.

When the schedulability evaluation unit 22 determines that there are no schedulable frames (No at Step S512), the present routine is ended. By contrast, when the schedulability evaluation unit 22 determines that there are schedulable frames (Yes at Step S512), the process proceeds to Step S514.

At Step S514, the schedulability evaluation unit 22 notifies the scheduler unit 26 that at least one schedulable frame exists (Step S514). Thereafter, the present routine is ended.

Scheduling Process

Figure 12:
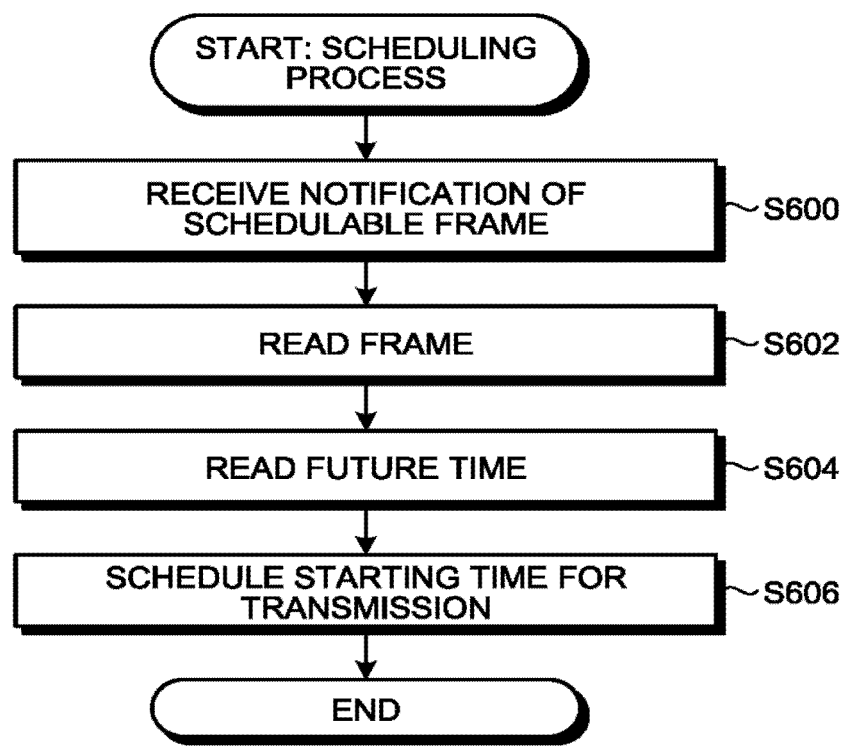
FIG. 12 is a detailed flowchart of the scheduling process.
Figure 13:
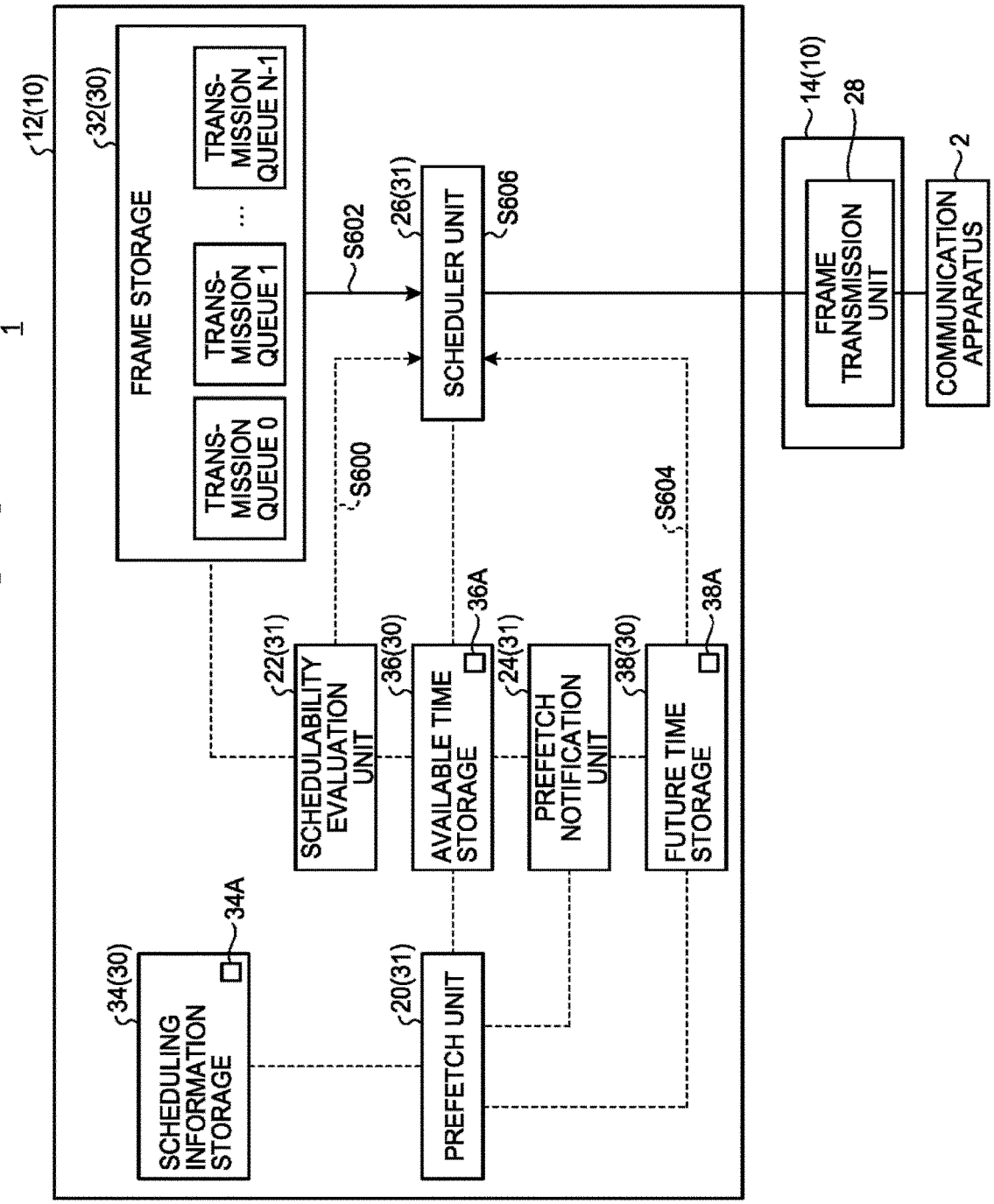
FIG. 13 is a schematic diagram illustrating a flow of the scheduling process.

FIG. 12 is a detailed flowchart of the scheduling process at Step S210 (see FIG. 5). FIG. 13 is a schematic diagram illustrating a flow of the scheduling process.

The scheduler unit 26 receives a notification of the schedulable frame from the schedulability evaluation unit 22 (Step S600).

Specifically, the scheduler unit 26 receives information, such as the transmission queue retaining the schedulable frame, the address retaining the frame, and the frame size, from the schedulability evaluation unit 22. At this step, the scheduler unit 26 may further receive the required transmission time of the frame calculated with the schedulability evaluation unit 22. When there are a plurality of schedulable frames, the scheduler unit 26 may receive a notification of each of the frames from the schedulability evaluation unit 22. The scheduler unit 26 may further receive information relating to the priorities of the transmission queues retaining the respective frames, from the schedulability evaluation unit 22.

Thereafter, the scheduler unit 26 reads the schedulable frame and received at Step S600 from the frame storage 32 (Step S602). There are cases where a plurality of schedulable frames are notified. In such cases, the scheduler unit 26 may be configured to select a schedulable frame from one or more schedulable frames, and schedule a starting time of transmission for the selected frame. In other words, the scheduler unit 26 may select the frame to be read, or select the frame in accordance with an instruction received from the schedulability evaluation unit 22.

Thereafter, the scheduler unit 26 reads the future time from the future time storage 38 (Step S604).

Thereafter, the scheduler unit 26 schedules the starting time of transmission of the frame read at Step S602, based on the future time read at Step S604 (Step S606). As described above, for example, the scheduler unit 26 schedules the future time read at Step S604, as the starting time of transmission of the frame read at Step S602. Thereafter, the present routine is ended.

First Post Processing

Figure 14:
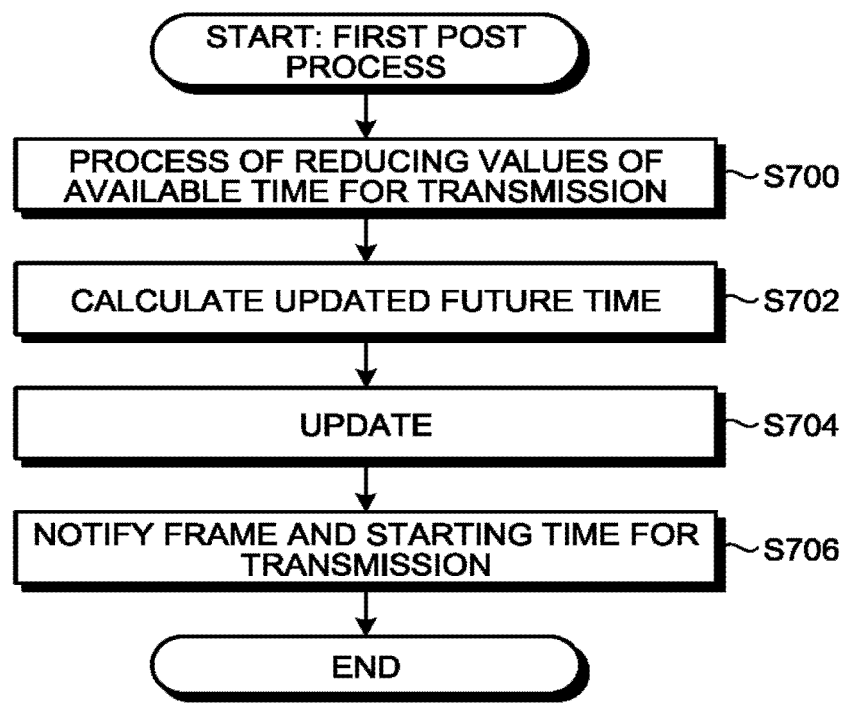
FIG. 14 is a detailed flowchart of first post processing.
Figure 15:
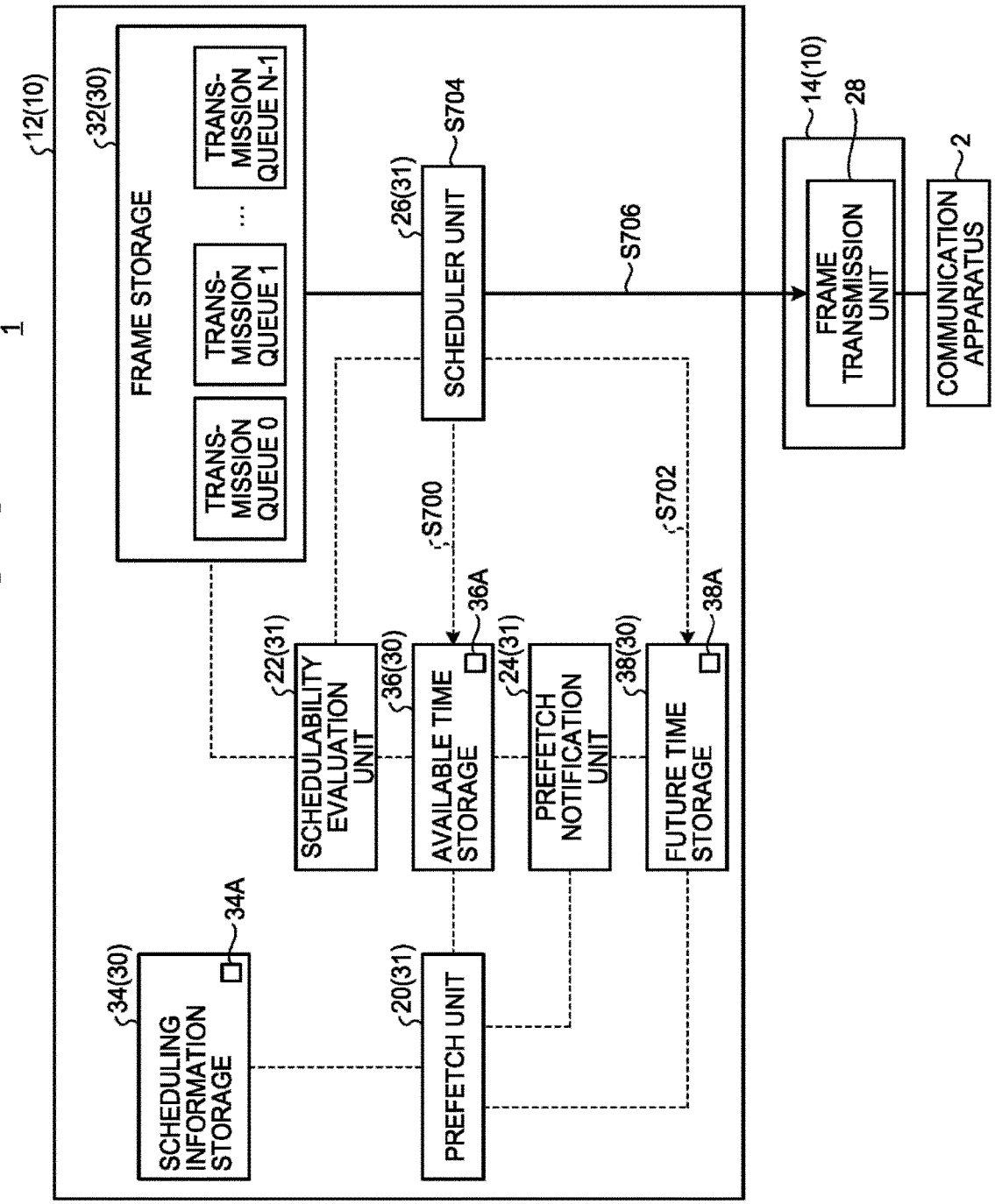
FIG. 15 is a schematic diagram illustrating a flow of the first post processing.

FIG. 14 is a detailed flowchart of the first post processing at Step S212 (see FIG. 5). FIG. 15 is a schematic diagram illustrating a flow of the first post processing.

First, the scheduler unit 26 executes process of reducing the values of the available time for transmission assigned to the respective transmission queues retained in the available time storage 36 (Step S700).

For example, the scheduler unit 26 calculates the time obtained by subtracting the required transmission time of the frame for which the starting time of transmission is scheduled by the scheduling process performed immediately before from each of the values of the available time for transmission assigned to the respective transmission queues stored in the available time storage 36.

The value subtracted from the available time for transmission before update is not limited to the required transmission time. For example, the scheduler unit 26 may use a value corresponding to the required transmission time as the value to be subtracted. For example, the scheduler unit 26 may adjust the value to be subtracted, based on the overhead caused by the frame transmission unit 28 and the protocol processing of the physical layer, and the like. The overhead is, for example, a preamble in transmitting Ethernet frames, or an interframe gap. The scheduler unit 26 may adjust the reduction value, for the purpose of providing a safety margin.

Thereafter, the scheduler unit 26 calculates the updated future time (Step S702). Specifically, the scheduler unit 26 calculates the updated future time, to update the future time stored in the future time storage 38 to the time further advanced to the future.

For example, the scheduler unit 26 calculates the time obtained by adding the required transmission time of the frame scheduled by the scheduling process performed immediately before to the future time stored in the future time storage 38, as the updated future time.

The value to be added to the future time before update is not limited to the required transmission time. For example, the scheduler unit 26 may use a value corresponding to the required transmission time, as the value to be added. As another example, the scheduler unit 26 may calculate the time obtained by adding the required transmission time of the frame to the starting time of transmission of the frame scheduled by the scheduling process performed immediately before, as the updated future time.

As another example, the scheduler unit 26 may adjust the updated future time, based on the overhead caused by the frame transmission unit 28 and the protocol processing of the physical layer, and the like.

The scheduler unit 26 writes the values of the available time for transmission calculated at Step S700 and the future time calculated at Step S702 to the available time for transmission information 36A and the future time information 38A, respectively. By the processing, the scheduler unit 26 updates the values of the available time for transmission and the future time (Step S704).

Thereafter, the scheduler unit 26 notifies the frame transmission unit 28 of the frame for which the starting time of transmission has been scheduled by the scheduling process performed immediately before and the starting time of transmission scheduled for the frame (Step S706). Thereafter, the present routine is ended.

Second Post Processing

Figure 16:
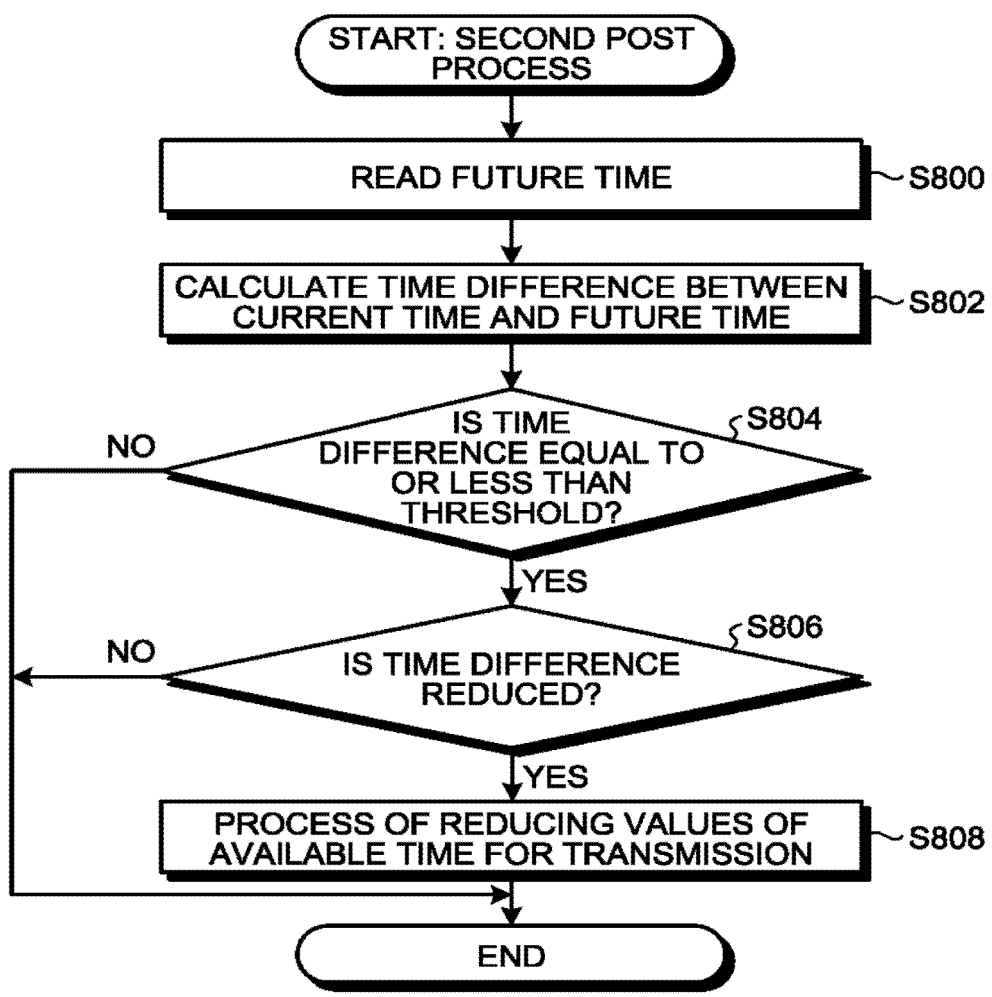
FIG. 16 is a detailed flowchart of second post processing.
Figure 17:
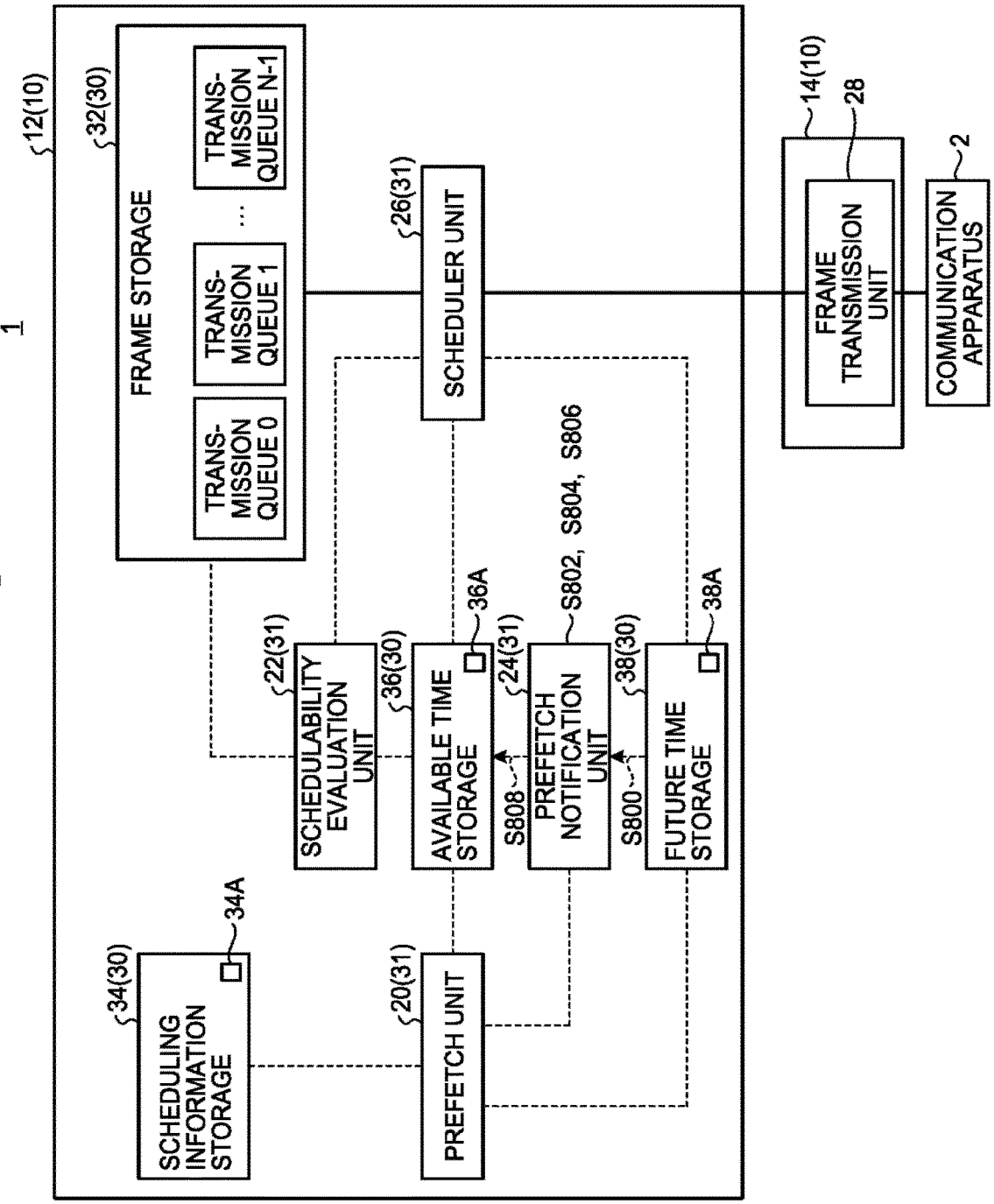
FIG. 17 is a schematic diagram illustrating a flow of the second post processing.

FIG. 16 is a detailed flowchart of the second post processing at Step S214 (see FIG. 5). FIG. 17 is a schematic diagram illustrating a flow of the second post processing.

First, the prefetch notification unit 24 reads the future time from the future time storage 38 (Step S800). Thereafter, the prefetch notification unit 24 calculates the time difference between the future time read at Step S800 and the current time (Step S802).

Thereafter, the prefetch notification unit 24 determines whether the time difference calculated at Step S802 is equal to or less than the threshold (Step S804). For example, a predetermined fixed value may be used as the threshold, or a value dynamically changing in execution may be used. As another example, a plurality of thresholds may be set. Even when any threshold is set, the time difference decreases as the current time becomes closer to the future time, and the time difference becomes equal to or less than the threshold, at the time when the current time exceeds a certain time.

When the time difference is more than the threshold (No at Step S804), the present routine is ended. By contrast, when the time difference is equal to or less than the threshold (Yes at Step S804), the process proceeds to Step S806.

At Step S806, the prefetch notification unit 24 determines whether the time difference calculated at Step S802 is less than the value calculated in the previous iteration. Specifically, the prefetch notification unit 24 determines whether the time difference has been reduced (Step S806). When the time difference has not been reduced (No at Step S806), the present routine is ended. By contrast, when the time difference has been reduced (Yes at Step 3806), the process proceeds to Step S808.

At Step S808, the prefetch notification unit 24 reduces the values of the available time for transmission corresponding to the respective transmission queues in the available time for transmission information 36A (Step S808). Thereafter, the present routine is ended.

As described above, the future time is updated to a proper value, when scheduling of a new frame is performed or prefetching of the entry 34D in the transmission scheduling information 34A is performed. Accordingly, when a state in which neither scheduling nor prefetching is performed is continued, update of the future time is stopped. By contrast, the current time gradually becomes closer to the future time, as the time lapses. In this manner, there are cases where the time difference between the current time and the future time becomes equal to or less than the threshold used for determination at Step S804. Accordingly, in the present embodiment, the prefetch notification unit 24 forcibly reduces the values of the available time for transmission of the respective transmission queues registered in the available time for transmission information 36A, as described above (see Step S808 described above).

The processing reduces the values of the available time for transmission of the respective transmission queues, before the current time reaches the future time, even in the case where the schedulability evaluation unit 22 determines that there are no schedulable frames.

As described above, when the available time for transmission of each of the transmission queues becomes "0", the prefetch unit 20 that has received a prefetching instruction from the prefetch notification unit 24 prefetches the next entry 34D, and updates the future time stored in the future time storage 38. With this structure, a certain margin can always be secured between the future time and the current time.

Transmission Process

Figure 18:
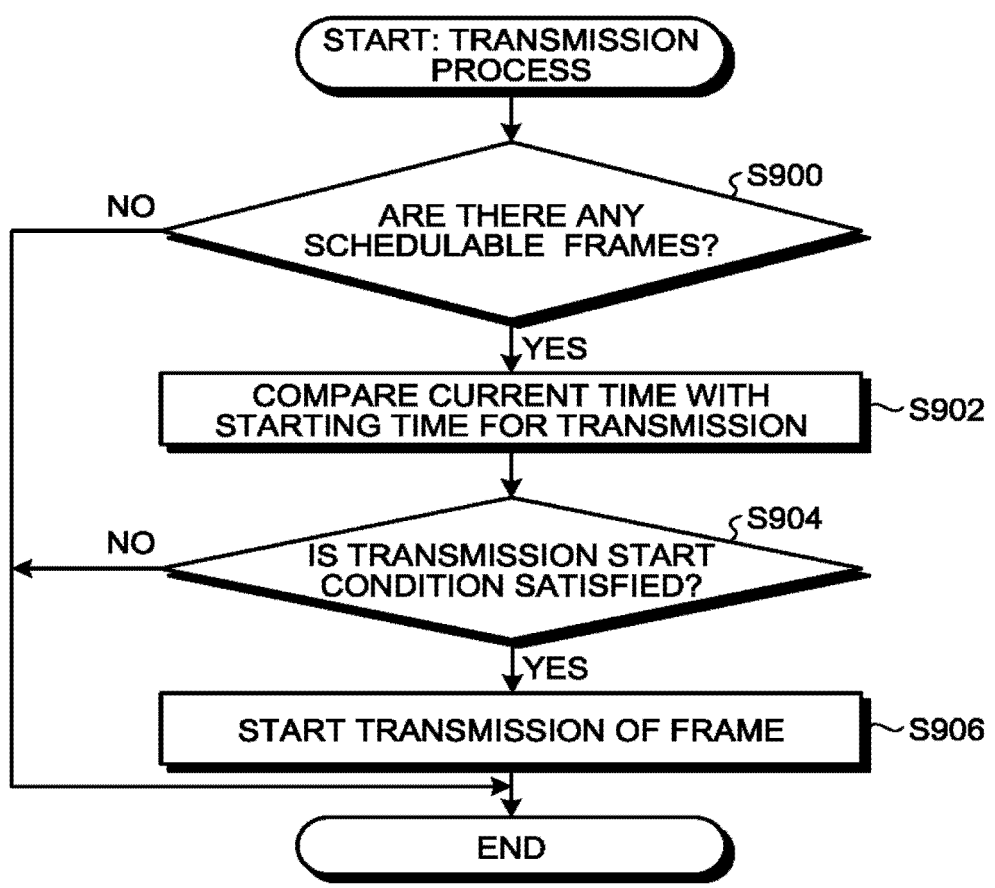
FIG. 18 is a detailed flowchart of transmission process.
Figure 19:
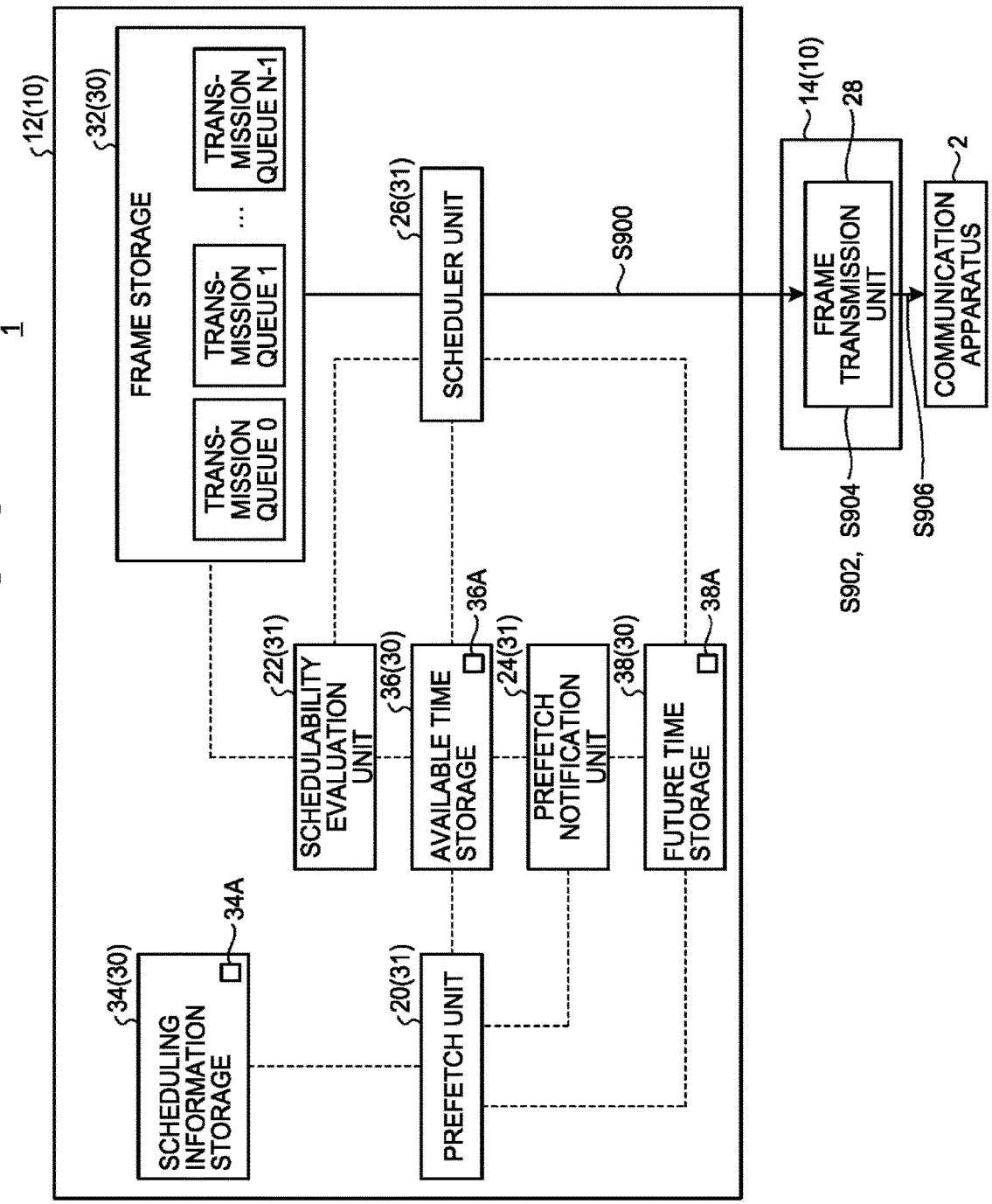
FIG. 19 is a schematic diagram illustrating a flow of the transmission process.

FIG. 18 is a detailed flowchart of the transmission process at Step S102 (see FIG. 4). FIG. 19 is a schematic diagram illustrating a flow of the transmission process.

The frame transmission unit 28 determines whether there are scheduled frames (Step S900). For example, the frame transmission unit 28 performs determination at Step S900, by determining whether it has received a notification of the frame for which scheduling has been completed and the starting time of transmission from the scheduler unit 26. The frame transmission unit 28 may buffer the frame and the starting time of transmission received from the scheduler unit 26.

When there are no scheduled frames (No at Step S900), the present routine is ended. By contrast, when there are scheduled frames (Yes at Step S900), the process proceeds to Step S902.

At Step S902, the frame transmission unit 28 compares the current time with the starting time of transmission (Step S902). The current time used in the frame transmission unit 28 is the same as the current time used in the host 12. The frame transmission unit 28 determines whether a result of comparison at Step S902 satisfies the transmission start condition (Step S904). An explanation of the transmission start condition is omitted herein, because it has been described above. For example, the frame transmission unit 28 determines whether the current time agrees with the starting time of transmission.

When the transmission start condition is satisfied (Yes at Step S904), the frame transmission unit 28 starts transmission of the frame, for the frame for which the starting time of transmission has been scheduled (Step S906).

For example, the frame transmission unit 28 starts transmission of the frame, when the current time agrees with the starting time of transmission. As another example, the frame transmission unit 28 may start transmission of the frame, when the current time has passed the starting time of transmission. The frame transmission unit 28 may start transmission of the frame, when the current time has passed the starting time of transmission and the time difference between the current time and the starting time of transmission is equal to or less than the predetermined value.

The frame transmission unit 28 may cancel transmission of the frame, when the current time has passed the starting time of transmission and the time difference between the current time and the starting time of transmission is more than the predetermined value. In this case, the frame transmission unit 28 may perform any exception processing for the frame for which transmission has been canceled. Specifically, the frame transmission unit 28 may discard the frame for which transmission has been canceled, or put the frame again into the transmission queue of the frame storage 32. In this case, the frame transmission unit 28 may notify the upper application of information relating to the frame for which transmission has been canceled.

Thereafter, the present routine is ended. The transmission device 14 repeatedly performs the transmission process illustrated in FIG. 18. Specifically, after negative determination is made at Step S900 (No at Step S900), negative determination is made at Step S904 (No at Step S904), or the processing at Step S906 is ended, the process returns to Step S900 again, to repeatedly perform the process from Step S900 to Step S906. This structure enables the transmission device 14 to repeatedly perform the transmission process continuously.

As described above, the information processing apparatus 10 according to the present embodiment includes the prefetch unit 20 and the scheduler unit 26. The prefetch unit 20 prefetches the entry 34D corresponding to the maintaining timing coming in the future after the current time, in the transmission scheduling information 34A including one or more entries 34D each providing the transmission state (gate state) of each of one or more transmission queues and the maintaining timing of the transmission state. The scheduler unit 26 schedules the starting time of transmission of the frame retained in the transmission queue and waiting for transmission, based on the prefetched entry 34D.

As described above, the information processing apparatus 10 according to the present embodiment has the structure in which the scheduler unit 26 schedules the starting time of transmission of the frame, based on the entry 34D prefetched with the prefetch unit 20, in the transmission scheduling information 34A.

Accordingly, the information processing apparatus 10 according to the present embodiment enables scheduling for transmission timing control with high accuracy.

In addition, the frame transmission unit 28 starts transmission of the frame, based on the starting time of transmission scheduled with the scheduler unit 26. This structure enables the information processing apparatus 10 according to the present embodiment to achieve strict transmission control, based on the transmission scheduling information 34A, in addition to the effect described above. Specifically, the information processing apparatus 10 according to the present embodiment is capable of guaranteeing the transmission timing of data requiring real-time communication, in addition to the effect described above.

In addition, the information processing apparatus 10 according to the present embodiment is capable of achieving at least part of the functions (prefetch unit 20, schedulability evaluation unit 22, prefetch notification unit 24, and scheduler unit 26) of the processor 31 with software.

With this structure, the information processing apparatus 10 according to the present embodiment is capable of providing the information processing apparatus 10 capable of being flexibly compatible with improvement and changes, in comparison with the case of achieving all the functions of the processor 31 with hardware. In addition, the information processing apparatus 10 according to the present embodiment is capable of achieving complicated scheduling process, and achieving reduction in difficulty in design and implementation, and reduction in required hardware resources. The information processing apparatus 10 according to the present embodiment also enables combination of any traffic shaping algorithm (such as Credit Based Shaper of IEEE 802.1Qav) and transmission control by gate control of the IEEE 802.1Qbv standard.

In addition, the information processing apparatus 10 according to the present embodiment has the structure in which the prefetch unit 20 prefetches the entry 34D, the scheduler unit 26 schedules the starting time of transmission of the frame, and the frame transmission unit 28 transmits the frame. With this structure, the information processing apparatus 10 according to the present embodiment is capable of clearly separating the timing to prefetch the entry 34D, the timing to schedule the starting time of transmission, and the timing to actually transmit the frame from each other, and implementing them individually. This structure enables the information processing apparatus 10 according to the present embodiment to achieve both securement of flexibility in implementation and strict transmission timing control.

In addition, each of the transmission queues is retained in the frame storage 32 provided in the host 12. This structure enables flexible change of the size of each of the transmission queues and the number of transmission queues as desired.

The information processing apparatus 10 according to the present embodiment enables achievement of the functions of the frame transmission unit 28 with hardware. With this structure, the information processing apparatus 10 according to the present embodiment is capable of controlling the transmission timing with higher accuracy, in comparison with the case of achieving the frame transmission unit 28 with software.

SPECIFIC EXAMPLE

The following is an explanation of information processing performed with the information processing apparatus 10 according to the present embodiment, with a specific example. The present specific example illustrates the case where the transmission scheduling information is a gate control list provided in the IEEE 802.1Qbv, as an example, but the present invention is not limited thereto. In the same manner, the present specific example illustrates the case of using the gate control list 34B as an example of the gate control list, but the present invention is not limited thereto.

Transmission Scheduling Information

First, the following is an explanation of an example of the transmission scheduling information 34A. The transmission scheduling information 34A is, for example, information as illustrated in FIG. 2.

As explained above with reference to FIG. 2, in the example illustrated in FIG. 2, the transmission scheduling information 34A includes the gate control list 34B and the other parameters 34C.

In the example illustrated in FIG. 2, the transmission scheduling information 34A is formed of eight entries 34D (entry 34D0 to entry 34D7), and the eight entries 34D are provided with respective list indexes of 0 to 7. As described above, the mark "o" expressed in the gate state indicates "valid" (open) indicating that transmission is possible, and the mark "C" indicates "invalid" (close) indicating that transmission is impossible.

For example, the gate state "CCCCCCCo" of the entry 34D7 with the list index "7" in FIG. 2 indicates the transmission state (open or close) of each of the transmission queues in the frame storage 32. As described above, the present embodiment illustrates the case where the frame storage 32 includes eight transmission queues (transmission queue 0 to transmission queue 7). Accordingly, the gate state "CCCCCCCo" of the entry 34D7 with the list index "7" indicates that transmission queue 1 to transmission queue 7 are invalid (close), and transmission queue 0 is valid (open).

Specifically, in this case, the gate state indicates that only the transmission queue 0 is provided with permission for transmission.

The example illustrated in FIG. 2 illustrates the case where only one transmission queue is valid (open: o) in the gate state of each entry 34D. However, in a more general case, a plurality of transmission queues may be valid (open: o) in the gate state of each entry 34D.

In addition, the example illustrated in FIG. 2 illustrates the case where all the time intervals included in the respective entries 34D are set to the same value (2,500 nanoseconds). However, in a more general case, time intervals having values different from each other among the entries 34D may be set. FIG. 2 illustrates the case where the gate control list 34B includes the eight entries 34D, as an example. However, the number of entries 34D included in the gate control list 34B is not limited to eight.

In addition, FIG. 2 illustrates the case of including eight transmission queues, in accordance with the IEEE 802.1Qbv standard. However, transmission queues of any number may be supposed.

Periodicity of Gate State

Figure 20:
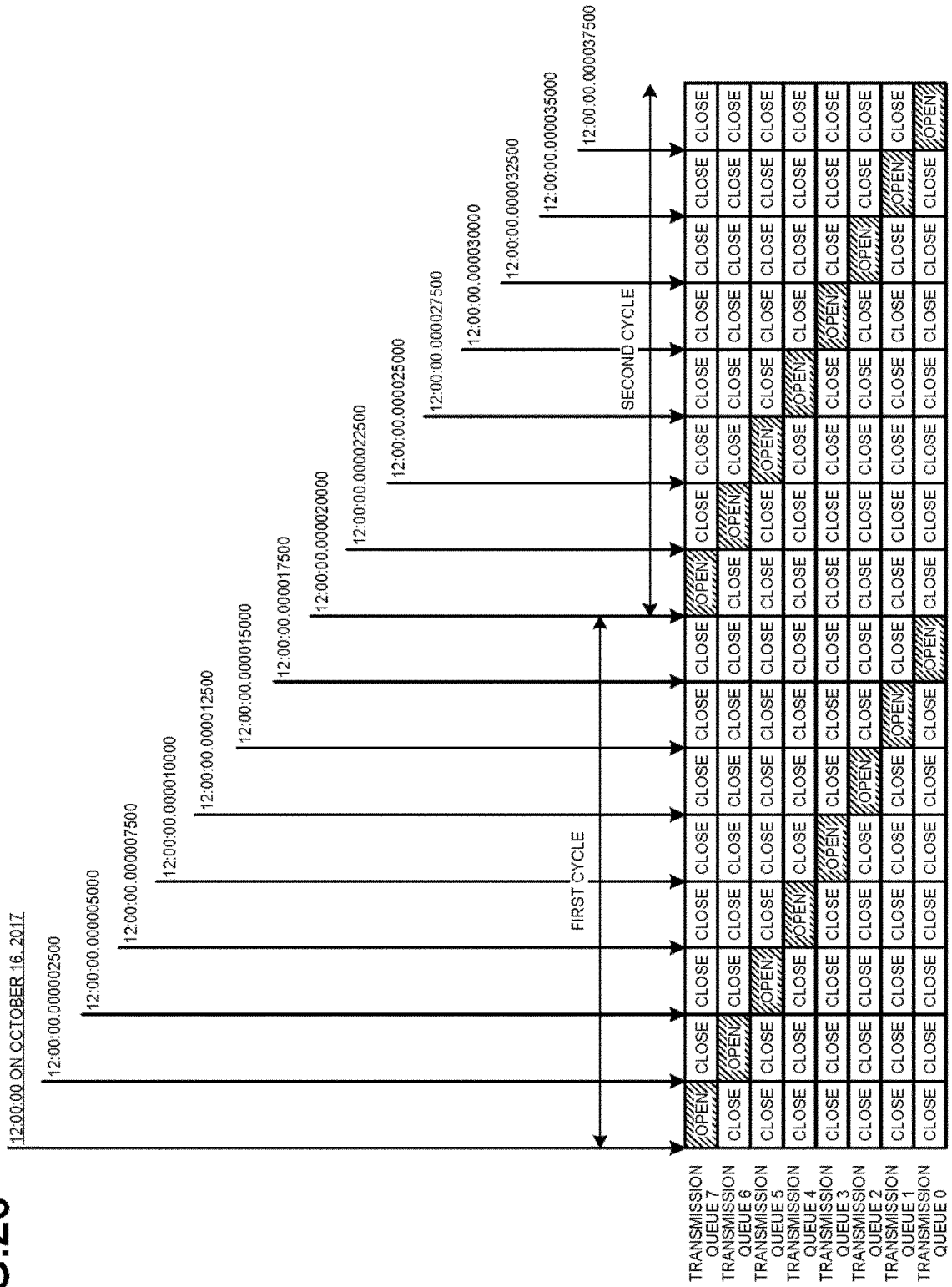
FIG. 20 is a diagram illustrating an example of typical periodicity of a gate state.
Figure 21:
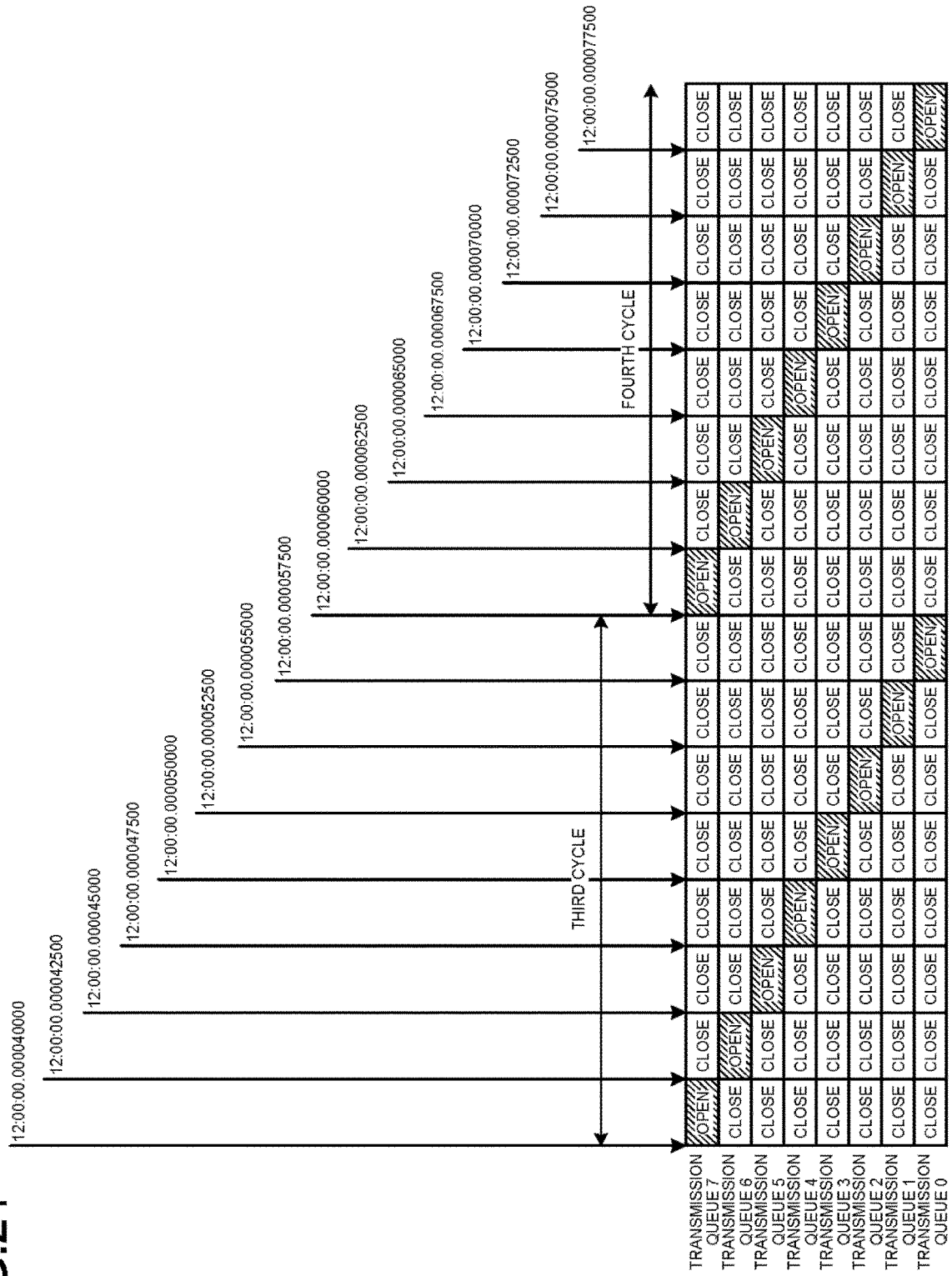
FIG. 21 is a diagram illustrating an example of typical periodicity of the gate state.

The following is an explanation of periodicity of the gate state. FIG. 20 and FIG. 21 are diagrams illustrating examples of typical periodicity of the gate state. The periodicity of the gate state is defined, based on the transmission scheduling information 34A. For example, FIG. 20 is defined based on the transmission scheduling information 34A illustrated in FIG. 2, and illustrates an example of the gate state in the first cycle and the second cycle of each of the transmission queues. The start time of each of the cycles can be determined with the gate control start time (12:00:00 on Oct. 16, 2017) and the gate control cycle time (20 microseconds) included in the transmission scheduling information 34A in FIG. 2.

The start time of the nth cycle can be expressed with the following Expression (1).

Start time of the $n$th cycle=gate control start time+ $(n-1) \times$gate control cycle time   Expression (1)

In Expression (1), n is an integer of 1 or more.

In the example of FIG. 20, the start time of the first cycle is 12:00:00 on Oct. 16, 2017 designated as the gate control start time. The start time of the second cycle is 12:00:00.000020000 that is the time 20 microseconds after the gate control start time.

FIG. 21 illustrates an example of the gate state of the third cycle and the fourth cycle of each of the transmission queues. The start time of the third cycle is 12:00:00.000040000 that is the time 40 microseconds after the gate control start time. The start time of the fourth cycle is 12:00:00.000060000 that is the time 60 microseconds after the gate control start time.

When transmission process of each of the cycles is started, the gate state of each of the transmission queues is determined, based on the order set in the entry 34D of the gate control list 34B. In the example of FIG. 20, during the period of 2,500 nanoseconds from the start time (12:00:00) of the first cycle, the transmission states of the respective transmission queues are determined with the gate state (oCCCCCCC) of the list index "0". Thereafter, during the period of 2,500 nanoseconds from 12:00:00.000002500, the transmission states of the respective transmission queues are determined with the gate state (CoCCCCCC) of the list index "1".

In addition, during the period of 2,500 nanoseconds from 12:00:00.000005000, the transmission states of the respective transmission queues are determined with the gate state (CCoCCCCC) of the list index "2".

As described above, the gate state of each of the transmission queues and the time interval of each of the states are determined, in accordance with the order from the list index "0" to the list index "7" indicated in the gate control list 34B.

Lastly, in the example of FIG. 20, during the period of 2,500 nanoseconds from 12:00:00.000017500, the transmission states of the respective transmission queues are determined with the gate state (CCCCCCCo) of the list index "7", and the first cycle is ended.

Prefetching and Scheduling Process

The following is an explanation of the prefetching process and the scheduling process in a typical operation scenario.

Figure 22:
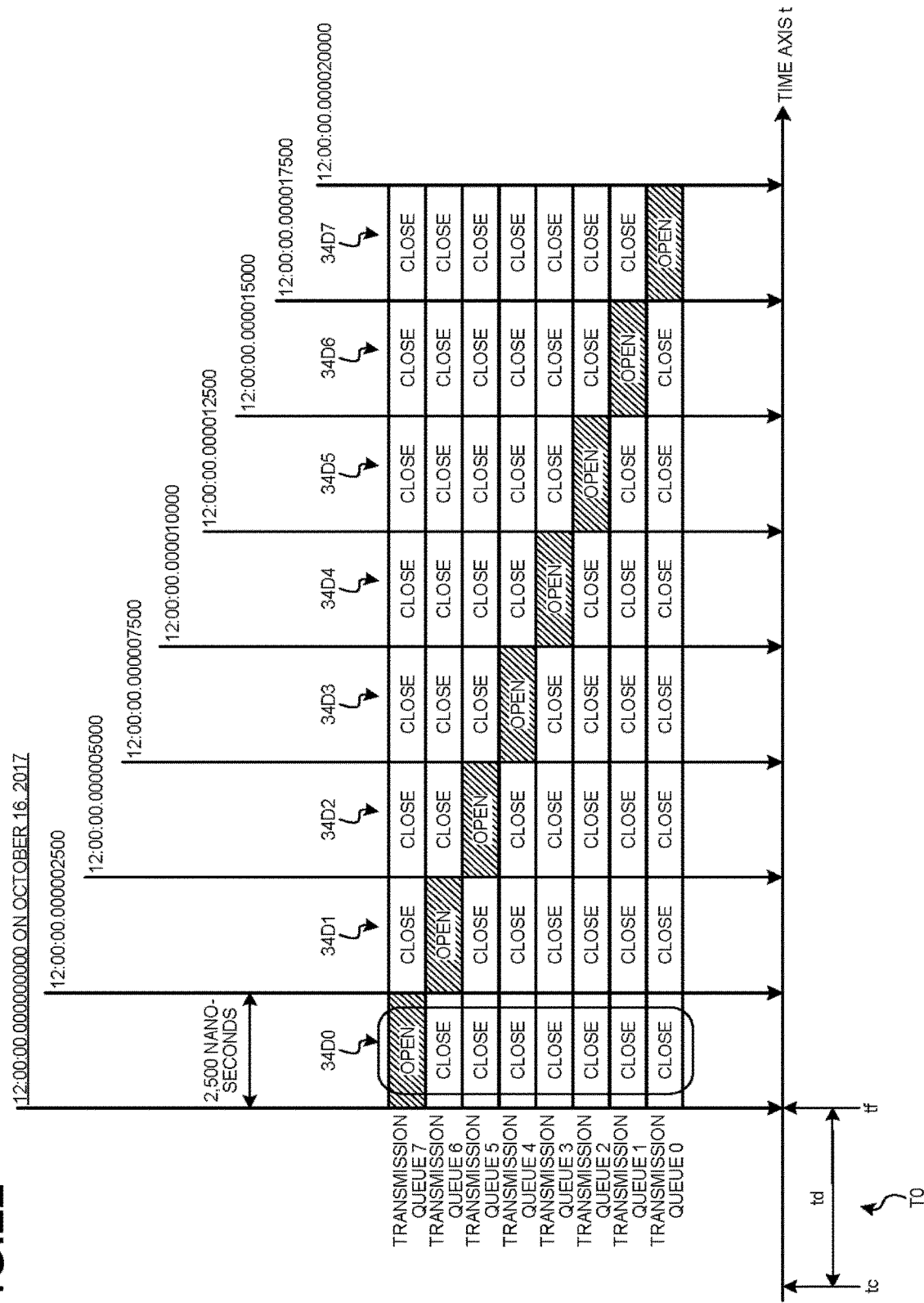
FIG. 22 is a diagram illustrating a state immediately after initialization.

FIG. 22 is a diagram illustrating the current time tc, the future time tf, and the time difference td between the current time tc and the future time tf (see timing T0), at the time immediately after initialization. FIG. 23 is a diagram illustrating the current time, the future time, the values of the available time for transmission, the values of the required transmission time, the scheduled frame, and the starting time of transmission thereof, at the time immediately after initialization.

In initialization, the prefetch unit 20 performs initialization processing explained with reference to FIG. 6 and FIG. 7. In the example illustrated in FIG. 22 and FIG. 23, the prefetch unit 20 sets the gate control start time included in the transmission scheduling information 34A, as the future time tf, and assigns the available time for transmission of 2,500 nanoseconds to the transmission queue 7.

Specific Example 1 of Scheduling Process

FIG. 24 is a diagram illustrating the current time tc, the future time tf, and the time difference td between the current time tc and the future time tf (see timing T1), at the time 0.001 second after initialization. FIG. 25 is a diagram illustrating the current time, the future time, the values of the available time for transmission, the values of the required transmission time, the scheduled frame, and the starting time of transmission thereof, at the time 0.001 second after initialization. FIG. 25 illustrates an example of the case where a frame f0 with the required transmission time of 1,000 nanoseconds is written to the transmission queue 7 at the time 0.001 second after initialization.

In the example illustrated in FIG. 25, the required transmission time of the frame f0 is equal to or less than the available time for transmission of the transmission queue 7. Accordingly, the schedulability evaluation unit 22 determines that scheduling of the starting time of transmission of the frame f0 is possible (see reference numeral 60 in FIG. 25). As a result, the scheduler unit 26 schedules the future time (12:00:00.000000000 on Oct. 16, 2017) at the time 0.001 second after initialization, as the starting time of transmission of the frame f0.

FIG. 26 is a diagram illustrating the current time tc, the future time tf, and the time difference td between the current time tc and the future time tf (see timing T2), at the time 0.002 second after initialization. FIG. 27 is a diagram illustrating the current time, the future time, the values of the available time for transmission, the values of the required transmission time, the scheduled frame, and the starting time of transmission thereof, at the time 0.002 second after initialization. FIG. 27 illustrates an example at the time 0.002 second after initialization and after the frame f0 has been scheduled.

In the scheduling, the schedulability evaluation unit 22 and the scheduler unit 26 perform the schedulability evaluation process, the scheduling process, and the first post processing explained with reference to FIG. 10 to FIG. 15.

Specific Example 2 of Scheduling Process

Figure 28:
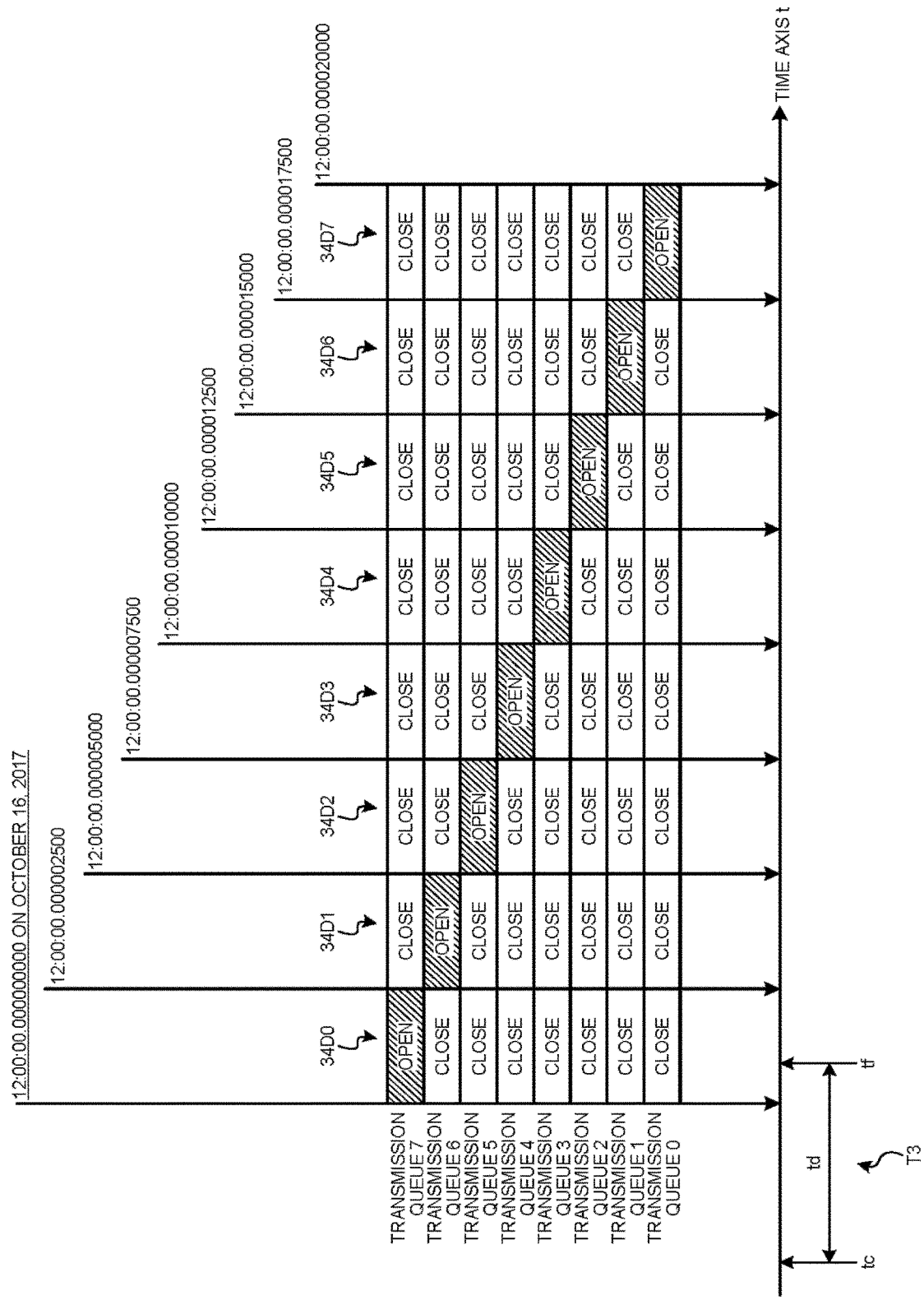
FIG. 28 is a diagram illustrating a state at the time 0.003 second after initialization.

FIG. 28 is a diagram illustrating the current time tc, the future time tf, and the time difference td between the current time tc and the future time tf (see timing T3), at the time 0.003 second after initialization. FIG. 29 is a diagram illustrating the current time, the future time, the values of the available time for transmission, the values of the required transmission time, the scheduled frame, and the starting time of transmission thereof, at the time 0.003 second after initialization. FIG. 29 illustrates an example of the case where a frame f1 with the required transmission time of 1,200 nanoseconds is written to the transmission queue 7 at the time 0.003 second after initialization.

In the example of FIG. 29, the required transmission time of the frame f1 is equal to or less than the available time for transmission of the transmission queue 7 (see reference numeral 62). Accordingly, the schedulability evaluation unit 22 determines that scheduling of the starting time of transmission of the frame f1 is possible. As a result, the scheduler unit 26 schedules the future time (12:00:00.000001000 on Oct. 16, 2017) at the time 0.003 second after initialization, as the starting time of transmission of the frame f1.

FIG. 30 is a diagram illustrating the current time tc, the future time tf, and the time difference td between the current time tc and the future time tf (see timing T4), at the time 0.004 second after initialization. FIG. 31 is a diagram illustrating the current time, the future time, the values of the available time for transmission, the values of the required transmission time, the scheduled frames, and the values of the starting time of transmission thereof, at the time 0.004 second after initialization. FIG. 31 illustrates an example at the time 0.004 second after initialization and after the frame f1 has been scheduled.

In the scheduling, the schedulability evaluation unit 22 and the scheduler unit 26 perform the schedulability evaluation process, the scheduling process, and the first post processing explained with reference to FIG. 10 to FIG. 15.

Specific Example of Clearing the Available Time for Transmission to Zero

Figure 33:
FIG. 33 is a diagram illustrating a state at the time 0.005 second after initialization.

FIG. 32 is a diagram illustrating the current time tc, the future time tf, and the time difference td between the current time tc and the future time tf (see timing T5), at the time 0.005 second after initialization. FIG. 33 is a diagram illustrating the current time, the future time, the values of the available time for transmission, the values of the required transmission time, the scheduled frames, and the values of the starting time of transmission thereof, at the time 0.005 second after initialization. FIG. 33 illustrates an example of the case where a frame f2 with the required transmission time of 1,500 nanoseconds is written to the transmission queue 7 at the time 0.005 second after initialization.

In the example of FIG. 33, the required transmission time of the frame f2 is more than the available time for transmission of the transmission queue 7. Accordingly, the schedulability evaluation unit 22 determines that scheduling of the starting time of transmission of the frame f2 is impossible.

FIG. 34 is a diagram illustrating the current time tc, the future time tf, and the time difference td between the current time tc and the future time tf (see timing T6), at the time 0.006 second after initialization. FIG. 35 is a diagram illustrating the current time, the future time, the values of the available time for transmission, the values of the required transmission time, the scheduled frames, and the values of the starting time of transmission thereof, at the time 0.006 second after initialization. FIG. 35 illustrates an example at the time 0.006 second after initialization and after the available time for transmission of the transmission queue 7 has been cleared to "0". In the zero clear processing, the schedulability evaluation unit 22 performs a series of processes including the processing of changing the available time for transmission to zero, explained with reference to FIG. 10 and FIG. 11.

Specific Example 1 of Prefetching Process

FIG. 36 is a diagram illustrating the current time tc, the future time tf, and the time difference td between the current time tc and the future time tf (see timing T7), at the time 0.007 second after initialization. FIG. 37 is a diagram illustrating the current time, the future time, the values of the available time for transmission, the values of the required transmission time, the scheduled frames, and the values of the starting time of transmission thereof, at the time 0.007 second after initialization. FIG. 37 illustrates an example at the time 0.007 second after initialization and after the entry 34D1 of the list index "1" has been prefetched in the gate control list 34B.

In prefetching process, the prefetch unit 20 and the prefetch notification unit 24 perform a series of processes explained with reference to FIG. 8 and FIG. 9.

In the example illustrated in FIG. 36 and FIG. 37, the prefetch unit 20 updates the future time to 12:00: 00.000002500 on Oct. 16, 2017, and assigned the available time for transmission of 2,500 nanoseconds to the transmission queue 6.

Specific Example 3 of Scheduling Process

Figure 38:
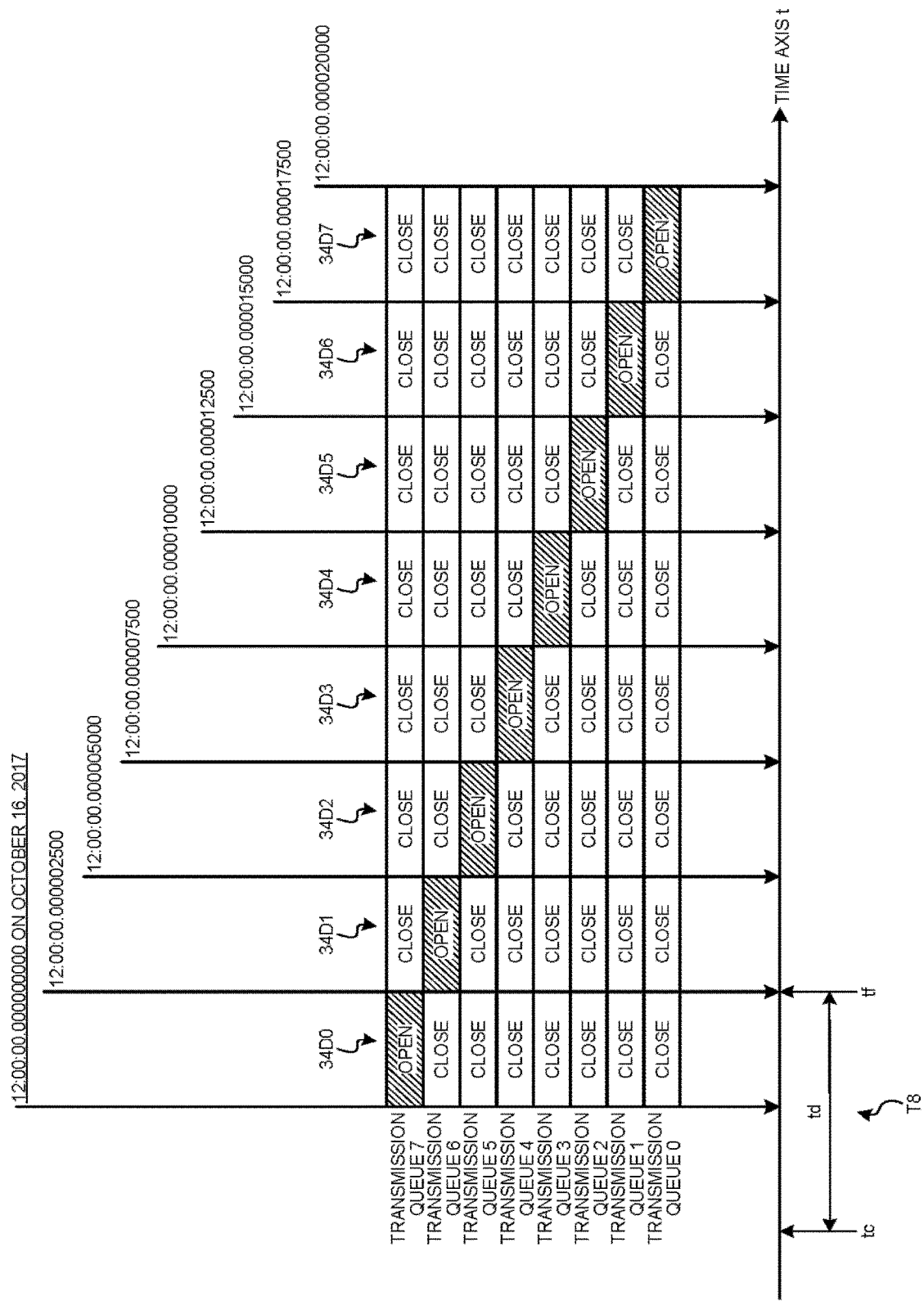
FIG. 38 is a diagram illustrating a state at the time 0.008 second after initialization.

FIG. 38 is a diagram illustrating the current time tc, the future time tf, and the time difference td between the current time tc and the future time tf (see timing T8), at the time 0.008 second after initialization. FIG. 39 is a diagram illustrating the current time, the future time, the values of the available time for transmission, the values of the required transmission time, the scheduled frames, and the values of the starting time of transmission thereof, at the time 0.008 second after initialization. FIG. 39 illustrates an example of the case where a frame f3 with the required transmission time of 1,000 nanoseconds is written to the transmission queue 6 at the time 0.008 second after initialization.

In the example of FIG. 39, the required transmission time of the frame f3 is equal to or less than the available time for transmission of the transmission queue 6. Accordingly, the schedulability evaluation unit 22 determines that scheduling of the frame f3 is possible. As a result, the scheduler unit 26 schedules the future time (12:00:00.000002500 on Oct. 16, 2017) at the time 0.008 second after initialization, as the starting time of transmission of the frame f3.

Figure 40:
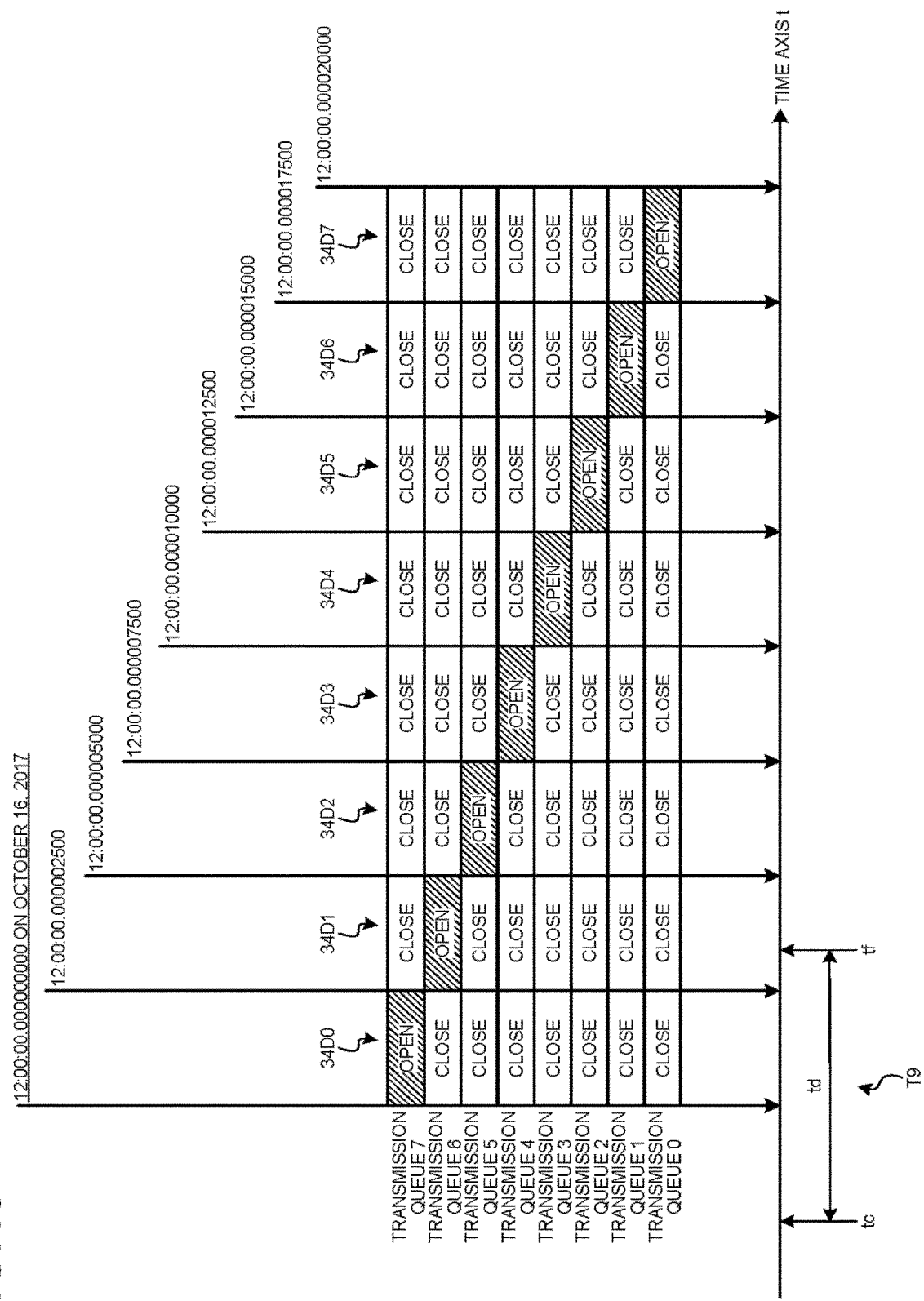
FIG. 40 is a diagram illustrating a state at the time 0.009 second after initialization.

FIG. 40 is a diagram illustrating the current time tc, the future time tf, and the time difference td between the current time tc and the future time tf (see timing T9), at the time 0.009 second after initialization. FIG. 41 is a diagram illustrating the current time, the future time, the values of the available time for transmission, the values of the required transmission time, the scheduled frames, and the values of the starting time of transmission thereof, at the time 0.009 second after initialization. FIG. 41 illustrates an example at the time 0.009 second after initialization and after the frame f3 has been scheduled.

In the scheduling, the schedulability evaluation unit 22 and the scheduler unit 26 perform the schedulability evaluation process, the scheduling process, and the first post processing explained with reference to FIG. 10 to FIG. 15.

Specific Example 4 of Scheduling Process

FIG. 42 is a diagram illustrating the current time tc, the future time tf, and the time difference td between the current time tc and the future time tf (see timing T10), at the time 0.010 second after initialization. FIG. 43 is a diagram illustrating the current time, the future time, the values of the available time for transmission, the values of the required transmission time, the scheduled frame, and the starting time of transmission thereof, at the time 0.010 second after initialization. FIG. 43 illustrates an example of the case where a frame f4 with the required transmission time of 1,500 nanoseconds is written to the transmission queue 6 at the time 0.010 second after initialization.

In the example of FIG. 43, the required transmission time of the frame f4 is equal to the available time for transmission of the transmission queue 6. Accordingly, the schedulability evaluation unit 22 determines that scheduling of the starting time of transmission of the frame f4 is possible. As a result, the scheduler unit 26 schedules the future time (12:00: 00.000003500 on Oct. 16, 2017) at the time 0.010 second after initialization, as the starting time of transmission of the frame f4.

FIG. 44 is a diagram illustrating the current time tc, the future time tf, and the time difference td between the current time tc and the future time tf (see timing T11), at the time 0.011 second after initialization. FIG. 45 is a diagram illustrating the current time, the future time, the values of the available time for transmission, the values of the required transmission time, the scheduled frames, and the values of the starting time of transmission thereof, at the time 0.011 second after initialization. FIG. 45 illustrates an example at the time 0.011 second after initialization and after the frame f4 has been scheduled.

In the scheduling, the schedulability evaluation unit 22 and the scheduler unit 26 perform the schedulability evaluation process, the scheduling process, and the first post processing explained with reference to FIG. 10 to FIG. 15.

Specific Example 2 of Prefetching Process

Figure 46:
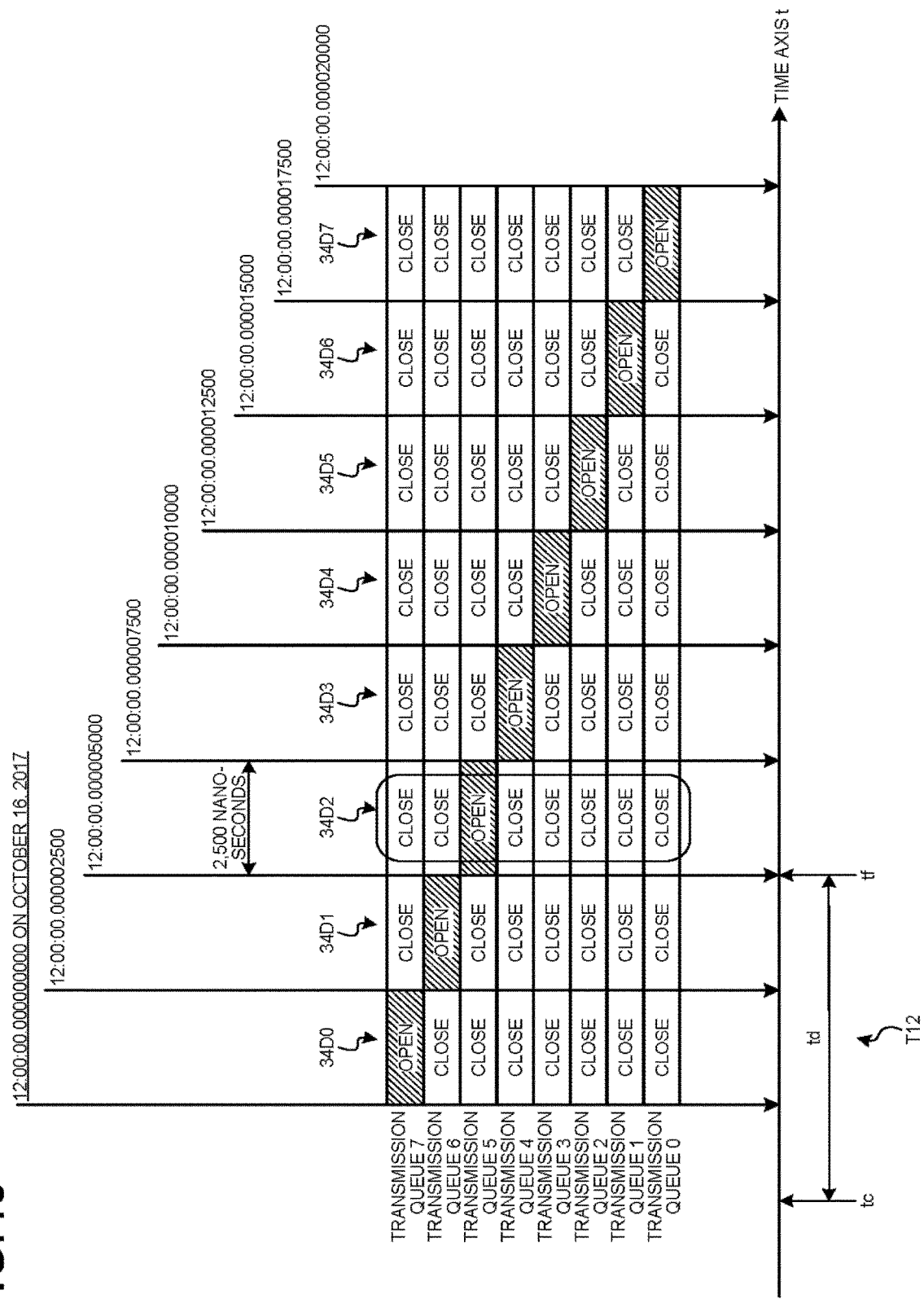
FIG. 46 is a diagram illustrating a state at the time 0.012 second after initialization.

FIG. 46 is a diagram illustrating the current time tc, the future time tf, and the time difference td between the current time tc and the future time tf (see timing T12), at the time 0.012 second after initialization. FIG. 47 is a diagram illustrating the current time, the future time, the values of the available time for transmission, the values of the required transmission time, the scheduled frames, and the values of the starting time of transmission thereof, at the time 0.012 second after initialization. FIG. 47 illustrates an example at the time 0.012 second after initialization and after the entry 34D2 of the list index "2" has been prefetched in the gate control list 34B.

In prefetching process, the prefetch unit 20 and the prefetch notification unit 24 perform a series of processes explained with reference to FIG. 8 and FIG. 9.

Specific Example of the Case where No Schedulable Frame Exists

FIG. 48 is a diagram illustrating the current time tc, the future time tf, and the time difference td between the current time tc and the future time tf (see timing T13), at the time 0.013 second after initialization. FIG. 49 is a diagram illustrating the current time, the future time, the values of the available time for transmission, the values of the required transmission time, the scheduled frames, and the values of the starting time of transmission thereof, at the time 0.013 second after initialization. FIG. 49 illustrates an example at the time 0.013 second after initialization and in which no schedulable frame exists.

In the example illustrated in FIG. 49, the available time for transmission of the transmission queue 7 is zero (see reference numeral 74). Accordingly, the scheduler unit 26 cannot schedule the frame f2 retained in the transmission queue 7.

In addition, the available time for transmission of 2,500 nanoseconds is assigned to the transmission queue 5. Accordingly, sufficient available time for transmission is left for the transmission queue 5. However, because no frames are retained in the transmission queue 5, no new frame can be scheduled.

Accordingly, at the time 0.013 second after initialization, no schedulable frame exists.

Specific Example of the Case where Update of the Future Time is Stopped

FIG. 50 is a diagram illustrating the current time tc, the future time tf, and the time difference td between the current time tc and the future time tf (see timing T14), at the time 0.014 second after initialization. FIG. 51 is a diagram illustrating the current time, the future time, the values of the available time for transmission, the values of the required transmission time, the scheduled frames, and the values of the starting time of transmission thereof, at the time 0.014 second after initialization. FIG. 51 illustrates an example at the time 0.014 second after initialization and the case where update of the future time is stopped.

The future time is updated to a proper value, when scheduling of a new frame is performed or prefetching of the entry 34D in the transmission scheduling information 34A is performed. Accordingly, when the state in which neither scheduling nor prefetching process is performed continues, update of the future time is stopped.

In the example illustrated in FIG. 51, because neither scheduling of a new frame nor prefetching of the entry 34D has been performed after the time 0.014 second after initialization, update of the future time is completely stopped.

Figure 54:
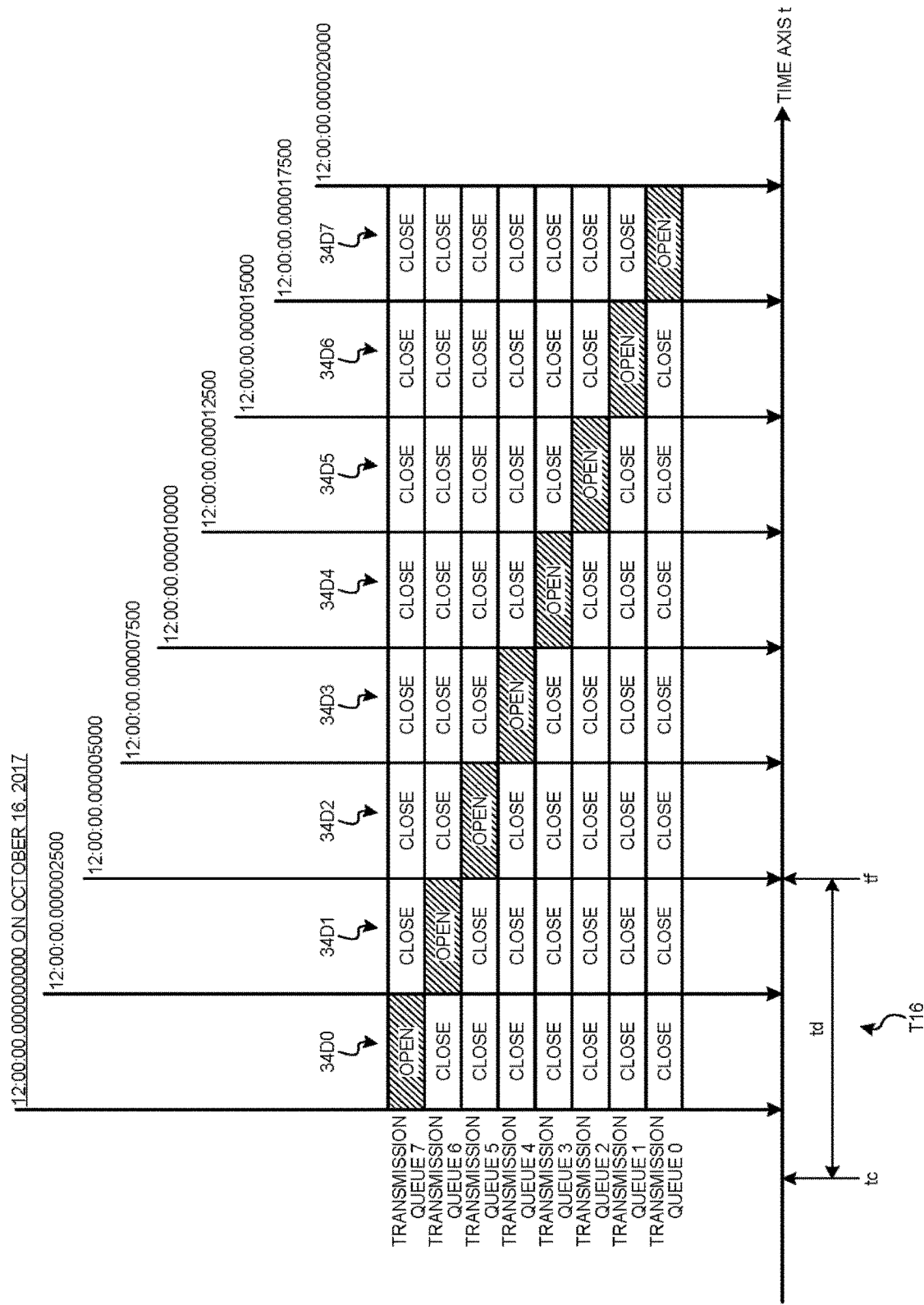
FIG. 54 is a diagram illustrating a state at the time 0.016 second after initialization.

FIG. 52 is a diagram illustrating the current time tc, the future time tf, and the time difference td between the current time tc and the future time tf (see timing T15), at the time 0.015 second after initialization. FIG. 53 is a diagram illustrating the current time, the future time, the values of the available time for transmission, the values of the required transmission time, the scheduled frames, and the values of the starting time of transmission thereof, at the time 0.015 second after initialization. FIG. 54 is a diagram illustrating the current time tc, the future time tf, and the time difference td between the current time tc and the future time tf (see timing T16), at the time 0.016 second after initialization. FIG. 55 is a diagram illustrating the current time, the future time, the values of the available time for transmission, the values of the required transmission time, the scheduled frames, and the values of the starting time of transmission thereof, at the time 0.016 second after initialization. FIG. 56 is a diagram illustrating the current time tc, the future time tf, and the time difference td between the current time tc and the future time tf (see timing T17), at the time 0.017 second after initialization. FIG. 57 is a diagram illustrating the current time, the future time, the values of the available time for transmission, the values of the required transmission time, the scheduled frames, and the values of the starting time of transmission thereof, at the time 0.017 second after initialization.

FIG. 53, FIG. 55, and FIG. 57 illustrate respective examples of the cases where update of the future time is stopped at the time 0.015 second after initialization, 0.016 second after initialization, and 0.017 second after initialization, respectively. In the examples of FIG. 53, FIG. 55, and FIG. 57, with advance of the current time, the current time is gradually coming closer to the future time. As a result, the time difference between the current time and the future time is being gradually reduced.

Specific Example of the Case where the Time Difference Between the Current Time and the Future Time has been Reduced FIG. 58 is a diagram illustrating the current time tc, the future time tf, and the time difference td between the current time tc and the future time tf (see timing T18), at the time 0.999985 second after initialization. FIG. 59 is a diagram illustrating the current time, the future time, the values of the available time for transmission, the values of the required transmission time, the scheduled frames, and the values of the starting time of transmission thereof, at the time 0.999985 second after initialization. FIG. 59 illustrates an example of the case where the threshold of the time difference between the current time and the future time is set to 20 microseconds.

As described above, any value may be set as the threshold of the time difference. In the example of FIG. 59, the time difference between the current time (11:59:59.999985000 on Oct. 16, 2017) and the future time (12:00:00.000005000 on Oct. 16, 2017) has a value equal to or less than the threshold (20 microseconds). This state causes the state of satisfying the condition for performing the second post processing to forcibly reduce the available time for transmission of the transmission queue.

Specific Example 1 of Second Post Processing

FIG. 60 is a diagram illustrating the current time tc, the future time tf, and the time difference td between the current time tc and the future time tf (see timing T19), at the time 0.999986 second after initialization. FIG. 61 is a diagram illustrating the current time, the future time, the values of the available time for transmission, the values of the required transmission time, the scheduled frames, and the values of the starting time of transmission thereof, at the time 0.999986 second after initialization. FIG. 61 illustrates an example of the second post processing to forcibly reduce the available time for transmission of the transmission queue 5 at the time 0.999986 second after initialization.

In the example of FIG. 61, the time difference (0.000019000 second=19 microseconds) between the current time and the future time has a value equal to or less than the threshold (20 microseconds). Accordingly, the prefetch notification unit 24 performs the processing of reducing the available time for transmission. As described above, the value used for subtraction may be any value satisfying the condition that the available time for transmission of each of the transmission queue is reduced to zero before the current time reaches the future time. In the example illustrated in FIG. 61, the available time for transmission assigned to the transmission queue 5 is reduced by the difference (1 microsecond) between the time difference (20 microseconds) at the time 0.999985 second after initialization and the time difference (19 microseconds) at the time 0.999986 second after initialization. As a result the available time for transmission of the transmission queue 5 is updated to 0.000001500.

In the second post processing to reduce the available time for transmission of the transmission queue, the prefetch notification unit 24 performs a series of processes explained with reference to FIG. 16 and FIG. 17.

Specific Example 2 of Second Post Processing

Figure 62:
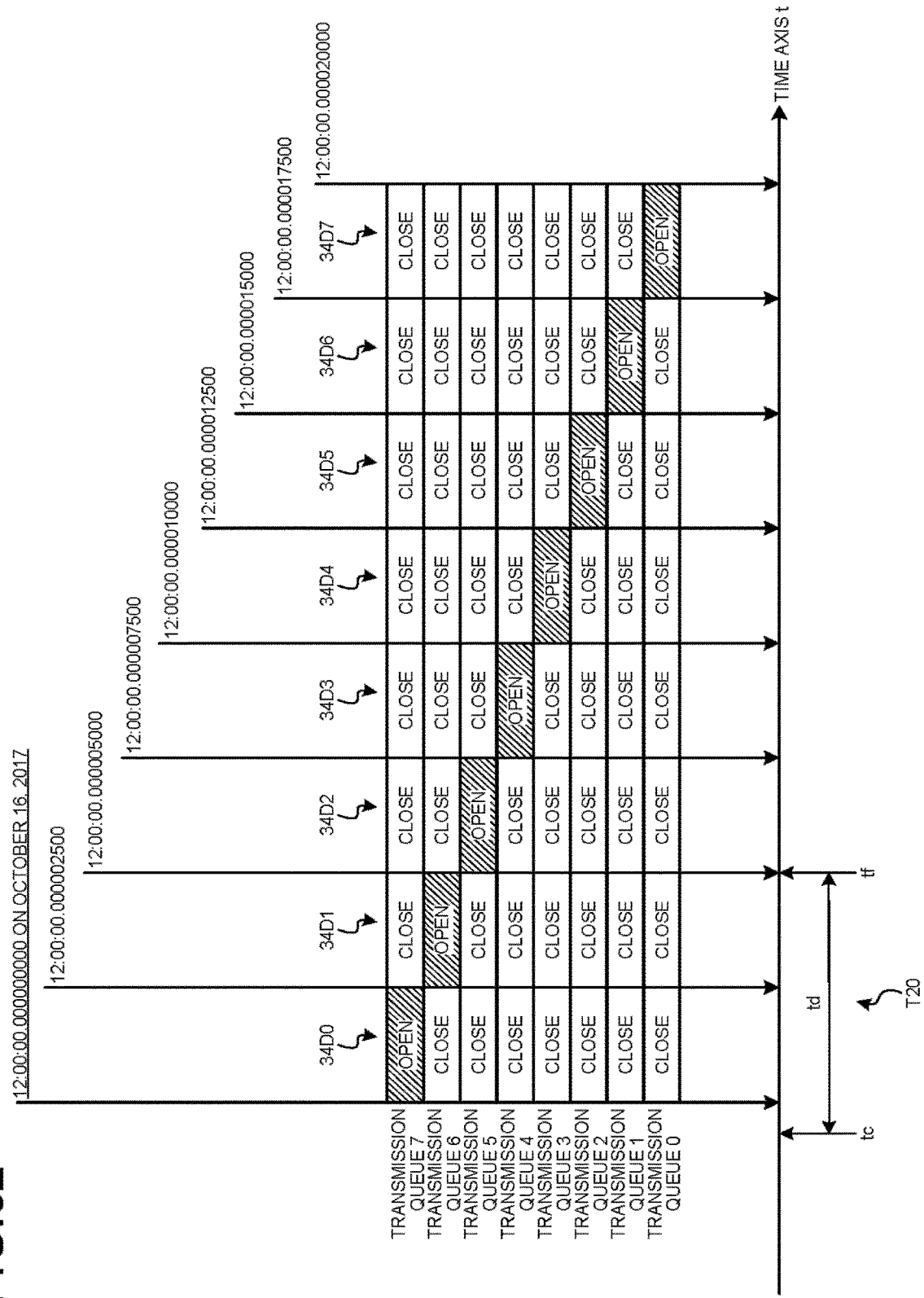
FIG. 62 is a diagram illustrating a state at the time 0.999987 second after initialization.

FIG. 62 is a diagram illustrating the current time tc, the future time tf, and the time difference td between the current time tc and the future time tf (see timing T20), at the time 0.999987 second after initialization. FIG. 63 is a diagram illustrating the current time, the future time, the values of the available time for transmission, the values of the required transmission time, the scheduled frames, and the values of the starting time of transmission thereof, at the time 0.999987 second after initialization. FIG. 63 illustrates an example of the second post processing to forcibly reduce the available time for transmission of the transmission queue 5 at the time 0.999987 second after initialization.

In the example of FIG. 63, the time difference (0.000018000 second=18 microseconds) between the current time and the future time has a value equal to or less than the threshold (20 microseconds). Accordingly, the prefetch notification unit 24 forcibly reduces the available time for transmission assigned to the transmission queue 5. In the example, the prefetch notification unit 24 reduces the available time for transmission assigned to the transmission queue 5 by the difference (1 microsecond) between the time difference (19 microseconds) at the time 0.999986 second after initialization and the time difference (18 microseconds) at the time 0.999987 second after initialization. As a result, the prefetch notification unit 24 updates the available time for transmission of the transmission queue 5 to 0.000000500.

In the second post processing to reduce the available time for transmission of the transmission queue, the prefetch notification unit 24 performs a series of processes explained with reference to FIG. 16 and FIG. 17.

Specific Example 3 of Second Post Processing

FIG. 64 is a diagram illustrating the current time tc, the future time tf, and the time difference td between the current time tc and the future time tf (see timing T21), at the time 0.9999875 second after initialization. FIG. 65 is a diagram illustrating the current time, the future time, the values of the available time for transmission, the values of the required transmission time, the scheduled frames, and the values of the starting time of transmission thereof, at the time 0.9999875 second after initialization. FIG. 65 illustrates an example of the processing to forcibly reduce the available time for transmission of the transmission queue 5 at the time 0.9999875 second after initialization.

In the example of FIG. 65, the time difference (0.000017500 second=17.5 microseconds) between the current time and the future time has a value equal to or less than the threshold (20 microseconds). Accordingly, the prefetch notification unit 24 forcibly reduces the available time for transmission assigned to the transmission queue 5. In the example, the prefetch notification unit 24 reduces the available time for transmission assigned to the transmission queue 5 by the difference (0.5 microsecond) between the time difference (18 microseconds) at the time 0.999987 second after initialization and the time difference (17.5 microseconds) at the time 0.9999875 second after initialization. As a result, the prefetch notification unit 24 updates the available time for transmission of the transmission queue 5 to 0.000000000.

In the second post processing to reduce the available time for transmission of the transmission queue, the prefetch notification unit 24 performs a series of processes explained with reference to FIG. 16 and FIG. 17.

Specific Example 3 of Prefetching Process

FIG. 66 is a diagram illustrating the current time tc, the future time tf, and the time difference td between the current time tc and the future time tf (see timing T22), at the time 0.999988 second after initialization. FIG. 67 is a diagram illustrating the current time, the future time, the values of the available time for transmission, the values of the required transmission time, the scheduled frames, and the values of the starting time of transmission thereof, at the time 0.999988 second after initialization. FIG. 67 illustrates an example at the time 0.999988 second after initialization and after the available time for transmission of the transmission queue 5 is reduced to zero.

In the example illustrated in FIG. 67, all the values of the available time for transmission assigned to the respective transmission queues are set to zero. This state satisfies the condition for prefetching the next entry 34D.

Figure 68:
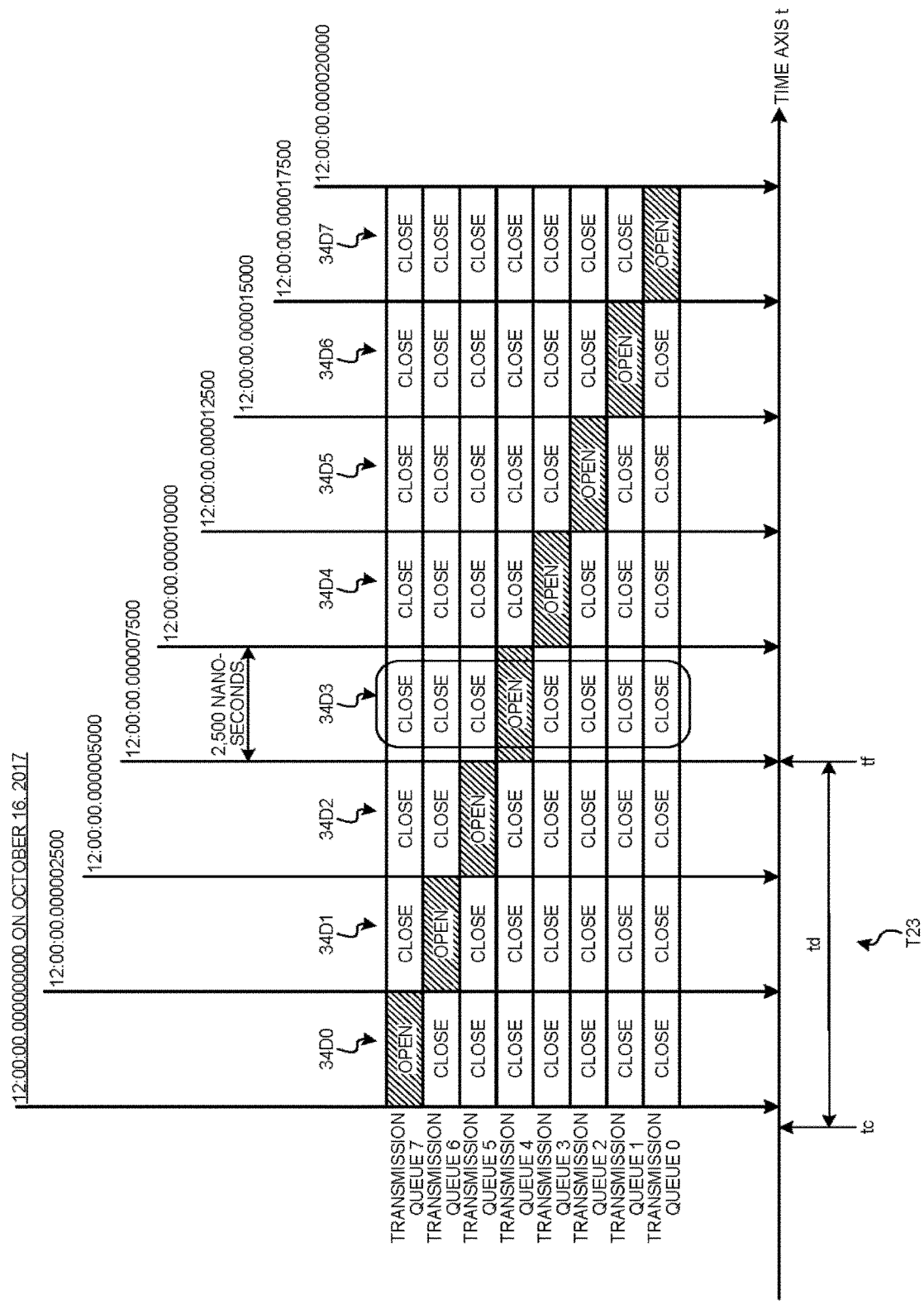
FIG. 68 is a diagram illustrating a state at the time 0.9999885 second after initialization.

FIG. 68 is a diagram illustrating the current time tc, the future time tf, and the time difference td between the current time tc and the future time tf (see timing T23), at the time 0.9999885 second after initialization. FIG. 69 is a diagram illustrating the current time, the future time, the values of the available time for transmission, the values of the required transmission time, the scheduled frames, and the values of the starting time of transmission thereof, at the time 0.9999885 second after initialization. FIG. 69 illustrates an example at the time 0.9999885 second after initialization and after the entry 34D3 of the list index of "3" in the gate control list 34B of the transmission scheduling information 34A is prefetched at the time 0.9999885 second after initialization.

In the prefetching process, the prefetch unit 20 and the prefetch notification unit 24 perform a series of processes explained with reference to FIG. 8 and FIG. 9.

In the example of FIG. 68 and FIG. 69, the prefetch unit 20 updates the future time to 12:00:00.000007500 on Oct. 16, 2017, and assigns the available time for transmission of 2,500 nanoseconds to the transmission queue 4.

Specific Example 5 of Scheduling Process

FIG. 70 is a diagram illustrating the current time tc, the future time tf, and the time difference td between the current time tc and the future time tf (see timing T24), at the time 0.999989 second after initialization. FIG. 71 is a diagram illustrating the current time, the future time, the values of the available time for transmission, the values of the required transmission time, the scheduled frame, and the starting time of transmission thereof, at the time 0.999989 second after initialization. FIG. 71 illustrates an example of the case where a frame f5 with the required transmission time of 1,000 nanoseconds is written to the transmission queue 4 at the time 0.999989 second after initialization.

In the example of FIG. 71, the time difference (0.000018500 second=18.5 microseconds) between the current time and the future time has a value equal to or less than the threshold (20 microseconds). Accordingly, the prefetch notification unit 24 forcibly reduces the available time for transmission assigned to the transmission queue 4. In the example, the prefetch notification unit 24 reduces the available time for transmission assigned to the transmission queue 4 by the difference (0.5 microsecond) between the time difference (19 microseconds) at the time 0.9999885 second after initialization and the time difference (18.5 microseconds) at the time 0.999989 second after initialization. As a result, the prefetch notification unit 24 updates the available time for transmission of the transmission queue 4 to 0.000002000.

In the example illustrated in FIG. 71, the required transmission time of the frame f5 is equal to or less than the available time for transmission of the transmission queue 4 (see reference numeral 80). Accordingly, the schedulability evaluation unit 22 determines that scheduling of the frame f5 is possible. As a result, the scheduler unit 26 schedules the future time (12:00:00.000007500 on Oct. 16, 2017) at the time 0.999989 second after initialization, as the starting time of transmission of the frame f5.

Figure 72:
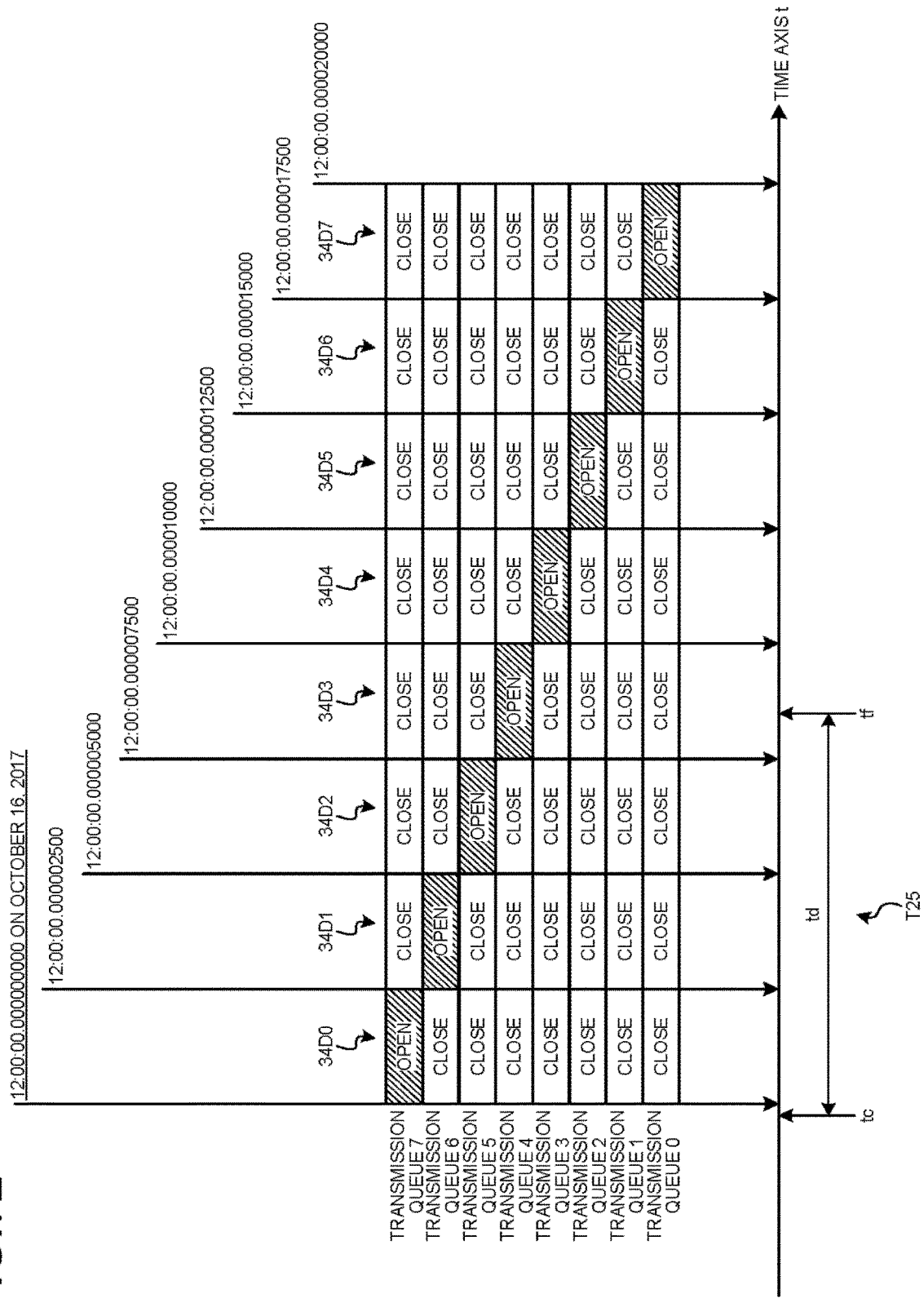
FIG. 72 is a diagram illustrating a state at the time 0.9999895 second after initialization.

FIG. 72 is a diagram illustrating the current time tc, the future time tf, and the time difference td between the current time tc and the future time tf (see timing T25), at the time 0.9999895 second after initialization. FIG. 73 is a diagram illustrating the current time, the future time, the values of the available time for transmission, the values of the required transmission time, the scheduled frame, and the starting time of transmission thereof, at the time 0.9999895 second after initialization. FIG. 73 illustrates an example at the time 0.9999895 second after initialization and after the frame f5 has been scheduled.

In the scheduling, the schedulability evaluation unit 22 and the scheduler unit 26 perform the schedulability evaluation process, the scheduling process, and the first post processing explained with reference to FIG. 10 to FIG. 15.

As explained above with specific examples, the information processing apparatus 10 according to the present embodiment has the structure in which the scheduler unit 26 schedules the starting time of transmission of the frame, based on the entry 34D prefetched with the prefetch unit 20, in the transmission scheduling information 34A.

Accordingly, the information processing apparatus 10 according to the present embodiment enables scheduling for transmission timing control with high accuracy. Specifically, the information processing apparatus 10 according to the present embodiment is capable of achieving transmission control by dynamic scheduling, based on the transmission scheduling information 34A.

Second Embodiment

The first embodiment illustrates the example of the case where the threshold to be compared with the time difference td between the current time tc and the future time tf is mainly provided in advance as a fixed value (for example, 20 microseconds). In the following explanation, the threshold is referred to as "first threshold th1".

When the first threshold th1 is set as a fixed value, handling of dynamical change of the processing time may become insufficient. For example, when the transmission control illustrated in the first embodiment is achieved with software, change in various types of processing time (mainly scheduling process time and direct memory access (DMA) transfer time) occurring in the host 12 increases. To achieve a mechanism to timely transmit a time-sensitive frame requiring very high real-time performance, it is required to properly and flexibly deal with change in processing time. Because much difficulty exists in completely predicting or suppressing change in processing time, it is required to provide a function to deal with changes based on the premise that changes will occur.

For this reason, the second embodiment adopts a method of dynamically updating the first threshold th1, as a method for dealing with dynamical change in processing time. This structure enhances timing accuracy of scheduling process in comparison with the first embodiment, and consequently enables more timely transmission of a frame requiring real-time performance.

Example of Functional Configuration

Figure 74:
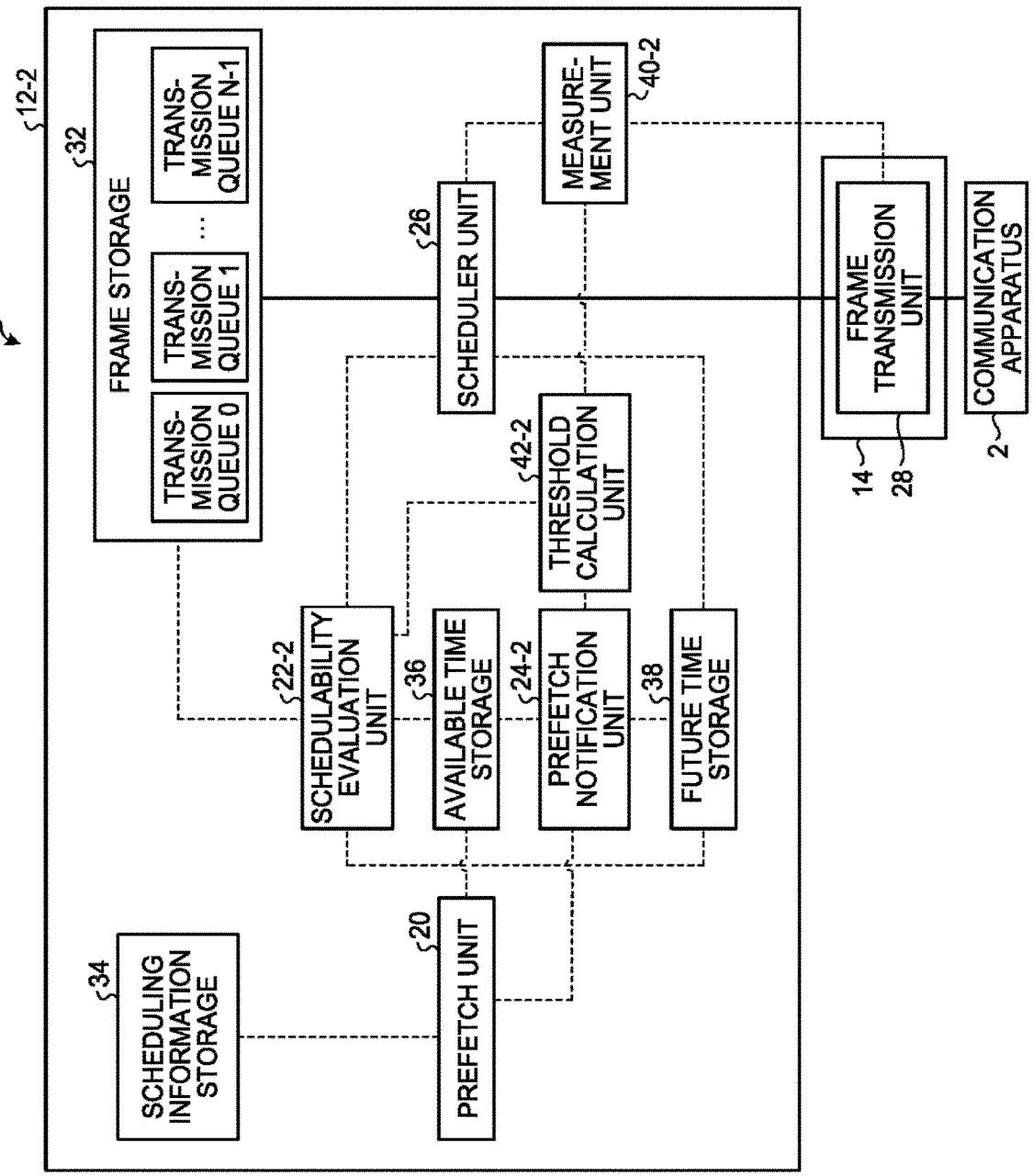
FIG. 74 is a diagram illustrating a functional configuration of an information processing system according to a second embodiment.

FIG. 74 is a diagram illustrating an example of a functional configuration of an information processing system 1-2 according to the second embodiment. The information processing system 1-2 has a structure in which a measurement unit 40-2 and a threshold calculation unit 42-2 are added to the processing units of the first embodiment. In addition, the information processing system 1-2 is different from the first embodiment in functions of a schedulability evaluation unit 22-2 and a prefetch notification unit 24-2 included in a host 12-2. The other configurations are the same as those in the first embodiment, and an explanation thereof is omitted with the same reference numerals provided.

Information Processing

Figure 75:
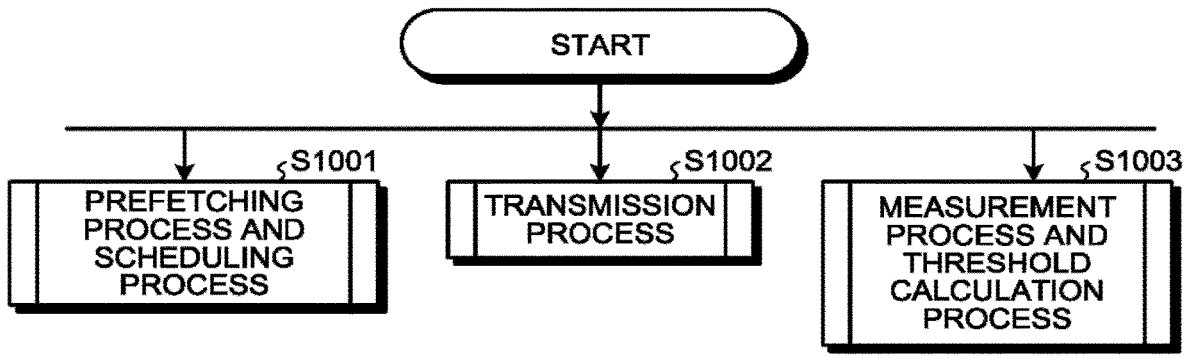
FIG. 75 is a flowchart illustrating a process of information processing according to the second embodiment.

FIG. 75 is a flowchart illustrating an example of a process of information processing performed with the information processing apparatus (host 12-2 and transmission device 14)

according to the second embodiment. The information processing apparatus (host 12-2 and transmission device 14) according to the second embodiment executes measurement process and threshold calculation process (Step S1003) performed with the measurement unit 40-2 and the threshold calculation unit 42-2, prefetching process and scheduling process (Step S1001) performed with the prefetch unit 20, the schedulability evaluation unit 22-2, the prefetch notification unit 24-2, and the scheduler unit 26, and transmission process (Step S1002) performed with the frame transmission unit 28 in parallel.

In comparison with the first embodiment, measurement process and threshold calculation process are added in the second embodiment. In addition, in the prefetching process and the scheduling process, the schedulability evaluation process (Step S206 in FIG. 5) and the second post processing (Step S214 in FIG. 5) are changed. The details of the schedulability evaluation process and the second post processing according to the second embodiment will be described later. The transmission process is similar to that in the first embodiment, and an explanation thereof is omitted.

Measurement Process and Threshold Calculation Process

Figure 76:
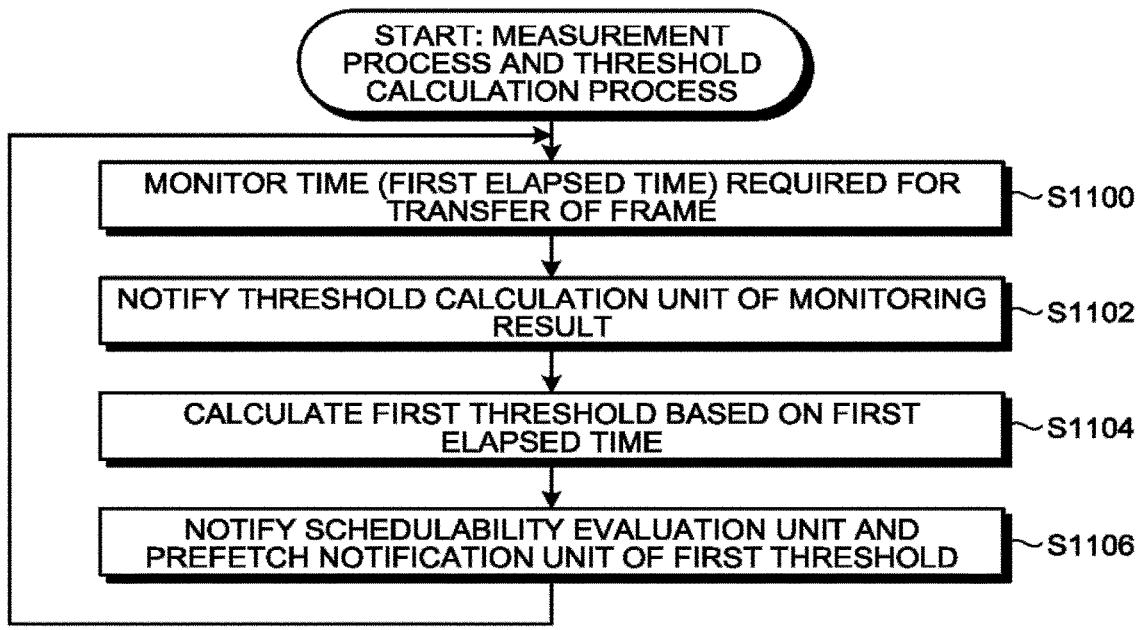
FIG. 76 is a detailed flowchart of measurement process and threshold calculation process according to the second embodiment.

FIG. 76 is a detailed flowchart of measurement process and threshold calculation process performed at Step S1003.

First, the measurement unit 40-2 monitors (measures) time (first elapsed time) required for transferring a frame from the scheduler unit 26 to the frame transmission unit 28 (Step S1100). For example, a series of processes relating to DMA transfer is mentioned as an element greatly influencing the first elapsed time. For this reason, the measurement unit 40-2 may monitor the sum of the overhead of DMA transfer and time required for actual data copying by DMA transfer as the first elapsed time.

Thereafter, the measurement unit 40-2 notifies the threshold calculation unit 42-2 of the monitoring result (Step S1102). For example, the measurement unit 40-2 may write the monitoring result to the shared memory, and thereafter transmit a signal to notify the threshold calculation unit 42-2 of update of the monitoring result. The shared memory may be formed of, for example, the storage unit 30 or a storage medium different from the storage unit 30.

Thereafter, the threshold calculation unit 42-2 that has received notification from the measurement unit 40-2 calculates a first threshold th1 based on the first elapsed time (Step S1104). The method for calculating the first threshold th1 with the threshold calculation unit 42-2 may be any method. For example, the threshold calculation unit 42-2 may calculate the first threshold th1 based on the worst execution time. Specifically, the threshold calculation unit 42-2 may adopt the maximum value, as the first elapsed time, among all the monitoring results notified from the measurement unit 40-2. In this case, the threshold calculation unit 42-2 may adopt, for example, the maximum value of the first elapsed time as the first threshold th1 without any processing, or adopt a value obtained by adding a certain safety margin to the maximum value of the first elapsed time, as the first threshold th1. For example, the calculation method is applicable to applications requiring hard real-time performance to necessarily finish the processing within a predetermined time.

As another calculation method, for example, the threshold calculation unit 42-2 may calculate a mean value, the median, the moving average or the like of all the monitoring results notified from the measurement unit 40-2, and adopt the calculated value as the first threshold th1. As another example, the threshold calculation unit 42-2 may adopt a value obtained by adding a certain safety margin to the mean value, the median, the moving average or the like as the first threshold th1. For example, this method is applicable to applications requiring soft real-time performance, in which no immediate serious problem occurs even when the application misses a deadline.

The method for calculating a threshold based on the worst execution time secures high real-time performance, but may sacrifice throughput instead. By contrast, the method of using the mean value, the median, the moving average or the like enables improvement in whole throughput, while it may sacrifice real-time performance to some extent.

Lastly, the threshold calculation unit 42-2 notifies the first threshold th1 to the schedulability evaluation unit 22-2 and the prefetch notification unit 24-2 (Step S1106). For example, the threshold calculation unit 42-2 may write the first threshold th1 to the shared memory, and thereafter transmit a signal to notify the schedulability evaluation unit 22-2 and the prefetch notification unit 24-2 of update of the first threshold th1.

The measurement unit 40-2 and the threshold calculation unit 42-2 repeatedly perform the measurement process and the threshold calculation process illustrated in FIG. 76. Specifically, the measurement unit 40-2 continuously performs monitoring, and the threshold calculation unit 42-2 calculates the first threshold th1 to reflect the latest monitoring result.

Figure 77:
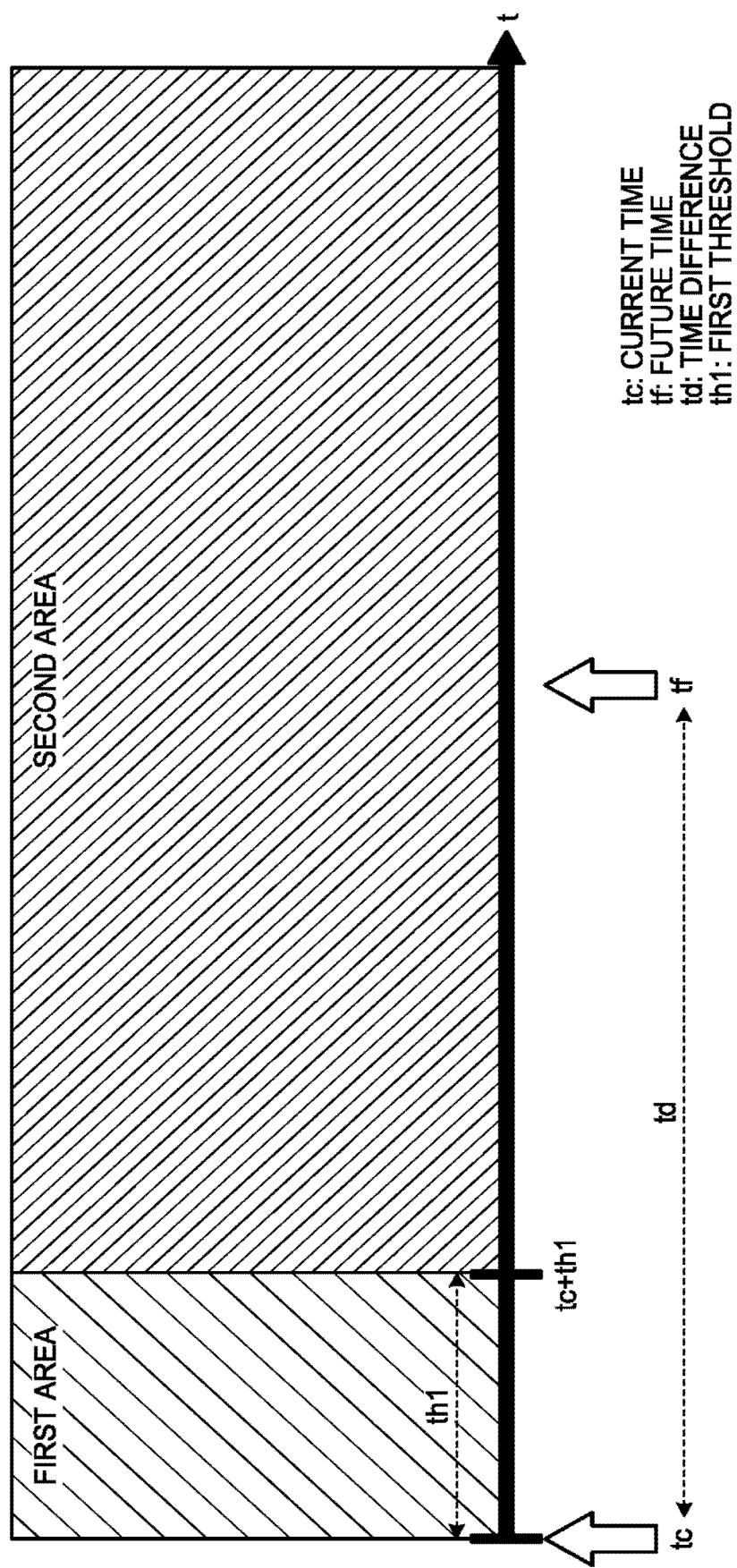
FIG. 77 is a diagram illustrating an example of a calculated first threshold.
Figure 78:
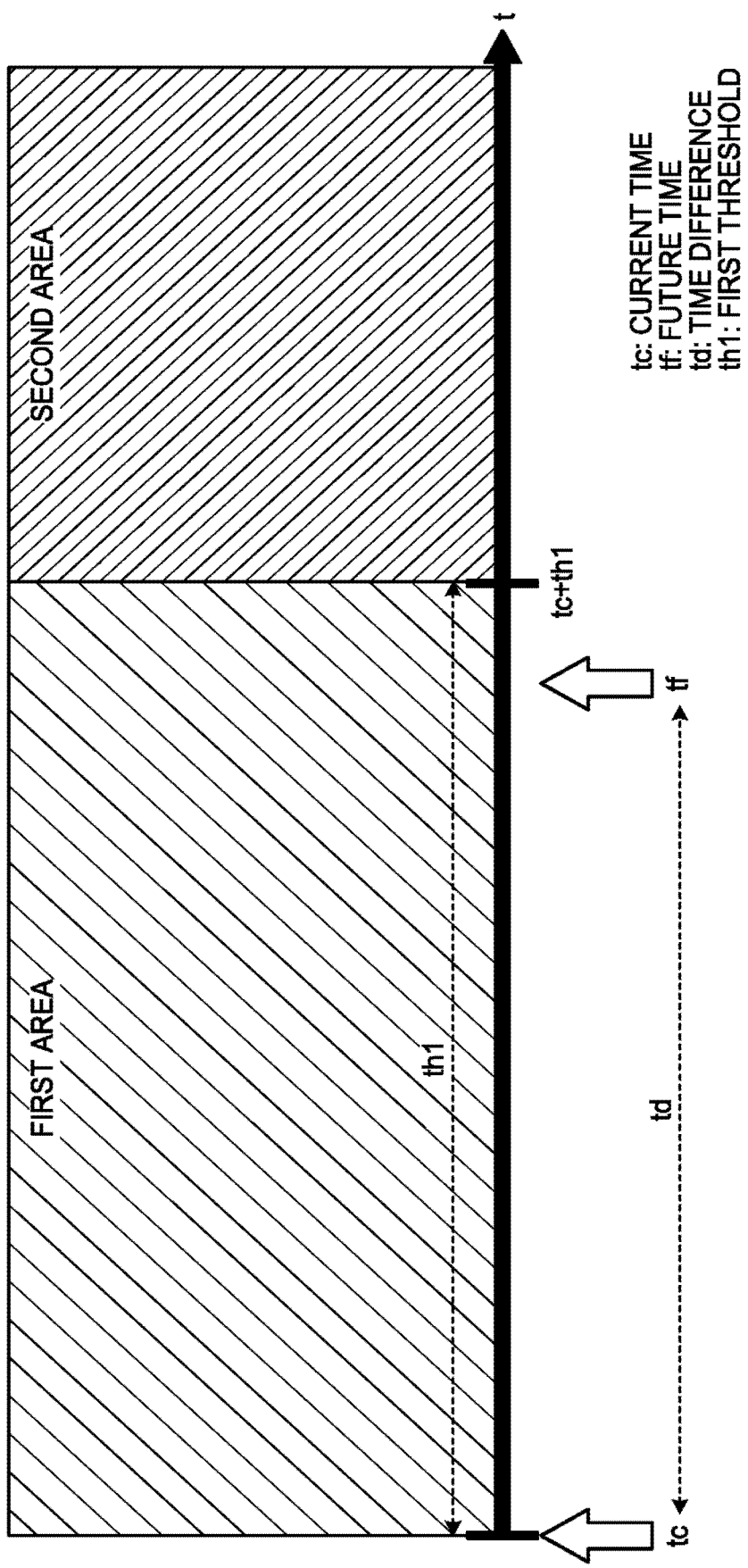
FIG. 78 is a diagram illustrating an example of a calculated first threshold.

FIG. 77 and FIG. 78 are diagrams illustrating examples of the calculated first threshold th1. When the monitoring result is relatively small, a relatively small first threshold th1 is calculated as illustrated in FIG. 77. By contrast, when the monitoring result rapidly increases, a relatively large first threshold th1 is calculated as illustrated in FIG. 78. As described above, the second embodiment enables update of the first threshold th1 to deal with dynamic change in processing time.

Schedulability Evaluation Process

Figure 79:
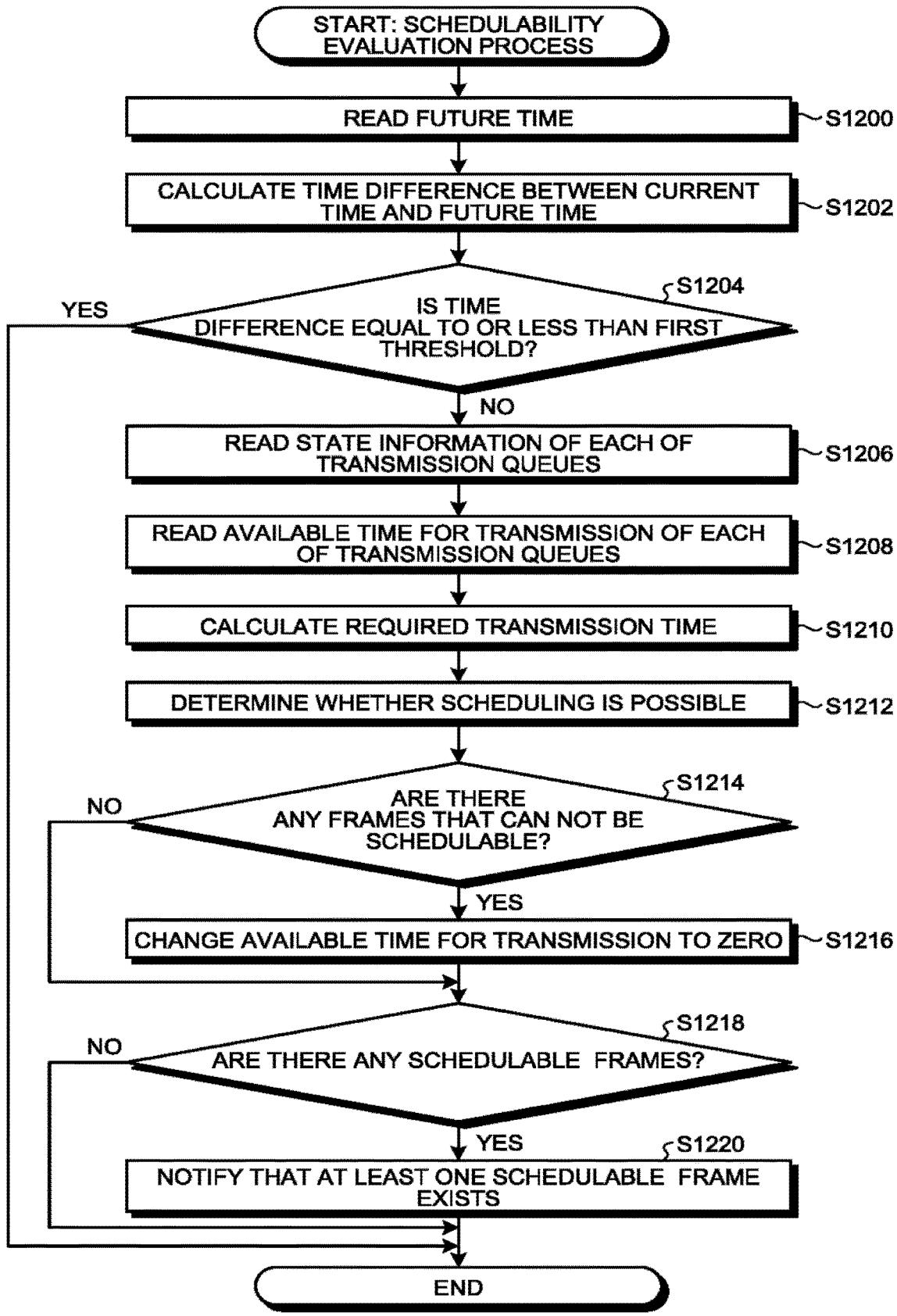
FIG. 79 is a detailed flowchart of schedulability evaluation process according to the second embodiment.

FIG. 79 is a detailed flowchart of schedulability evaluation process according to the second embodiment.

First, the schedulability evaluation unit 22-2 reads future time tf from the future time storage 38 (Step S1200). The schedulability evaluation unit 22-2 calculates a time difference td between the future time tf and the current time tc (Step S1202). The schedulability evaluation unit 22-2 compares the first threshold th1 notified from the threshold calculation unit 42-2 with the time difference td, to determine whether the time difference td is equal to or less than the first threshold th1 (Step S1204). When the time difference td is equal to or less than the first threshold th1 (Yes at Step S1204), the schedulability evaluation process is ended.

When the time difference td is more than the first threshold th1 (No at Step S1204), the schedulability evaluation unit 22-2 performs Step S1206 to Step S1220 corresponding to the schedulability evaluation process (Step S500 to Step S514 of FIG. 10) according to the first embodiment.

Second Post Processing

Figure 80:
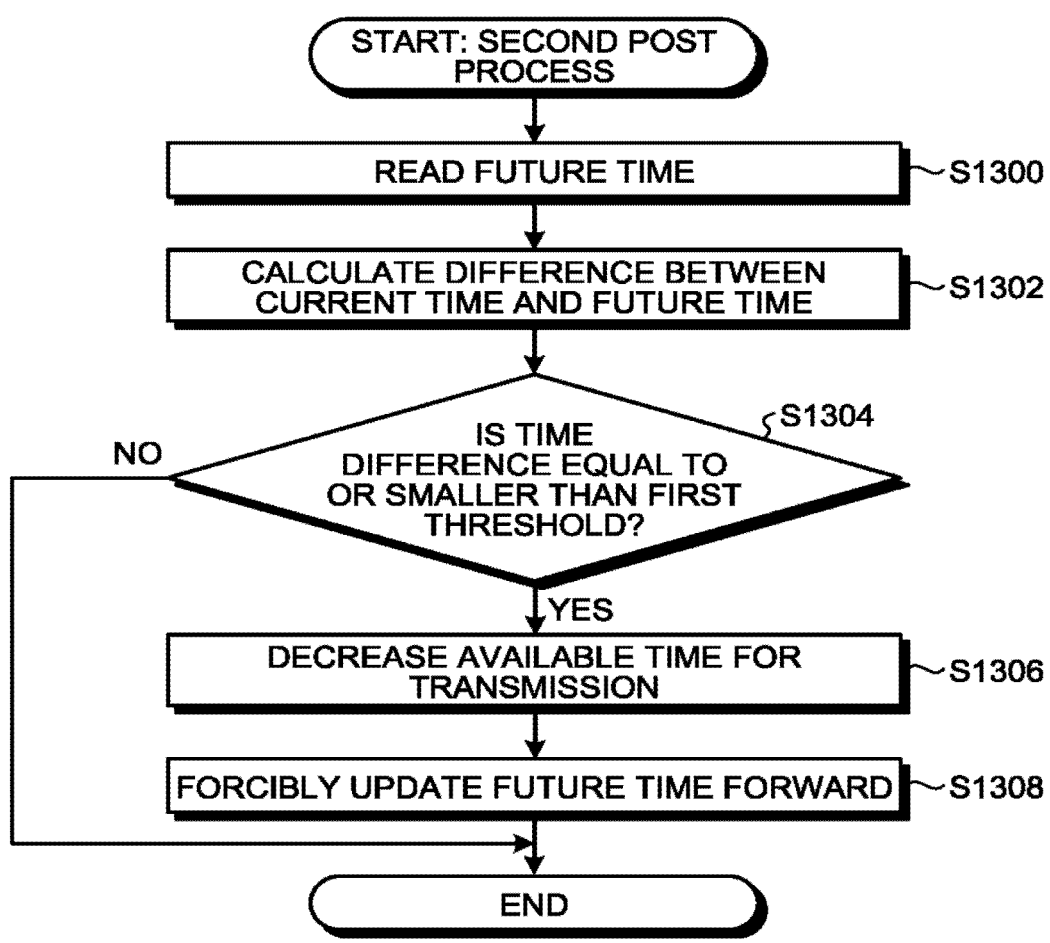
FIG. 80 is a detailed flowchart of second post processing according to the second embodiment.

FIG. 80 is a detailed flowchart of second post processing according to the second embodiment. Step S1300 and Step S1302 are the same as Step S800 and Step S802 included in the second post processing according to the first embodiment, and an explanation thereof is omitted.

Thereafter, the prefetch notification unit 24-2 compares the first threshold th1 notified from the threshold calculation unit 42-2 with the time difference td, to determine whether the time difference td is equal to or less than the first threshold th1 (Step S1304). When the time difference td is more than the first threshold th1 (No at Step S1304), the second post processing is ended.

When the time difference td is equal to or less than the first threshold th1 (Yes at Step S1304), the prefetch notification unit 24-2 decreases the available time for transmission corresponding to each transmission queue by a fixed quantity, and updates the available time for transmission information 36A stored in the available time storage 36 (Step S1306).

For example, the prefetch notification unit 24-2 may decrease the available time for transmission such that a value (tc+th1−tf+offset) obtained by adding a certain offset (offset) to a value (tc+th1−tf) obtained by subtracting the future time tf from the sum of the current time tc and the first threshold th1 is subtracted from the available time for transmission of each transmission queue. The offset is, for example, a value of 0 or more determined statically or dynamically. The method for calculating a value to be subtracted from the available time for transmission is not limited thereto, but may be a method based on, for example, at least any combination of the current time tc, the future time tf, the threshold th1, and the offset. For example, the value to be subtracted may be a value obtained by adding the offset to the time difference between the current time tc and the future time tf.

Figure 81:
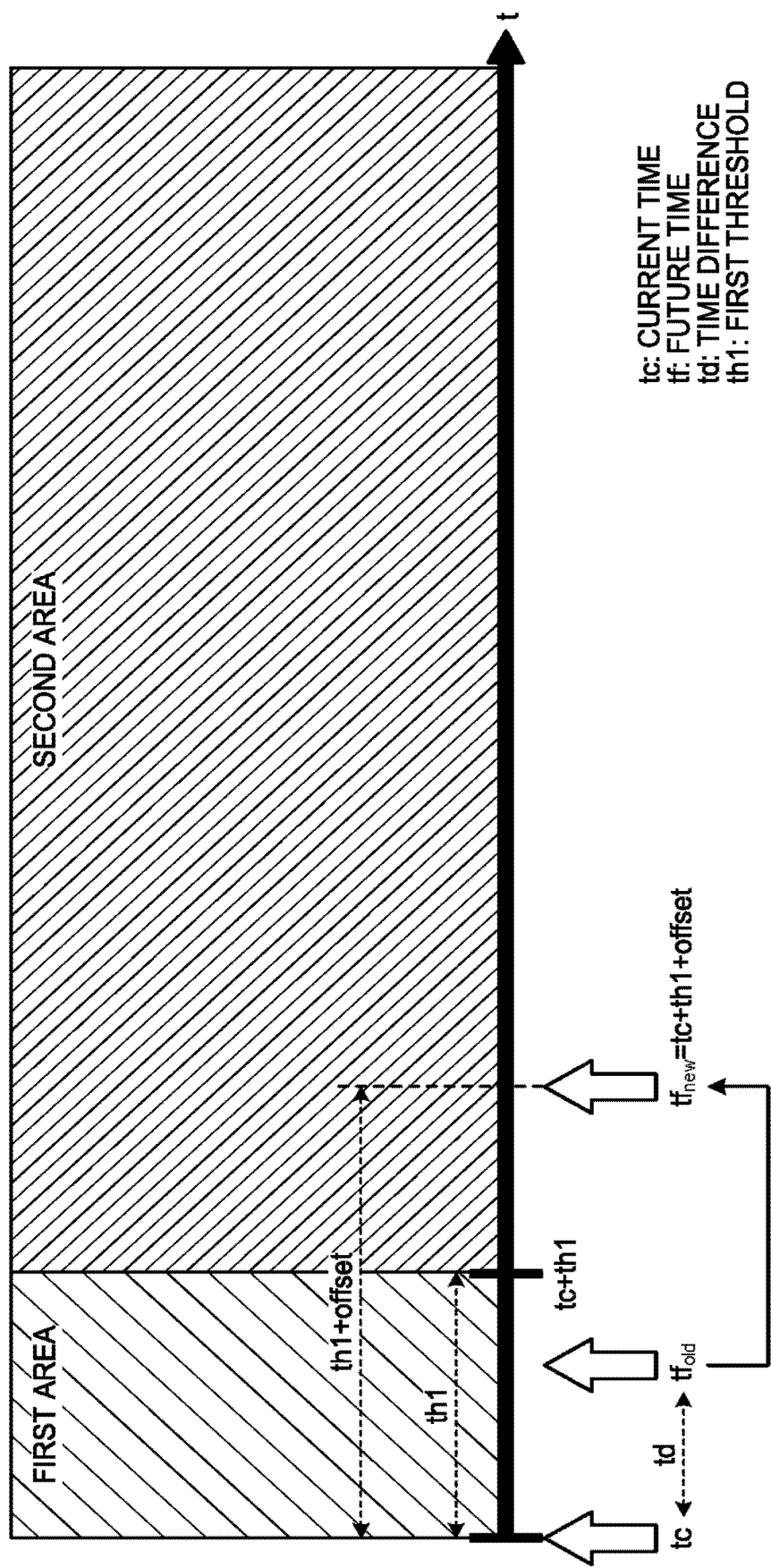
FIG. 81 is a diagram illustrating an example of updated future time.

Lastly, the prefetch notification unit 24-2 updates the future time tf forward based on the decrease quantity of the available time for transmission (Step S1308), and ends the second post processing. For example, the prefetch notification unit 24-2 may update the future time tf such that the time difference td between the future time tf and the current time tc is equal to or more than the first threshold th1 (td≥th1). For example, the prefetch notification unit 24-2 may update the future time tf by adding the decrease value (tc+th1−tf+offset) of the available time for transmission to the future time tf. In this case, the new future time $tf_{new}$ is "$tf_{new}=tf_{old}+tc+th1−tf_{old}+offset=tc+th1+offset$". The symbol "$tf_{old}$" indicates the future time before update. FIG. 81 is a diagram illustrating an example of the future time updated as described above. The method for updating the future time is not limited thereto, but may be a method based on, for example, at least any combination of the current time tc, the future time tf, the threshold th1, and the offset. For example, the future time may be updated by adding the same value as the decrease value of the available time for transmission to the future time tf. As another example, the future time tf may be updated such that the updated future time has a value obtained by adding the offset to the future time tf.

Figure 82:
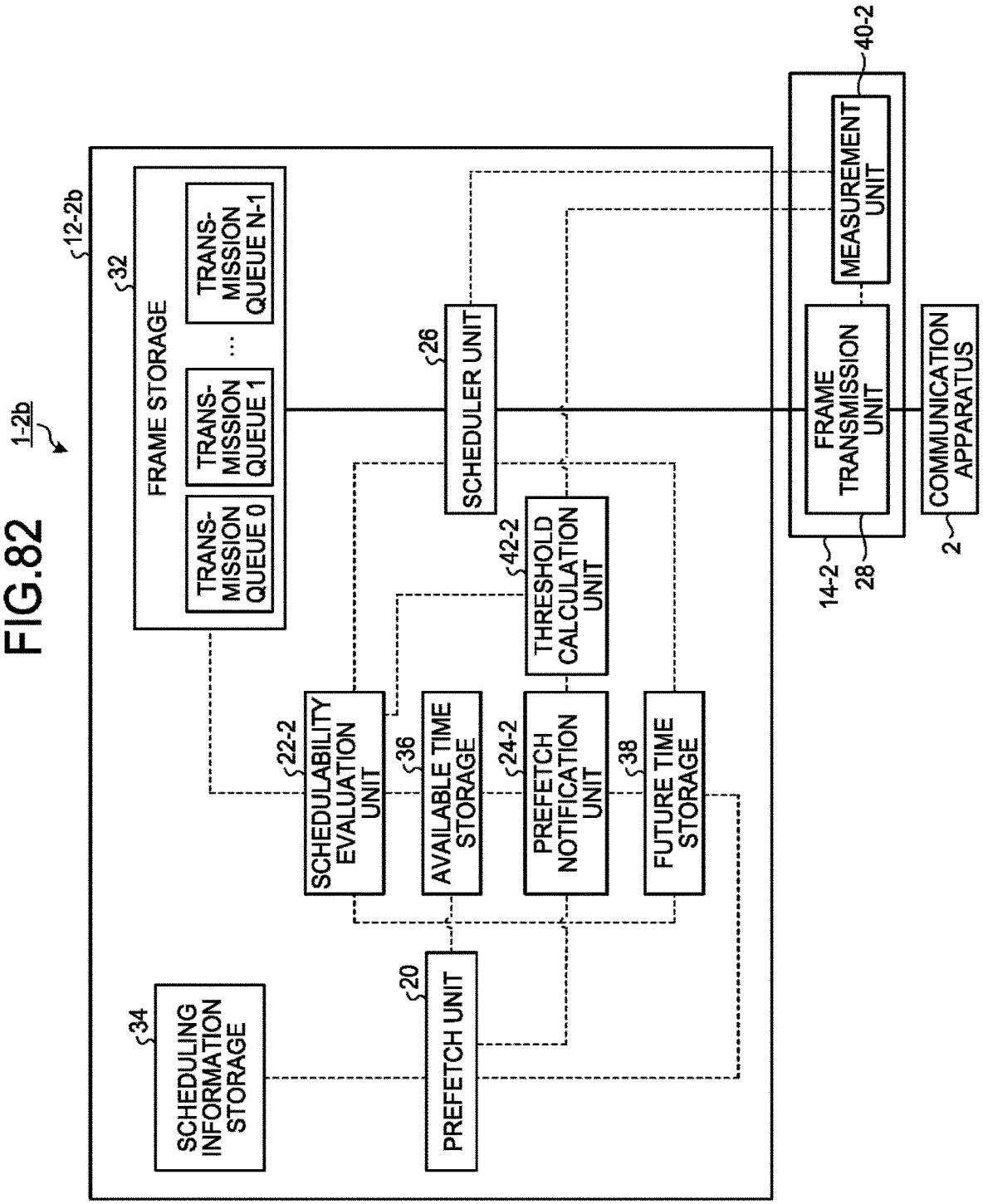
FIG. 82 is a diagram illustrating a functional configuration of an information processing system according to a modification.

The measurement unit 40-2 is not necessarily provided in the host 12-2. FIG. 82 is a diagram illustrating an example of a functional configuration of an information processing system 1-2b according to a modification of the second embodiment. The information processing system 1-2b is different from the second embodiment in structures of a host 12-2b and a transmission device 14-2. Specifically, the host 12-2b includes no measurement unit 40-2, but the transmission device 14-2 includes the measurement unit 40-2. This structure also achieves the same function as that of the second embodiment.

Third Embodiment

The second embodiment illustrates the example of dynamically updating the first threshold th1, as a function to deal with dynamic change in processing time. However, in the second embodiment, a single threshold (first threshold th1) is supposed, and the whole operation is controlled by simply comparing two values, that is, the time difference td between the current time tc and the future time tf and the first threshold th1. This structure is limited to dealing of two patterns in total, that is, the case where the time difference td is more than the first threshold th1 and the case where the time difference td is less than the first threshold th1, and may be impossible to sufficiently deal with change in processing time.

For this reason, the present embodiment uses two thresholds (first threshold th1 and second threshold th2). This structure enhances the timing accuracy of scheduling process in comparison with the second embodiment, and consequently enables more timely transmission of a frame requiring real-time performance.

Example of Functional Configuration

Figure 83:
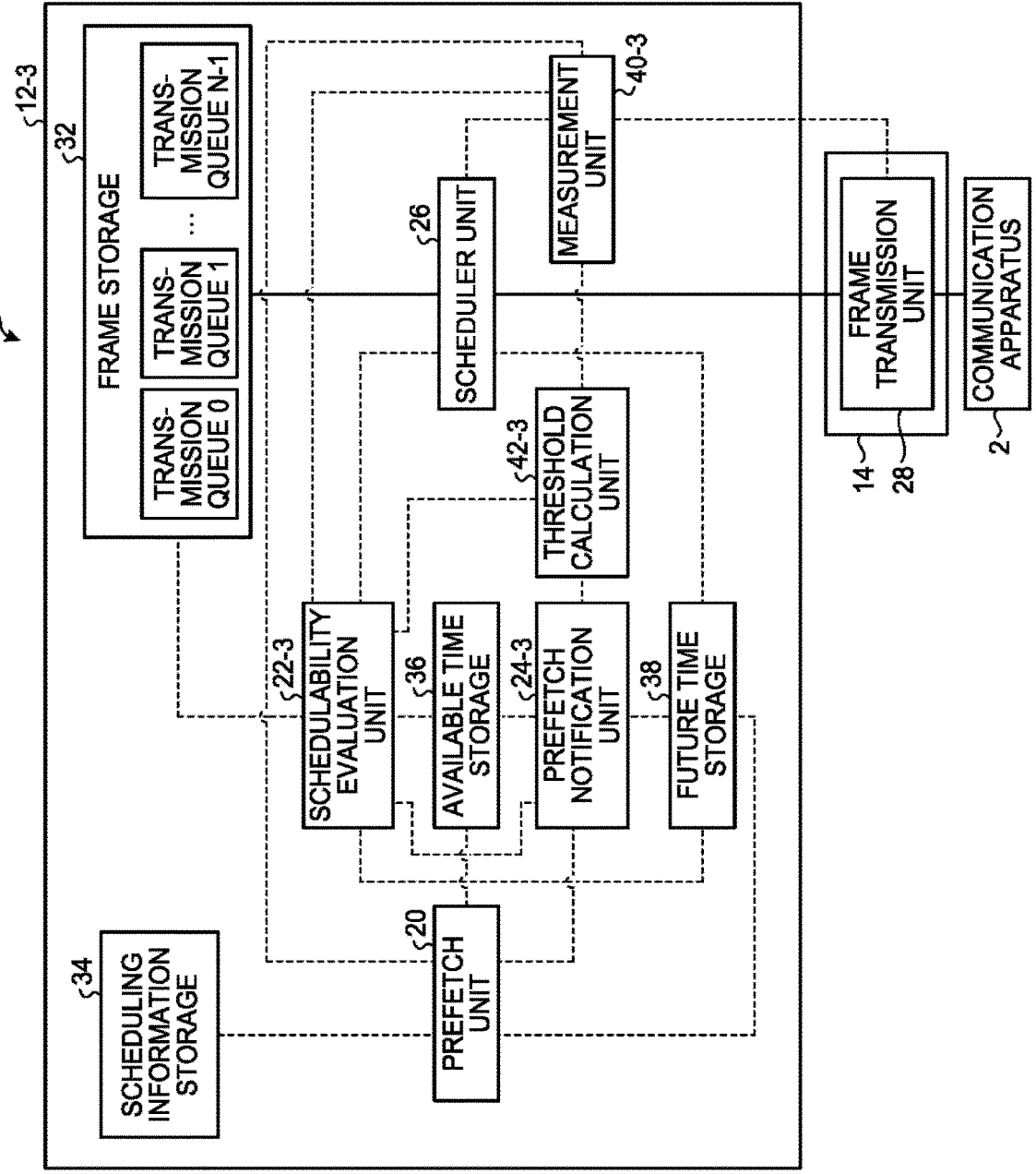
FIG. 83 is a diagram illustrating a functional configuration of an information processing system according to a third embodiment.

FIG. 83 is a diagram illustrating an example of a functional configuration of an information processing system 1-3 according to the third embodiment. The information processing system 1-3 has a structure in which a measurement unit 40-3 and a threshold calculation unit 42-3 are added to the processing units of the first embodiment. The information processing system 1-3 is different from the first embodiment in functions of a schedulability evaluation unit 22-3 and a prefetch notification unit 24-3 included in a host 12-3. Because the other configurations are the same as those of the first embodiment, they are denoted by the same reference numerals, and an explanation thereof is omitted.

Information Processing

The whole flow of information processing performed with the information processing apparatus (host 12-3 and transmission device 14) according to the third embodiment is similar to that in FIG. 75 illustrating information processing according to the second embodiment. When the third embodiment is compared with the second embodiment, the third embodiment is different therefrom in measurement process and threshold calculation process (Step S1003 in FIG. 75), schedulability evaluation process in prefetching process and scheduling process (Step S206 in FIG. 5), and second post processing (Step S214 in FIG. 5).

Measurement Process and Threshold Calculation Process

Figure 84:
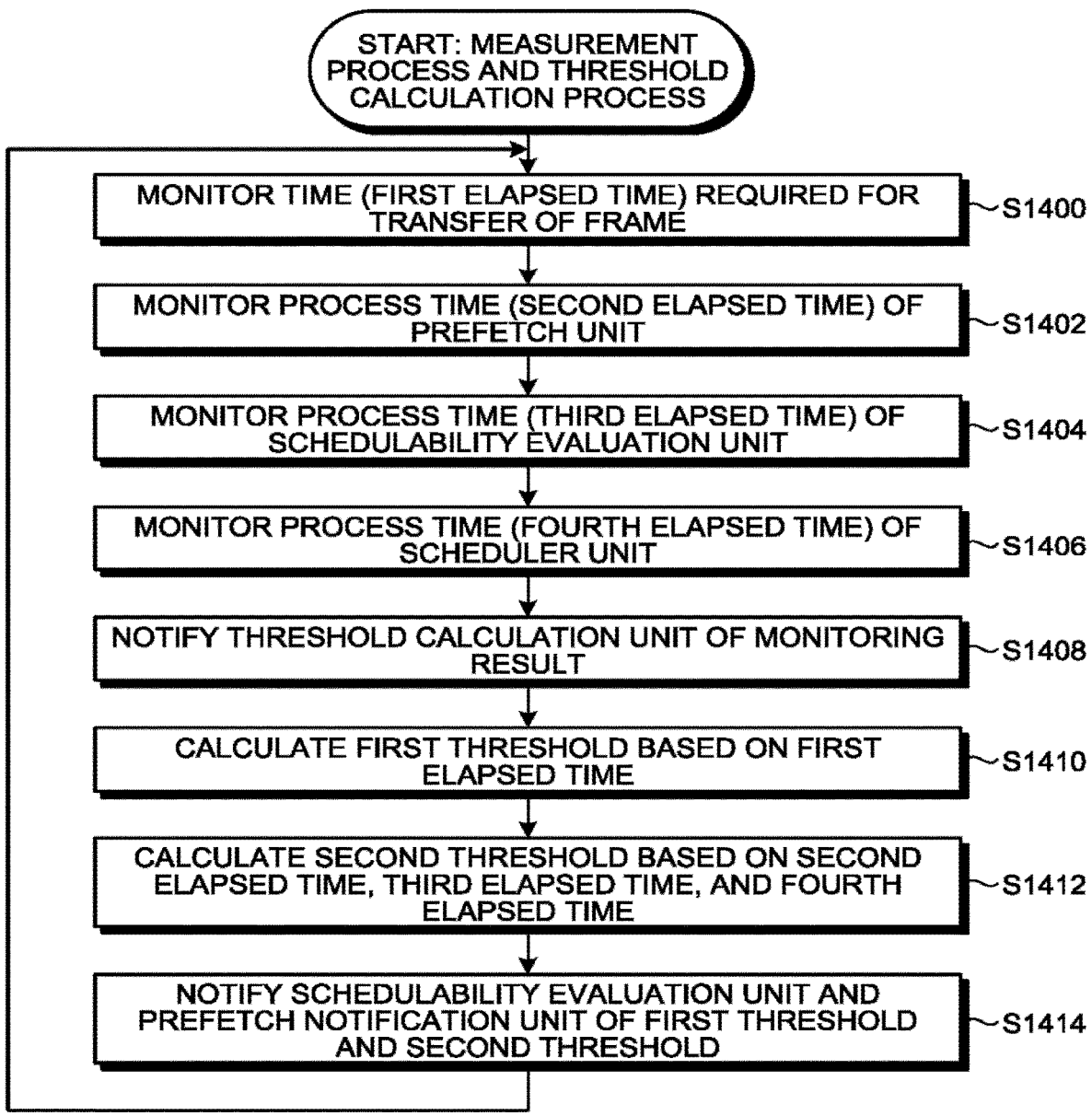
FIG. 84 is a detailed flowchart of measurement process and threshold calculation process according to the third embodiment.

FIG. 84 is a detailed flowchart of measurement process and threshold calculation process according to the third embodiment.

First, the measurement unit 40-3 monitors time (first elapsed time) required for transferring a frame from the scheduler unit 26 to the frame transmission unit 28 (Step S1400). This processing is similar to the processing at Step S1100 according to the second embodiment.

Thereafter, the measurement unit 40-3 monitors time (second elapsed time) required for processing performed with the prefetch unit 20 (Step S1402). For example, the overhead in reading of necessary information from the scheduling information storage 34 may serve as a cause of delay. The measurement unit 40-3 measures such elapsed time as the second elapsed time. The measurement unit 40-3 may measure the overhead or the like in update of information of the available time storage 36 as the second elapsed time. As another example, the measurement unit 40-3 may use, for example, the total time required for a series of processes performed with the prefetch unit 20 as the second elapsed time.

Thereafter, the measurement unit 40-3 monitors time (third elapsed time) required for processing performed with the schedulability evaluation unit 22-3 (Step S1404). For example, the overhead or the like in checking the state of the transmission queues of the frame storage 32 may serve as a cause of delay. The measurement unit 40-3 measures such elapsed time as the third elapsed time. The measurement unit 40-3 may measure the overhead or the like of the processing of determining a frame for which the starting time of transmission can be scheduled among frames retained in the transmission queues and waiting for transmission as the third elapsed time. As another example, the measurement unit 40-3 may use, for example, the total time required for a series of processes performed with the schedulability evaluation unit 22-3 as the third elapsed time.

Thereafter, the measurement unit 40-3 monitors time (fourth elapsed time) required for processing performed with the scheduler unit 26 (Step S1406). For example, the overhead or the like in reading of a frame from the frame storage 32 may serve as a cause of delay. The measurement unit 40-3 measures such elapsed time as the fourth elapsed time. The measurement unit 40-3 may measure the overhead or the like of the scheduling process itself as the fourth elapsed time. As another example, the measurement unit 40-3 may use the total time required for a series of processes performed with the scheduler unit 26 as the fourth elapsed time.

Thereafter, the measurement unit 40-3 notifies the threshold calculation unit 42-3 of the monitoring result (Step S1408). For example, the measurement unit 40-3 may write the monitoring result to the shared memory, and thereafter transmit a signal to notify the threshold calculation unit 42-3 of update of the monitoring result.

Thereafter, the threshold calculation unit 42-3 that has received notification from the measurement unit 40-3 calculates a first threshold th1 based on the first elapsed time (Step S1410). The threshold calculation unit 42-3 may select any proper method from various variations explained in detail in the second embodiment, when the first threshold th1 is calculated.

Thereafter, the threshold calculation unit 42-3 calculates a second threshold th2 based on the second elapsed time, the third elapsed time, and the fourth elapsed time (Step S1412). The threshold calculation unit 42-3 may select any proper method from various variations explained in detail in the second embodiment, when the second threshold th2 is calculated. For example, the threshold calculation unit 42-3 may calculate the total of the maximum values of the second elapsed time, the third elapsed time, and the fourth elapsed time, as the second threshold th2, based on the worst execution time. As another example, when the second threshold th2 is calculated, the threshold calculation unit 42-3 may refer to the value of at least one of the first elapsed time and the first threshold th1, and reflect the value on calculation of the second threshold th2.

Lastly, the threshold calculation unit 42-3 notifies the schedulability evaluation unit 22-3 and the prefetch notification unit 24-3 of the first threshold th1 and the second threshold th2 (Step S1414). For example, the threshold calculation unit 42-3 may write the thresholds in the shared memory, and thereafter transmit a signal notifying the schedulability evaluation unit 22-3 and the prefetch notification unit 24-3 of update of the values of the thresholds.

The measurement unit 40-3 and the threshold calculation unit 42-3 repeatedly perform the measurement process and the threshold calculation process illustrated in FIG. 84. Specifically, the measurement unit 40-3 continuously performs monitoring, and the threshold calculation unit 42-3 calculates each of the thresholds to reflect the latest monitoring result. With this structure, the third embodiment enables update of the values of the thresholds to deal with dynamic change in processing time.

Figure 85:
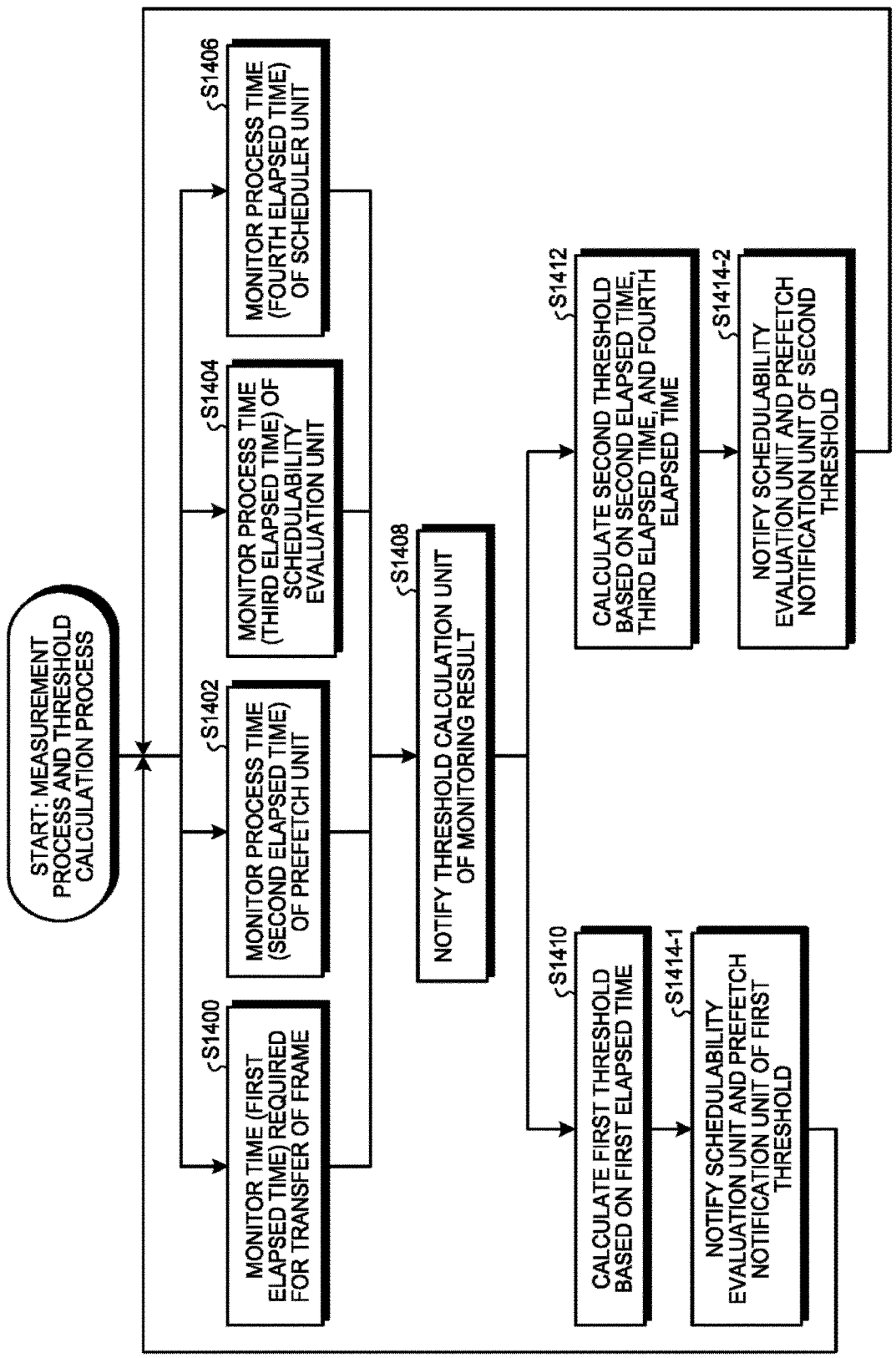
FIG. 85 is a detailed flowchart of measurement process and threshold calculation process according to the third embodiment.

The embodiment may be configured to perform at least part of the steps in FIG. 84 in parallel. FIG. 85 is an example of a detailed flowchart of measurement process and threshold calculation process including steps performed in parallel. In the example of FIG. 85, Steps S1400, S1402, S1404, and Step S1406 are performed in parallel. In addition, Steps S1410 and S1414-1, and Steps S1412 and S1414-2 are performed in parallel. Steps S1414-1 and S1414-2 correspond to steps obtained by dividing Step S1414 in FIG. 84.

Figure 86:
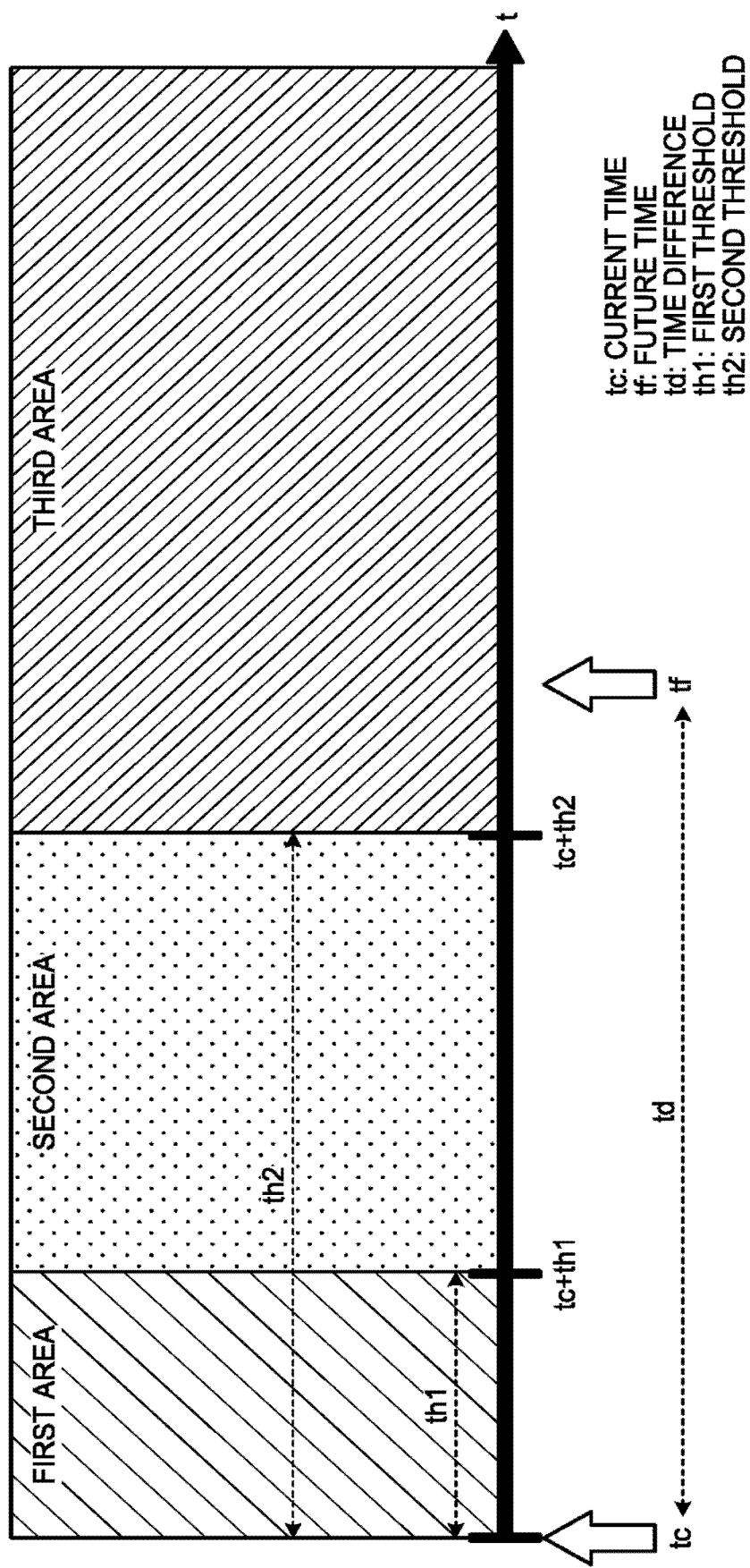
FIG. 86 is a diagram illustrating calculated first threshold and second threshold.

Applying the third embodiment increases patterns to deal with change in processing time in comparison with the second embodiment, and enables improvement in flexibility. FIG. 86 is a diagram illustrating an example of the calculated first threshold th1 and second threshold th2. As illustrated in FIG. 86, introduction of the second threshold th2 increases the number of dealing patterns from two (first area and second area in FIG. 77) to three (first area, second area, and third area in FIG. 86), in comparison with FIG. 77.

Schedulability Evaluation Process

Figure 87:
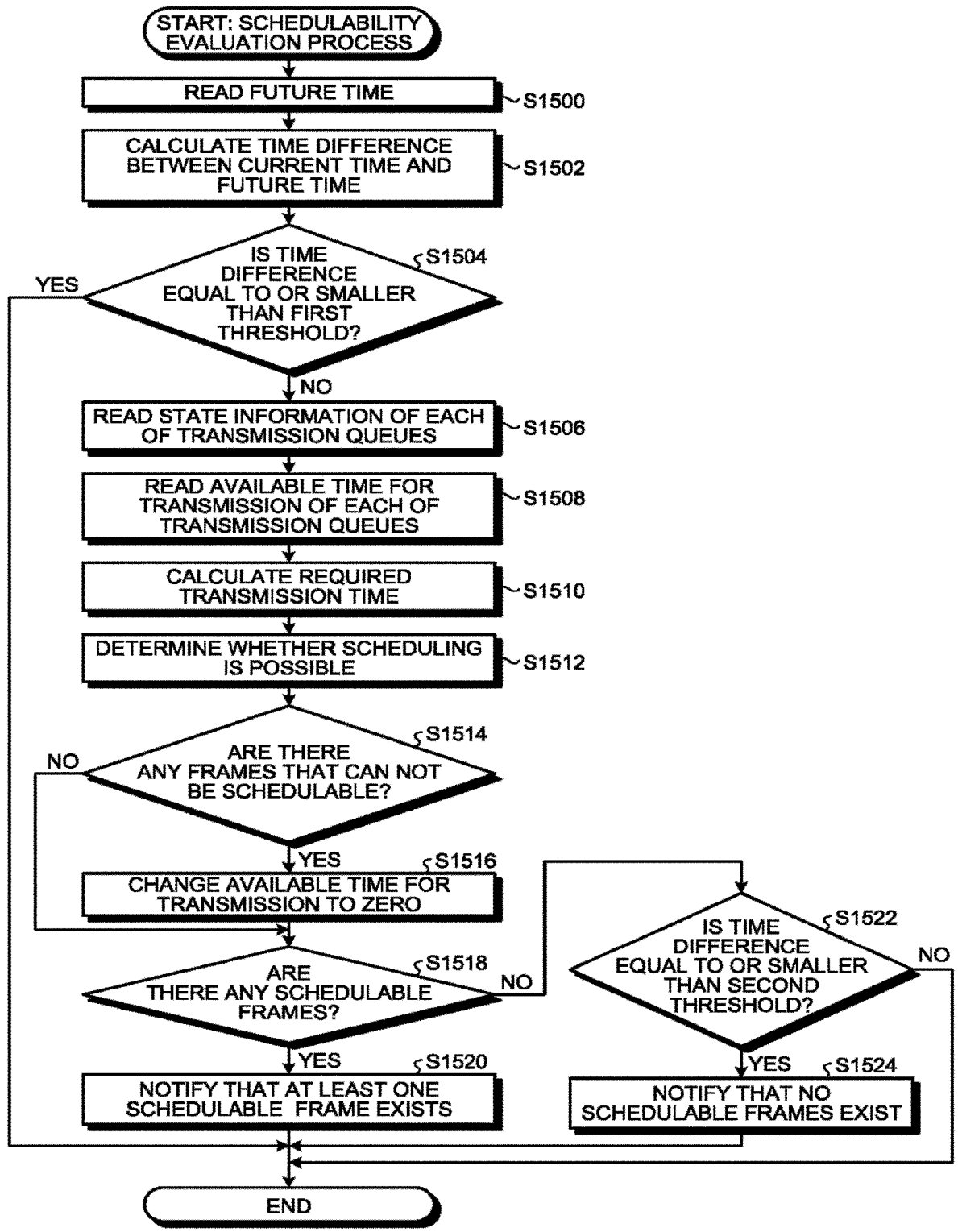
FIG. 87 is a detailed flowchart of schedulability evaluation process according to the third embodiment.

FIG. 87 is a detailed flowchart of schedulability evaluation process according to the third embodiment. Step S1500 to Step S1516 are the same as Step S1200 to Step S1216 indicating the schedulability evaluation process according to the second embodiment in FIG. 79, and an explanation thereof is omitted.

After Step S1516, the schedulability evaluation unit 22-3 determines whether there are schedulable frames (Step S1518). The schedulability evaluation unit 22-3 performs determination at Step S1516 by determining whether the determination result at Step S1512 includes any frame determined as a schedulable frame.

When it is determined that there are schedulable frames (Yes at Step S1518), the schedulability evaluation unit 22-3 notifies the scheduler unit 26 that at least one schedulable frame exist (Step S1520). Thereafter, the present routine is ended.

When it is determined that there are no schedulable frames (No at Step S1518), the schedulability evaluation unit 22-3 compares the second threshold th2 notified from the threshold calculation unit 42-3 with the time difference td, and determines whether the time difference td is equal to or less than the second threshold th2 (Step S1522). When the time difference td is more than the second threshold th2 (No at Step S1522), the present routine is ended. By contrast, when the time difference td is equal to or less than the second threshold th2 (Yes at Step S1522), the schedulability evaluation unit 22-3 notifies the prefetch notification unit 24-3 that there are no schedulable frames (Step S1524), and ends the present routine.

Second Post Processing

Figure 88:
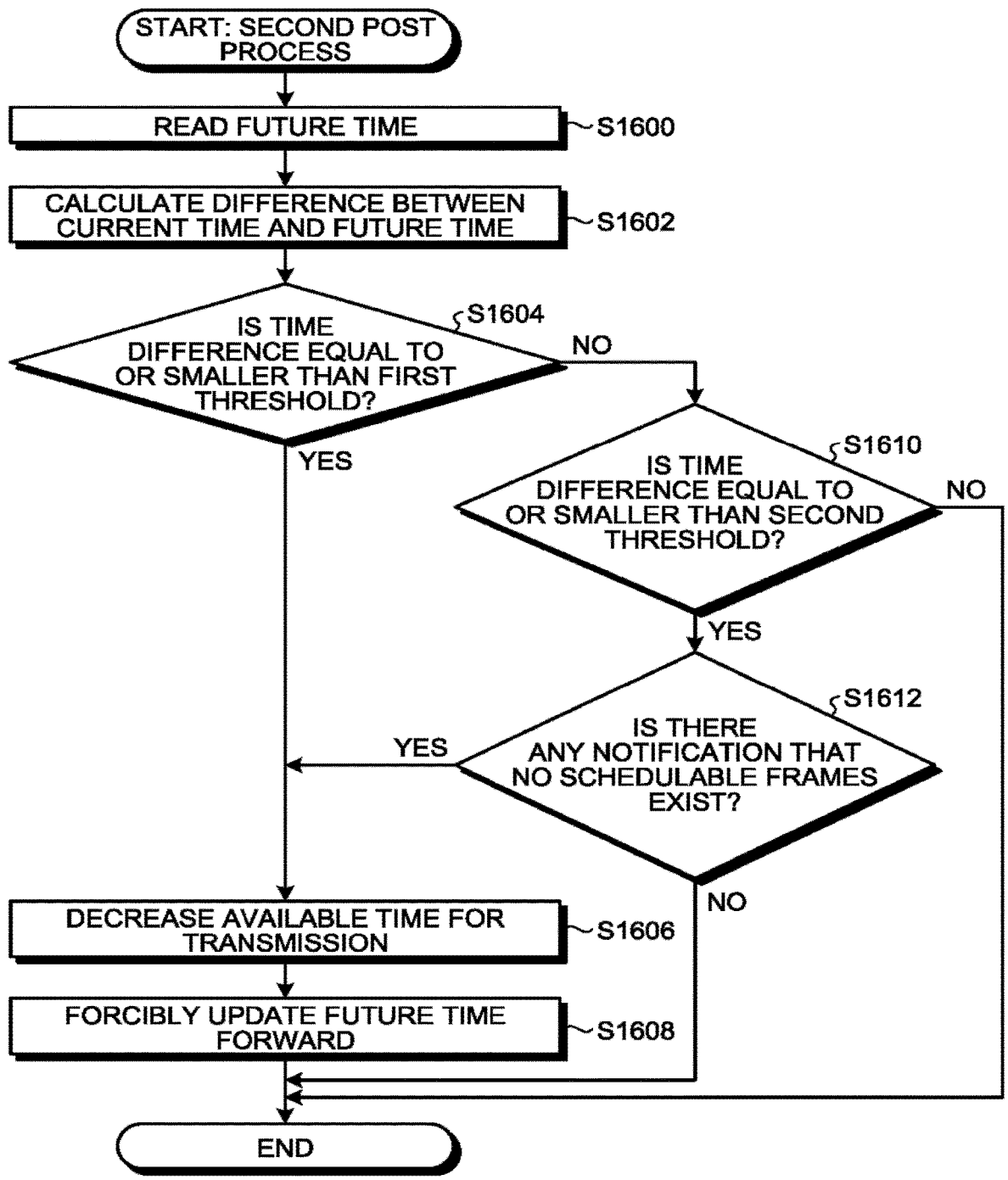
FIG. 88 is a detailed flowchart of second post processing according to the third embodiment.

FIG. 88 is a detailed flowchart of second post processing according to the third embodiment. Step S1600 and Step S1602 are the same as Step S800 and Step S802 included in the second post processing according to the first embodiment, and an explanation thereof is omitted.

Thereafter, the prefetch notification unit 24-3 compares the first threshold th1 notified from the threshold calculation unit 42-3 with the time difference td, and determines whether the tie different td is equal to or less than the first threshold th1 (Step S1604).

When the time difference td is more than the first threshold th1 (No at Step S1604), the prefetch notification unit 24-3 further compares the second threshold th2 notified from the threshold calculation unit 42-3 with the time difference td, and determines whether the time difference td is equal to or less than the second threshold th2 (Step S1610). When the time difference td is more than the second threshold th2 (No at Step S1610), the present routine is ended.

By contrast, when the time difference td is equal to or less than the second threshold th2 (Yes at Step S1610), the prefetch notification unit 24-3 checks whether there is any notification notifying that no schedulable frames exist has been received from the schedulability evaluation unit 22-3 (Step S1612). When there is no notification has been received from the schedulability evaluation unit 22-3 (No at Step S1612), the present routine is ended.

When it is determined at Step S1604 that the time difference td is equal to or less than the first threshold th1 (Yes at Step S1604) or when it is determined at Step S1612 that a notification has been received from the schedulability evaluation unit 22-3 (Yes at Step S1612), the prefetch notification unit 24-3 decreases the available time for transmission corresponding to each of the transmission queues by a fixed quantity, to update the available time for transmission information 36A stored in the available time storage 36 (Step S1606).

For example, when "td≤th1" is satisfied, the prefetch notification unit 24-3 may decrease the available time for transmission by subtracting the value (tc+th1−tf+offset) obtained by adding a fixed offset to the value (tc+th1−tf) obtained by subtracting the future time tf from the sum of the current time tc and the first threshold th1 from the available time for transmission of each of the transmission queues, in the same manner as the second embodiment.

As another example, when "th1<td≤th2" is satisfied, the prefetch notification unit 24-3 may decrease the available time for transmission by subtracting the value (tc+th2−tf+offset) obtained by adding a fixed offset to the value (tc+th2−tf) obtained by subtracting the future time tf from the sum of the current time tc and the second threshold th2 from the available time for transmission of each of the transmission queues.

Lastly, the prefetch notification unit 24-3 updates the future time tf forward (Step S1608) based on the decrease quantity of the available time for transmission, and ends the second post processing.

Figure 89:
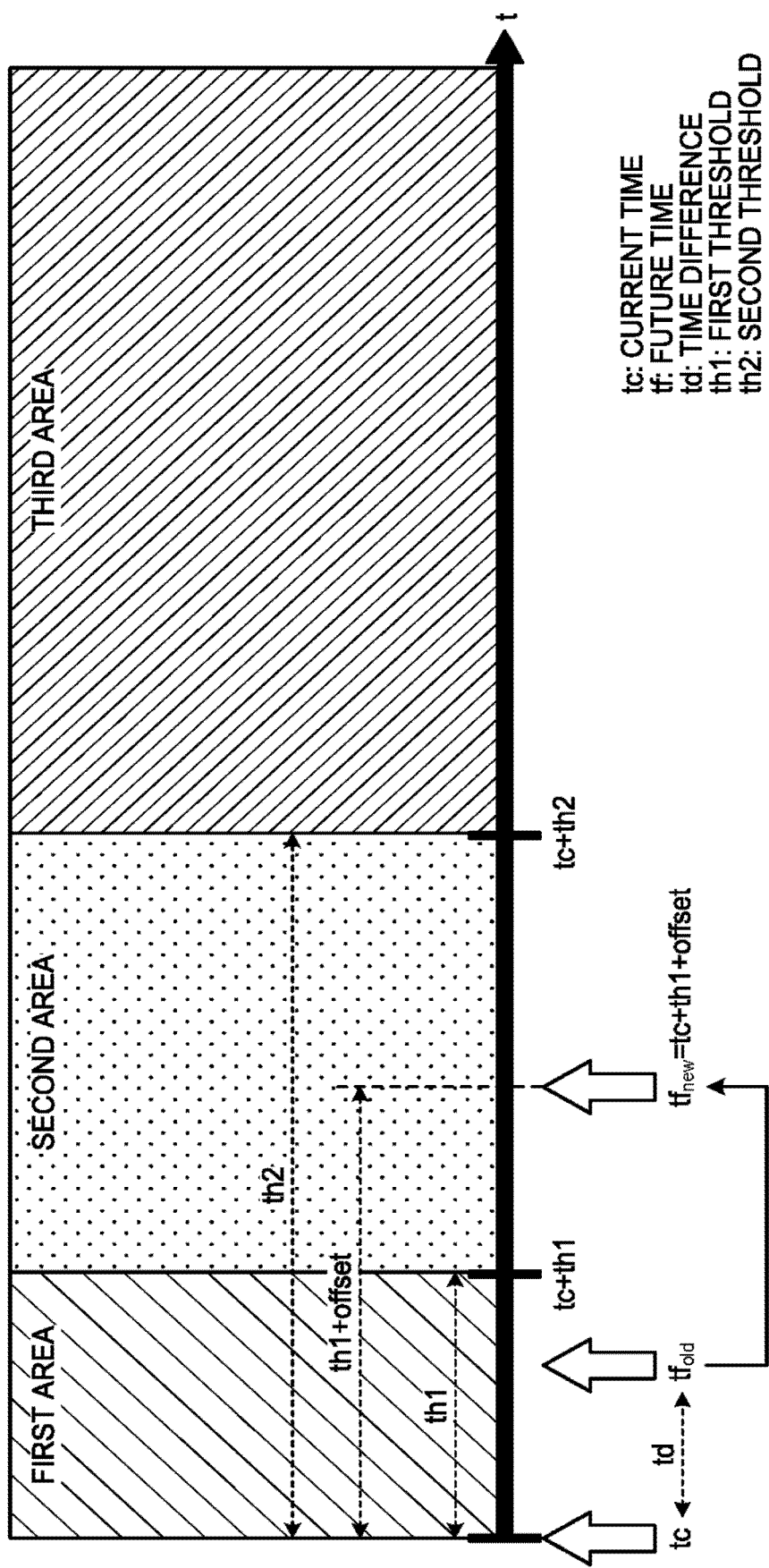
FIG. 89 is a diagram illustrating an example of updated future time.

For example, when "td≤th1" is satisfied, the prefetch notification unit 24-3 may update the future time tf such that the time difference td between the future time tf and the current time tc is equal to or more than the first threshold th1 (td≥th1), in the same manner as the second embodiment. For example, the prefetch notification unit 24-3 may update the future time tf by adding the decrease value (tc+th1−tf+offset) of the available time for transmission to the future time tf. In this case, the new future time $tf_{new}$ is "$tf_{new}=tf_{old}+tc+th1-tf_{old}+offset=tc+th1+offset$". FIG. 89 is a diagram illustrating an example of the future time updated as described above.

Figure 90:
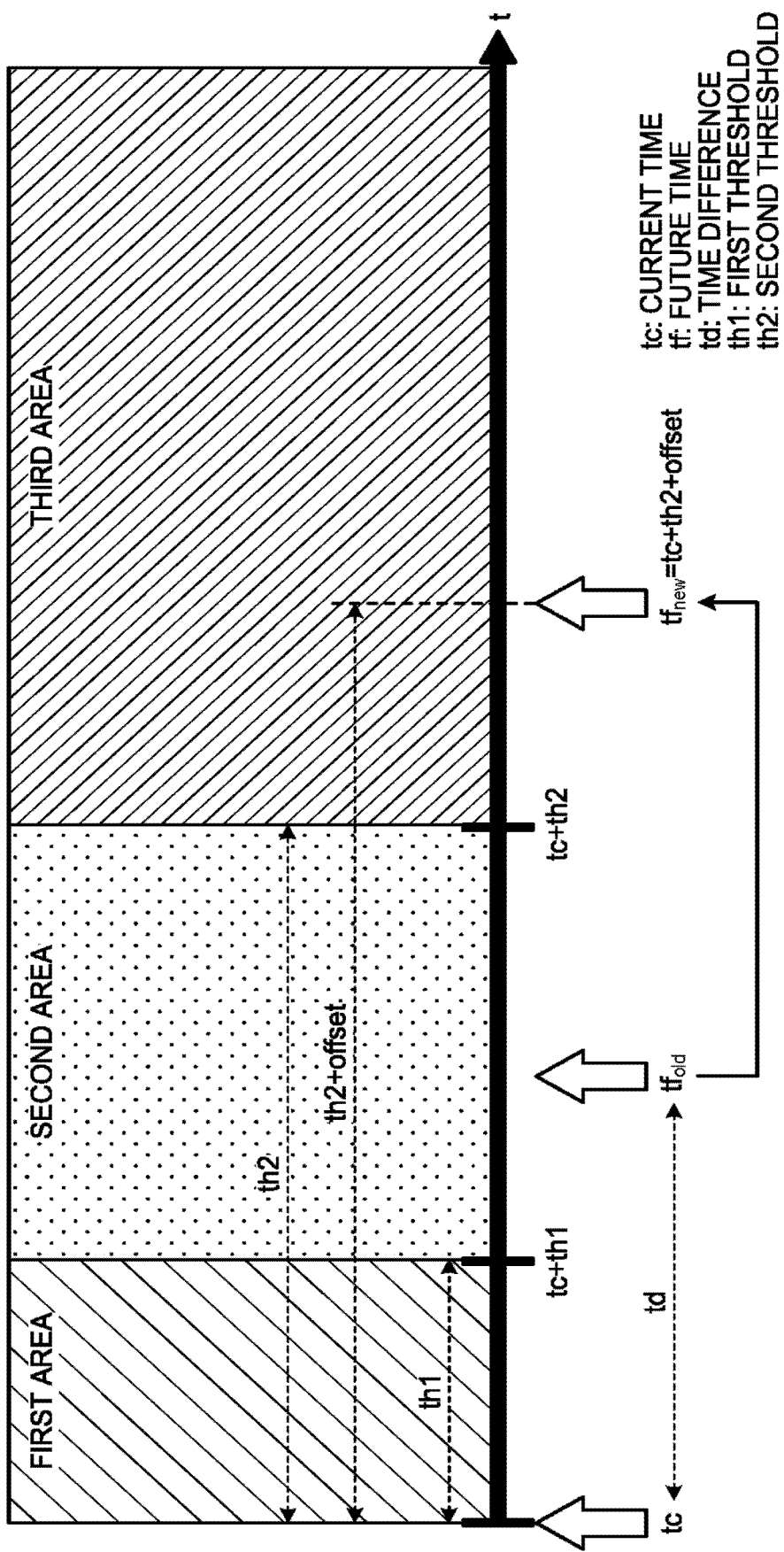
FIG. 90 is a diagram illustrating an example of updated future time.

In addition, for example, when "th1<td≤th2" is satisfied, the prefetch notification unit 24-3 may update the future time tf such that the time difference td between the future time tf and the current time tc is equal to or more than the second threshold th2 (td≥th2). For example, the prefetch notification unit 24-3 may update the future time tf by adding the decrease value (tc+th2−tf+offset) of the available time for transmission to the future time tf. In this case, the new future time $tf_{new}$ is "$tf_{new}=tf_{old}+tc+th2-tf_{old}+offset=tc+th2+offset$". FIG. 90 is a diagram illustrating an example of the future time updated as described above.

Fourth Embodiment

The third embodiment illustrates the example of using two thresholds (first threshold th1 and second threshold th2), as a function to deal with dynamic change in processing time. In the present embodiment, three thresholds (first threshold th1, second threshold th2, and third threshold th3) are used, as a method for improving a robust property with respect to change in processing time. This structure enhances timing accuracy of scheduling process in comparison with the third embodiment, and consequently enables more timely transmission of a frame requiring real-time performance.

Example of Functional Configuration

Figure 91:
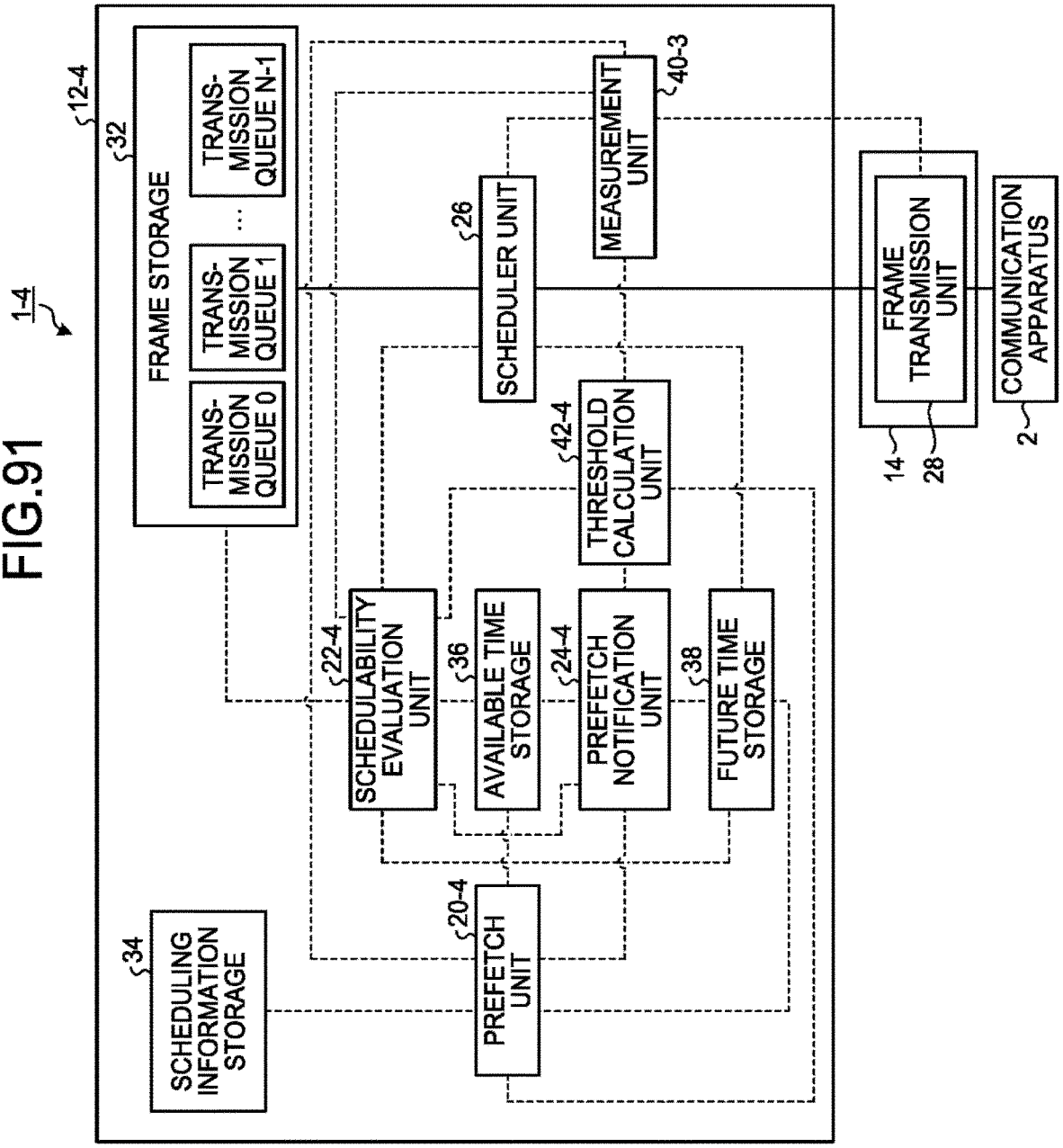
FIG. 91 is a diagram illustrating a functional configuration of an information processing system according to a fourth embodiment.

FIG. 91 is a diagram illustrating a functional configuration of an information processing system 1-4 according to the fourth embodiment. The information processing system 1-4 has a structure in which a measurement unit 40-3 and a threshold calculation unit 42-4 are added to the processing units of the first embodiment. In addition, the information processing system 1-4 is different from the first embodiment in functions of a prefetch unit 20-4, a schedulability evaluation unit 22-4, and a prefetch notification unit 24-4 included in a host 12-4. Because the other configurations are the same as those in the first embodiment, they are denoted by the same reference numerals, and an explanation thereof is omitted. Because the measurement unit 40-3 is the same as that in the third embodiment, the unit is denoted by the same reference numeral, and an explanation thereof is omitted.

Information Processing

The whole flow of information processing of the information processing apparatus (host 12-4 and transmission device 14) of the fourth embodiment is the same as that illustrated in FIG. 75 illustrating information processing according to the second embodiment. When it is compared with the second embodiment, the fourth embodiment is different therefrom in the measurement process and the threshold calculation process (Step S1003 of FIG. 75), the initialization processing in the prefetching process and the scheduling process (Step S200 in FIG. 5), the prefetching process (Step S202 in FIG. 5), the schedulability evaluation process (Step S206 in FIG. 5), and the second post processing (Step S214 in FIG. 5).

Initialization Processing

Figure 92:
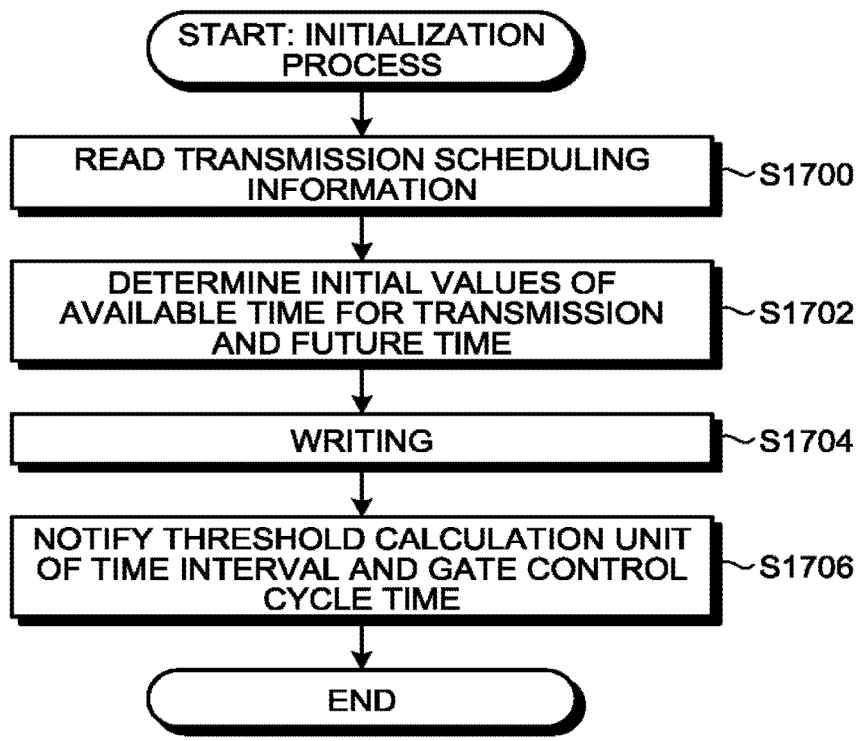
FIG. 92 is a detailed flowchart of initialization processing according to the fourth embodiment.

FIG. 92 is a detailed flowchart of initialization processing according to the fourth embodiment. Step S1700 to Step S1704 are the same as Step S300 to Step S304 in the initialization processing according to the first embodiment, and an explanation thereof is omitted.

Lastly, the prefetch unit 20-4 notifies the threshold calculation unit 42-4 of the time interval and the gate control cycle time (Step S1706), and ends the present routine.

Prefetching Process

Figure 93:
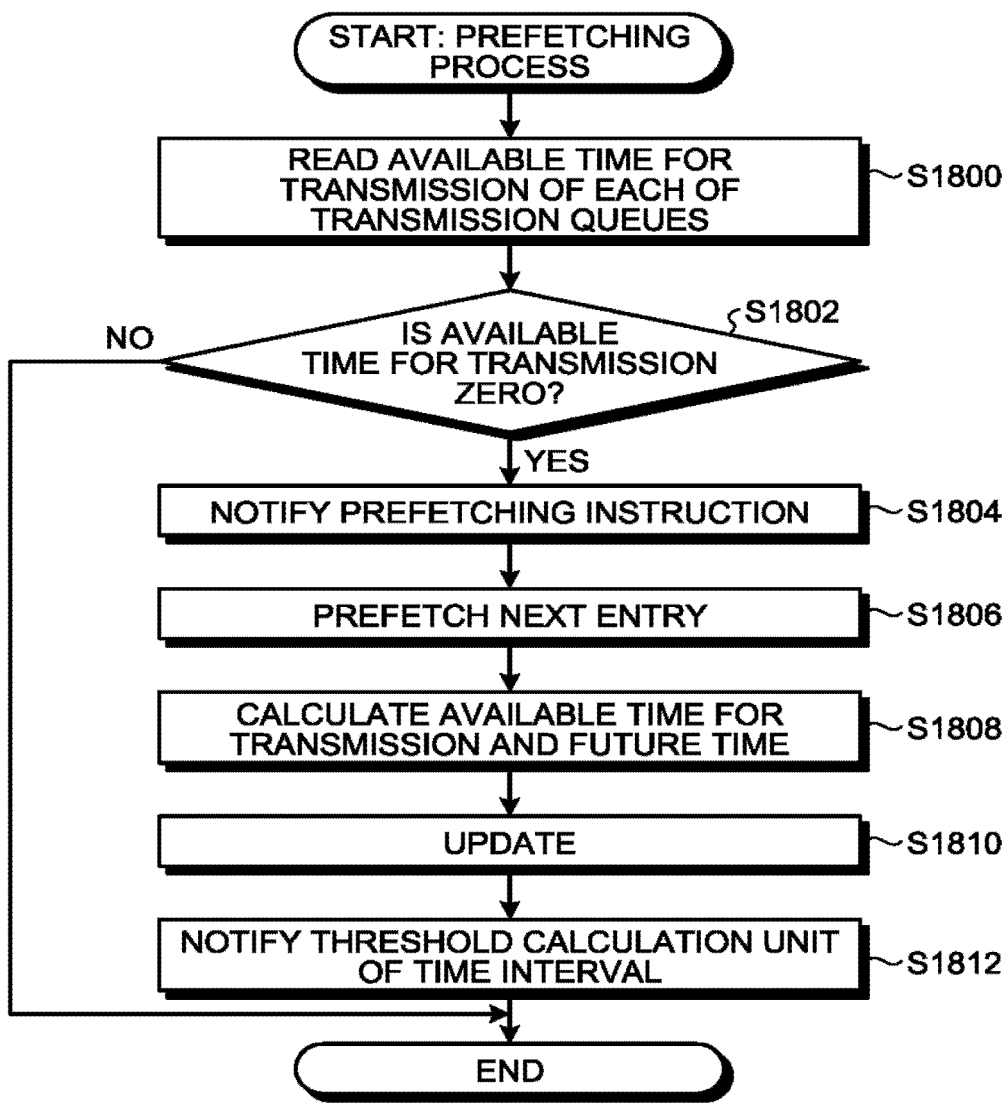
FIG. 93 is a detailed flowchart illustrating prefetching process according to the fourth embodiment.

FIG. 93 is a detailed flowchart of prefetching process according to the fourth embodiment. Step S1800 to Step S1810 are the same as Step S400 to Step S410 in the prefetching process according to the first embodiment, and an explanation thereof is omitted.

Lastly, the prefetch unit 20-4 notifies the threshold calculation unit 42-4 of the time interval (Step S1812), and ends the present routine.

Measurement Process and Threshold Calculation Process

Figure 94:
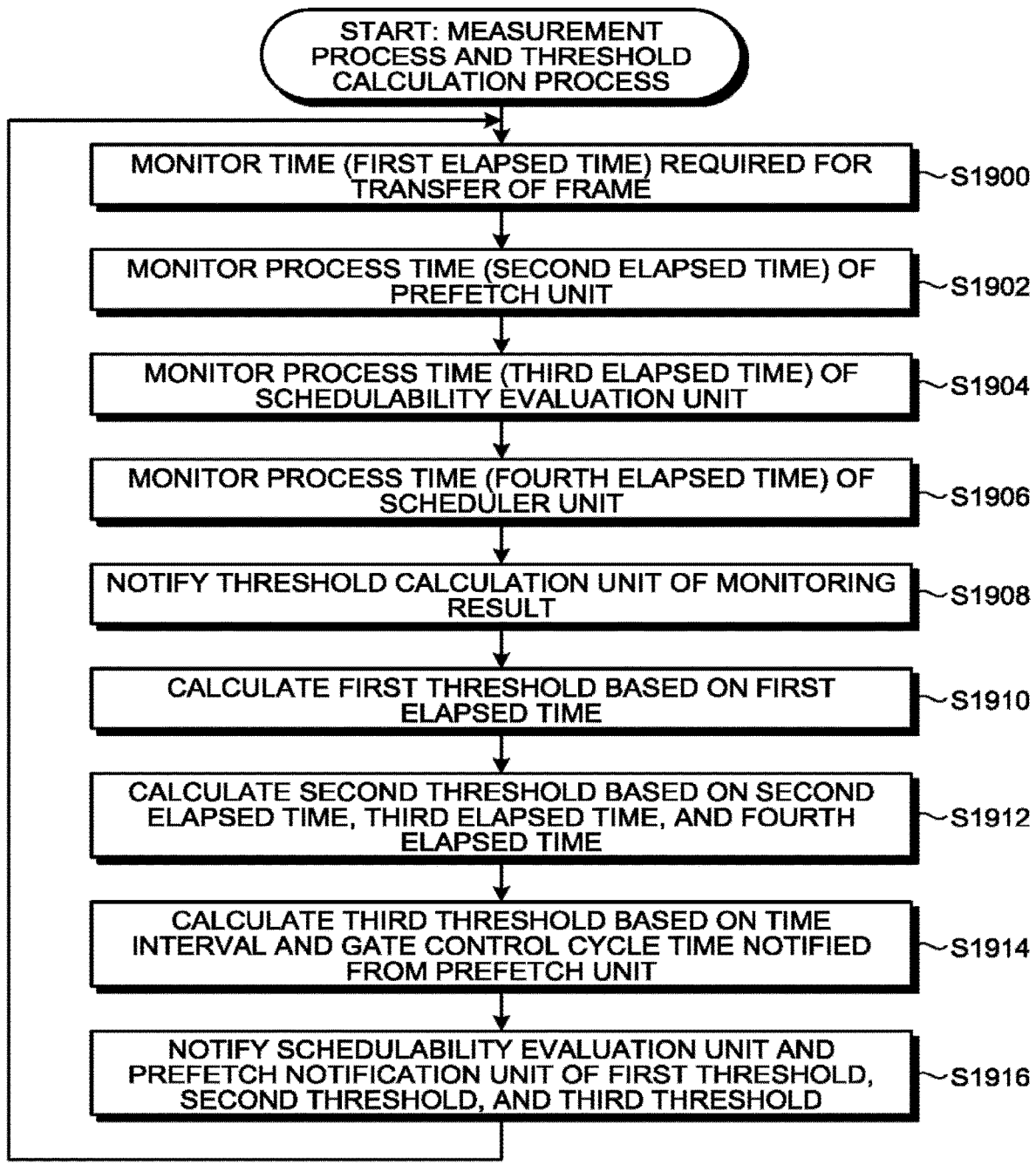
FIG. 94 is a detailed flowchart of measurement process and threshold calculation process according to the fourth embodiment.

FIG. 94 is a detailed flowchart of measurement process and threshold calculation process. Step S1900 to Step S1912 are the same as Step S1400 to Step S1412 of the measurement process and the threshold calculation process (FIG. 84) according to the third embodiment, and an explanation thereof is omitted.

Thereafter, the threshold calculation unit 42-4 calculates a third threshold th3 based on the time interval and the gate control cycle time notified from the prefetch unit 20-4 (Step S1914).

As explained below, there is a situation in which schedulability evaluation process should be temporarily suspended when the time difference td between the future time tf and the current time tc is equal to or more than a fixed value (threshold). For example, suppose that the available time for transmission is assigned to both a transmission queue of low priority and a transmission queue of high priority at the future time tf, and certain application writes a large quantity of frames to the transmission queue of low priority in a burst manner. In such a situation, if the transmission queue of high priority is empty, frames written to the transmission queue of low priority are successively scheduled with priority, and the transmission timing of the frame written to the transmission queue of high priority may be excessively delayed.

The third threshold th3 is used for suppressing occurrence of such a situation. The threshold calculation unit 42-4 may calculate, for example, a value obtained by adding a certain offset to the time interval or the gate control cycle time, as the third threshold th3. The schedulability evaluation unit 22-4 compares the time difference td between the future time tf and the current time tc with the third threshold th3, to enable determination as to whether to suspend the schedulability evaluation process.

Lastly, the threshold calculation unit 42-4 notifies the schedulability evaluation unit 22-4 and the prefetch notification unit 24-4 of the first threshold th1, the second threshold th2, and the third threshold th3. For example, the threshold calculation unit 42-4 may write the thresholds to the shared memory, and thereafter transmit a signal to notify the schedulability evaluation unit 22-4 and the prefetch notification unit 24-4 of update of values of the thresholds.

The measurement unit 40-3 and the threshold calculation unit 42-4 repeatedly perform the processing illustrated in FIG. 94. Specifically, the measurement unit 40-3 continuously performs monitoring, and the threshold calculation unit 42-4 calculates the thresholds to reflect the latest monitoring result. With this structure, the fourth embodiment enables update of values of the thresholds to deal with dynamic change in processing time.

Figure 95:
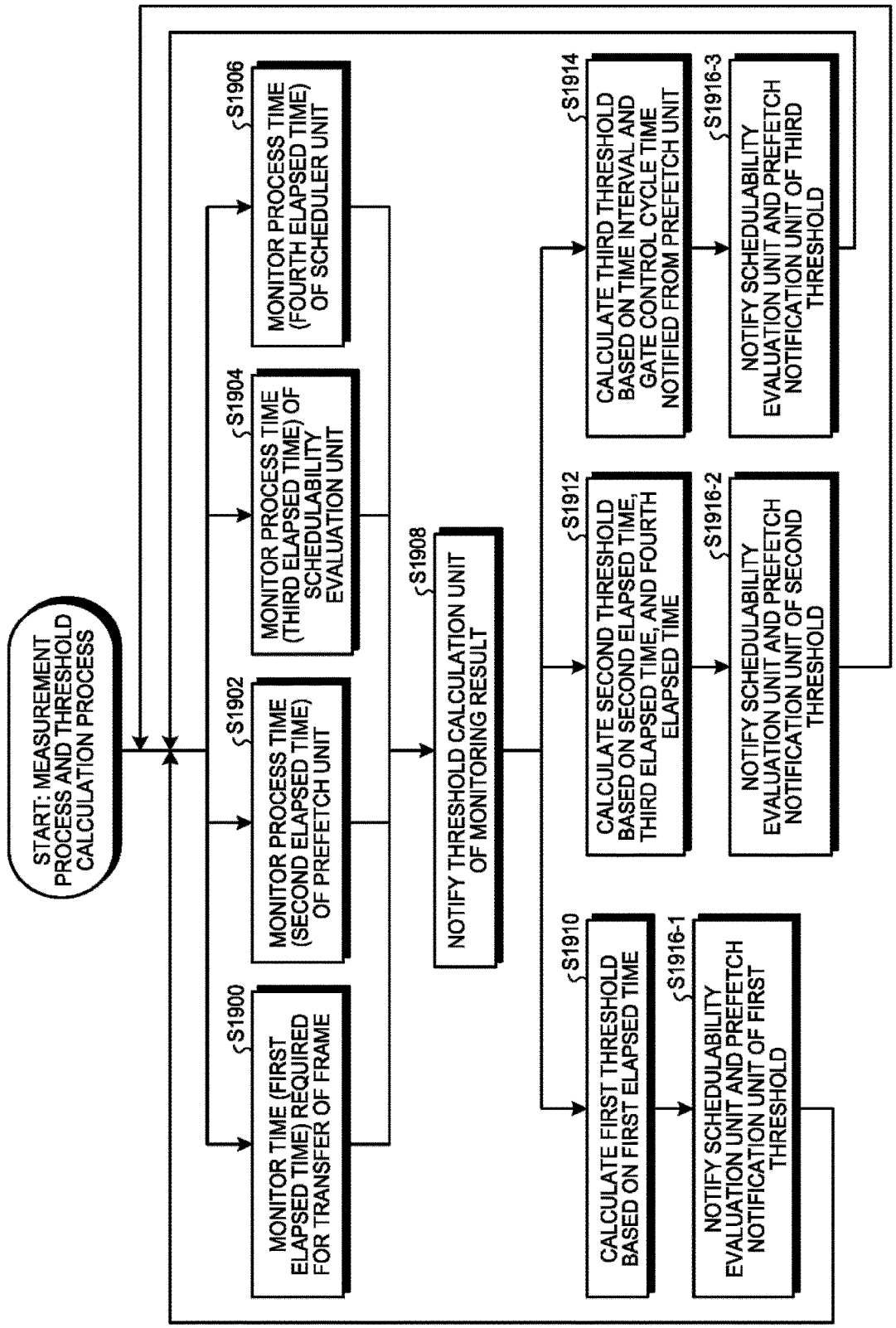
FIG. 95 is a detailed flowchart of measurement process and threshold calculation process according to the fourth embodiment.

The embodiment may be configured to perform at least part of the steps in FIG. 94 in parallel. FIG. 95 is an example of a detailed flowchart of measurement process and threshold calculation process including steps performed in parallel. In the example of FIG. 95, Steps S1900, S1902, S1904, and S1906 are performed in parallel. In addition, Steps S1910 and S1916-1, Steps S1912 and S1916-2, and Steps S1914 and S1916-3 are performed in parallel. Steps S1916-1 to S1916-3 correspond to steps obtained by dividing Step S1916 of FIG. 94.

Figure 96:
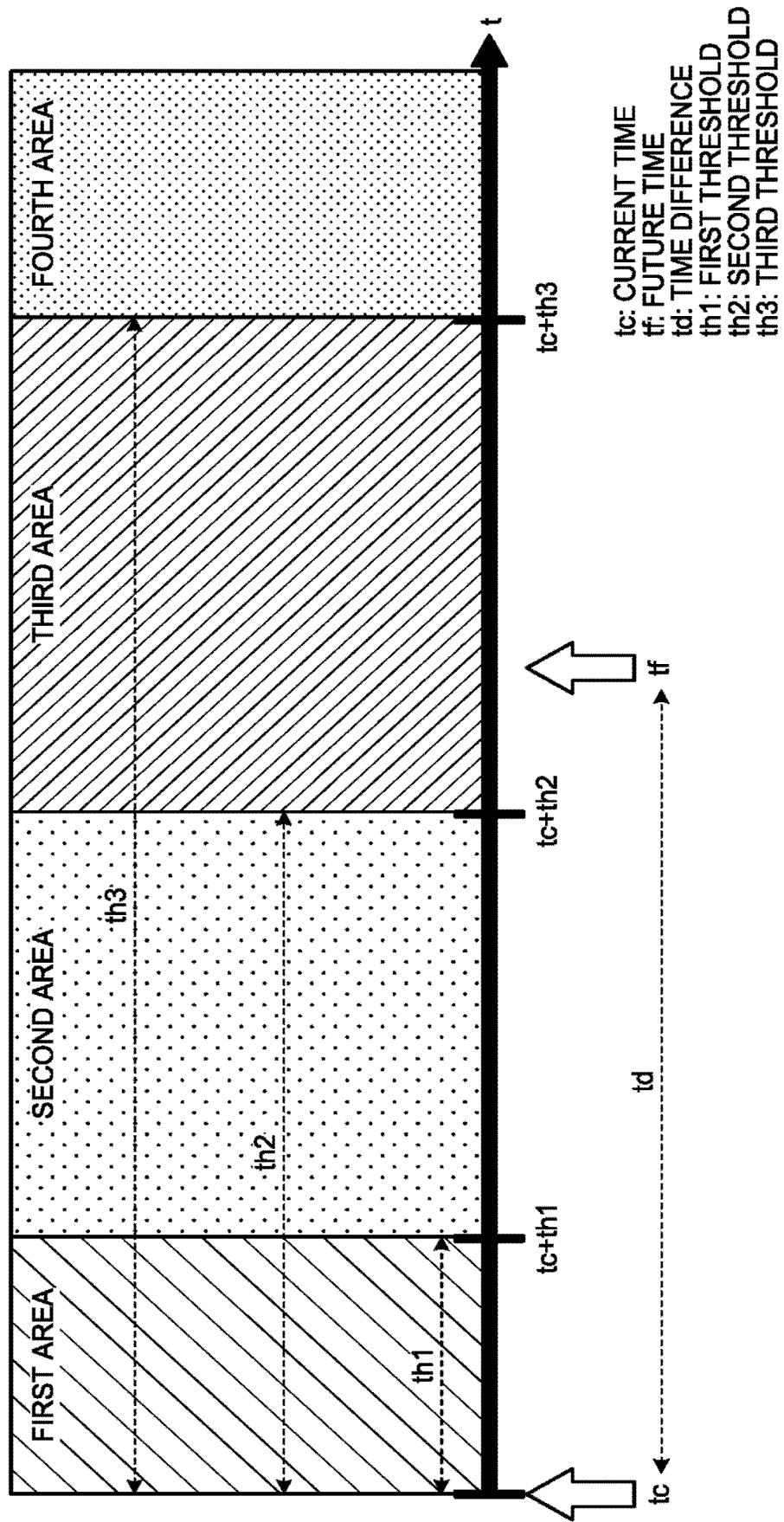
FIG. 96 is a diagram illustrating an example of calculated first threshold, second threshold, and third threshold.

Applying the fourth embodiment increases patterns to deal with change in processing time in comparison with the third embodiment, and enables improvement in flexibility. FIG. 96 is a diagram illustrating an example of the calculated first threshold th1, second threshold th2, and third threshold th3. As illustrated in FIG. 96, introduction of the third threshold th3 increases the number of dealing patterns from three (first area, second area, and third area in FIG. 86) to four (first area, second area, third area, and fourth area in FIG. 96), in comparison with FIG. 86.

Schedulability Evaluation Process

Figure 97:
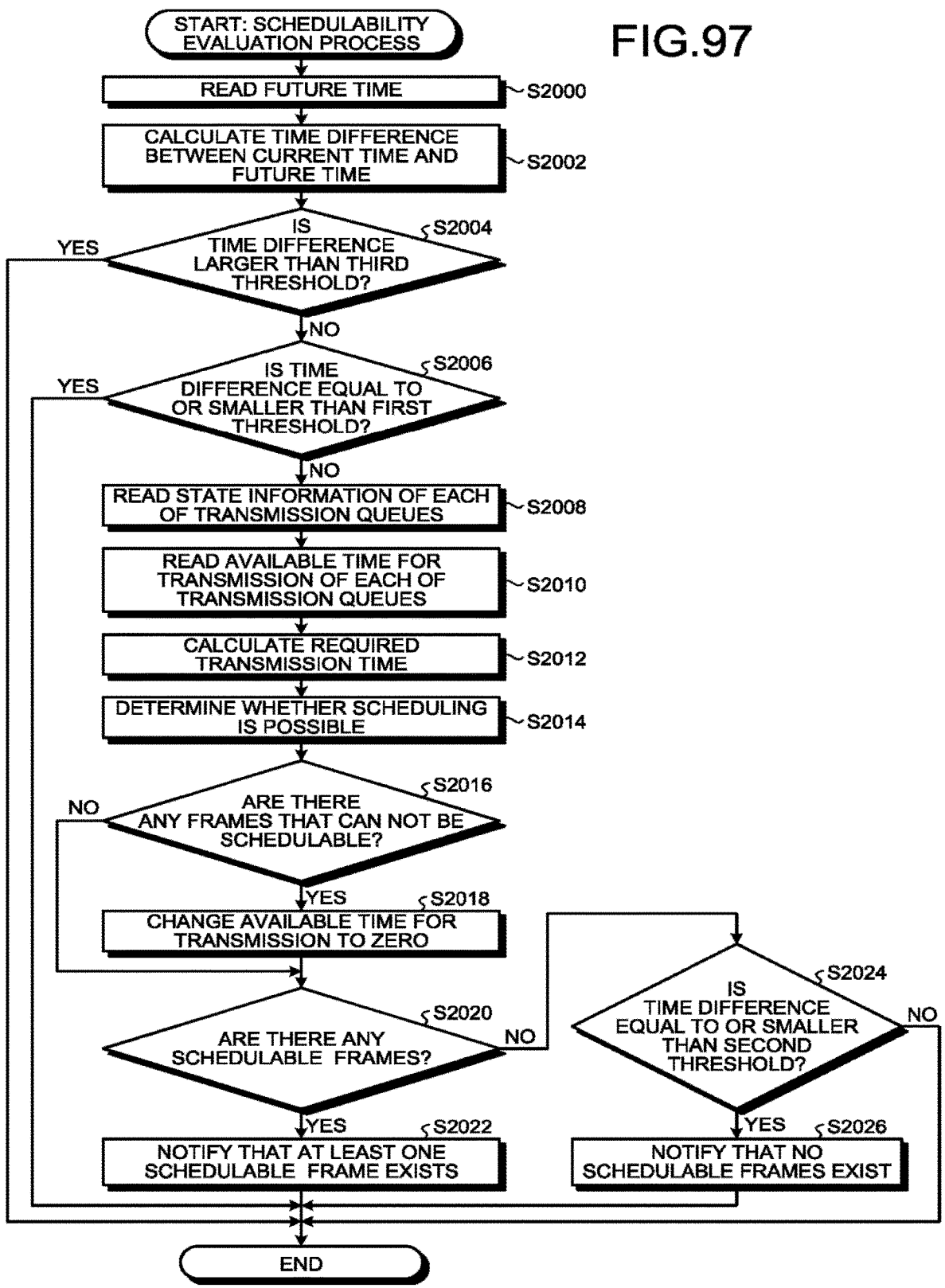
FIG. 97 is a detailed flowchart of schedulability evaluation process according to the fourth embodiment.

FIG. 97 is a detailed flowchart of schedulability evaluation process according to the fourth embodiment. Step S2000 and Step S2002 are the same as Step S1500 and Step S1502 of FIG. 87 illustrating the schedulability evaluation process according to the third embodiment, and an explanation thereof is omitted.

After Step S1502, the schedulability evaluation unit 22-4 compares the third threshold th3 notified from the threshold calculation unit 42-4 with the time difference td, and determines whether the time difference td is more than the third threshold th3 (Step S2004). When the time difference td is more than the third threshold th3 (Yes at Step S2004), the present routine is ended.

By contrast, when the time difference td is equal to or less than the third threshold th3 (No at Step S2004), the schedulability evaluation unit 22-4 performs Step S2006 to Step S2026. Step S2006 to Step S2026 are the same as Step S1504 to Step S1524 in FIG. 87 illustrating the schedulability evaluation process according to the third embodiment, and an explanation thereof is omitted.

Second Post Processing

Figure 98:
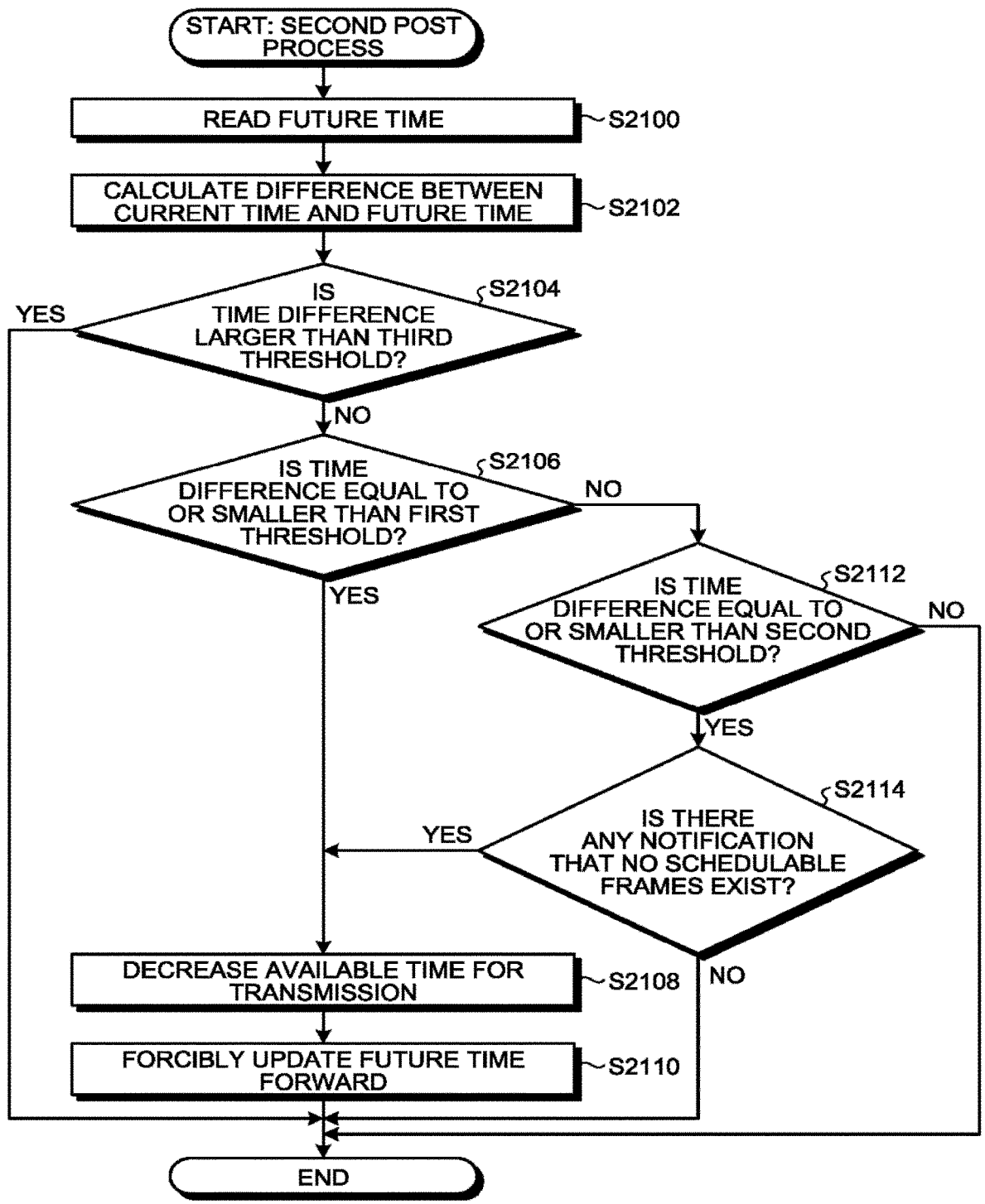
FIG. 98 is a detailed flowchart of second post processing according to the fourth embodiment.

FIG. 98 is a detailed flowchart of second post processing according to the fourth embodiment. Step S2100 and Step S2102 are the same as Step S1600 and Step S1602 included in the second post processing according to the third embodiment, and an explanation thereof is omitted.

After Step S1602, the schedulability evaluation unit 22-4 compares the third threshold th3 notified from the threshold calculation unit 42-4 with the time difference td, and determines whether the time difference td is more than the third threshold th3 (Step S2104). When the time difference td is more than the third threshold th3 (Yes at Step S2104), the present routine is ended.

By contrast, when the time difference td is equal to or less than the third threshold th3 (No at Step S2104), the prefetch notification unit 24-4 performs Step S2106 to Step S2114. Because Step S2106 to Step S2114 are the same as Step S1604 to Step S1612 included in the second post processing according to the third embodiment, an explanation thereof is omitted.

Figure 99:
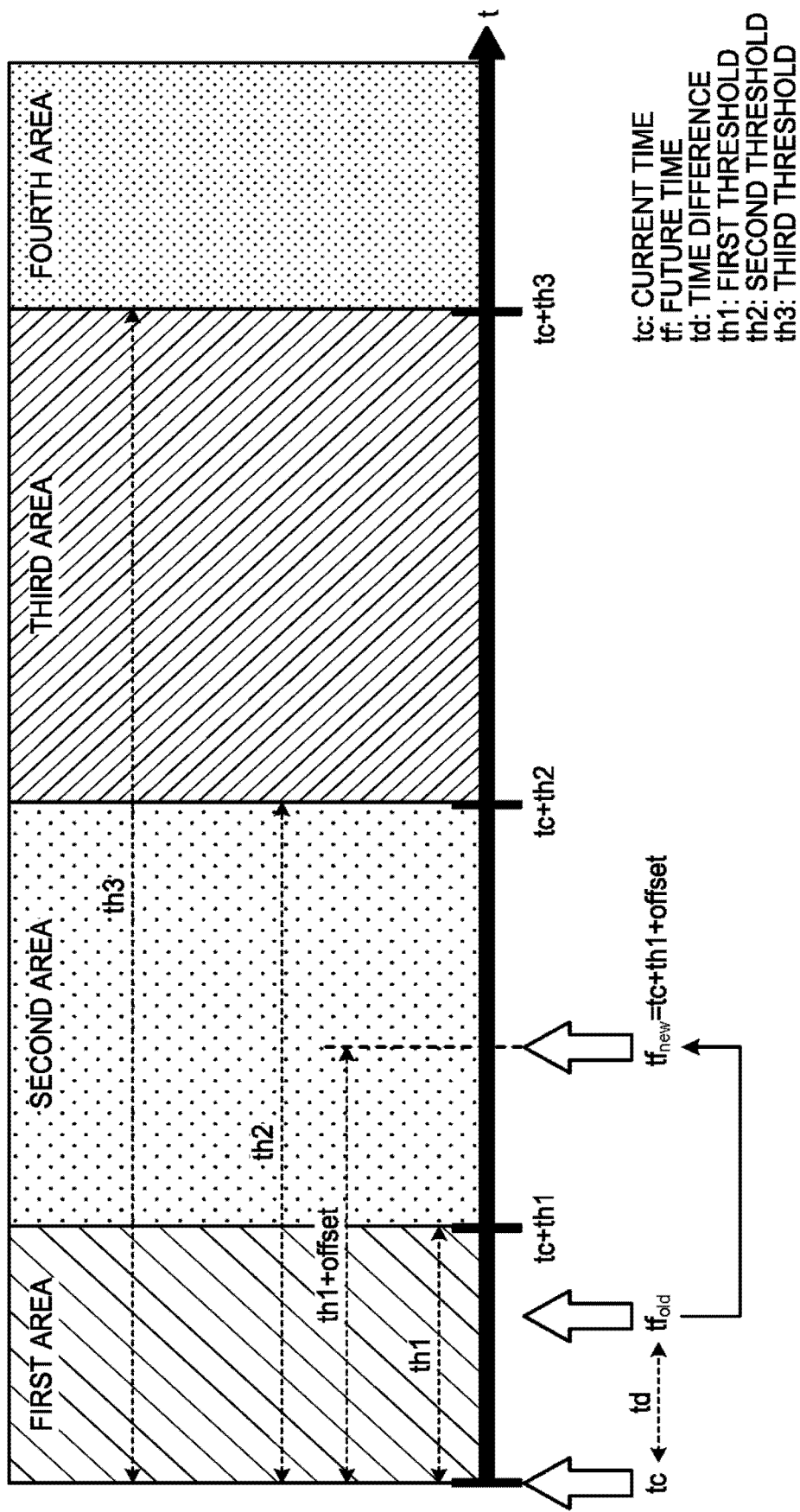
FIG. 99 is a diagram illustrating an example of updated future time.
Figure 100:
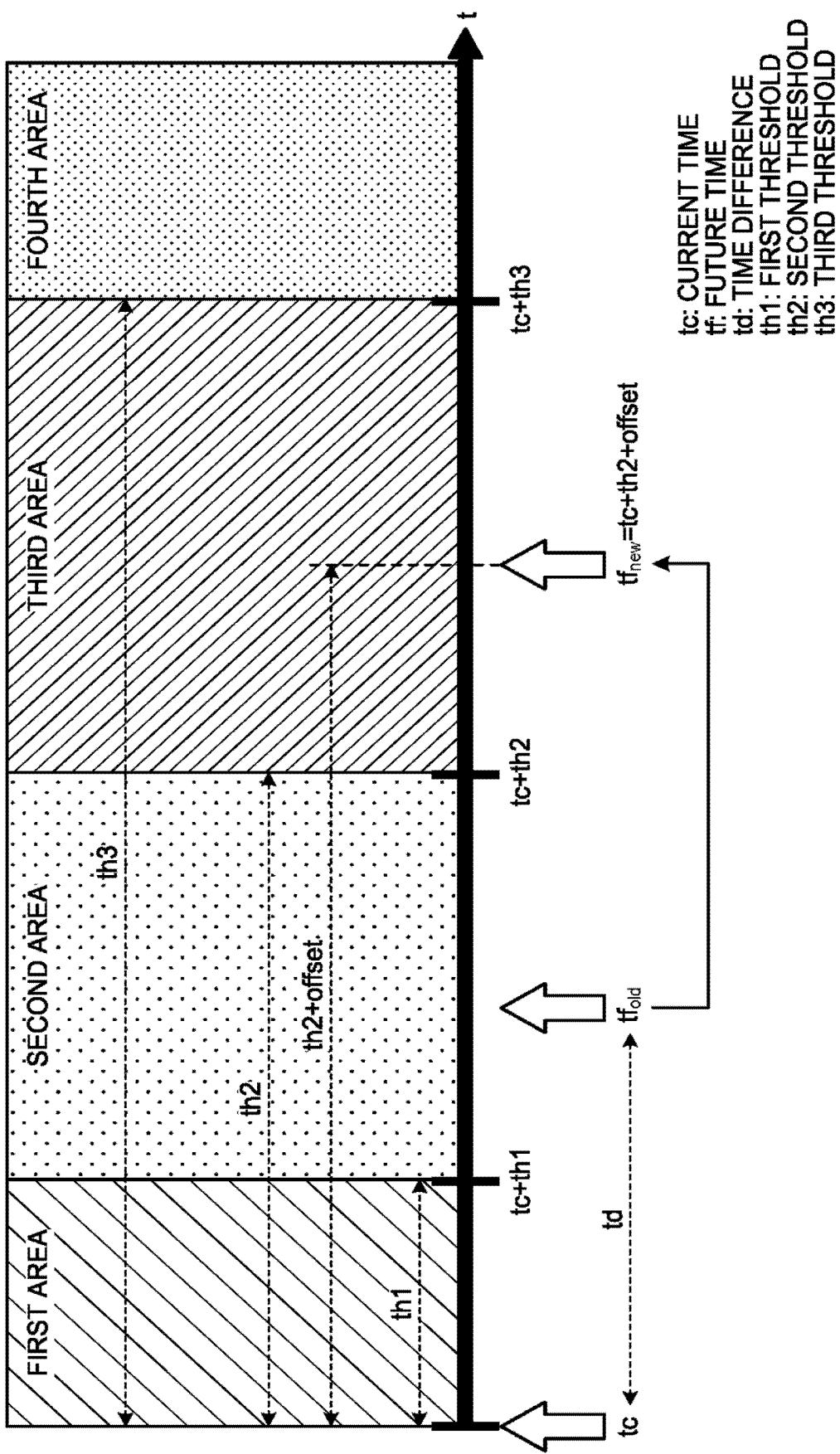
FIG. 100 is a diagram illustrating an example of updated future time.

FIG. 99 and FIG. 100 are diagrams illustrating examples of the future time updated with the prefetch notification unit 24-4 according to the third embodiment. FIG. 99 illustrates an update example in the case of "td≤th1". FIG. 100 illustrates an update example in the case of "th1<td≤th2".

SUMMARY

In the second embodiment, two dealing patterns (first area and second area) are defined, as illustrated in FIG. 77. In the third embodiment, three dealing patterns (first area, second area, and third area) are defined, as illustrated in FIG. 86. In the fourth embodiment, four dealing patterns (first area, second area, third area, and fourth area) are defined, as illustrated in FIG. 96 (FIG. 99, FIG. 100). In each of the areas in FIG. 96, for example, the processing is controlled as follows.

For example, when the future time tf falls within the range of the first area, the available time for transmission of each of the transmission queues is decreased, and the future time tf is forcibly advanced. In addition, for example, when the future time tf falls within the range of the first area, schedulability evaluation process performed with the schedulability evaluation unit is suspended.

For example, when the future time tf falls within the range of the second area, it is checked whether there is at least one schedulable frame. When there are schedulable frames, schedulability evaluation process with the schedulability evaluation unit is allowed. When there are no schedulable frames, the available time for transmission of each of the transmission queues is decreased, and the future time tf is forcibly advanced. When there are no schedulable frames, schedulability evaluation process with the schedulability evaluation unit is suspended.

For example, when the future time tf falls within the range of the third area, schedulability evaluation process with the schedulability evaluation unit is allowed.

For example, when the future time tf falls within the range of the fourth area, schedulability evaluation process with the schedulability evaluation unit is suspended.

For example, when the future time tf falls within the range of the first area or the second area, the timing at which the prefetch unit performs prefetching can be indirectly controlled by decreasing the available time for transmission of each of the transmission queues. This is because, for example, when all the available time for transmission assigned to the respective transmission queues are zero, a prefetching instruction is transmitted to the prefetch unit 20, that is, decrease in available time for transmission triggers a prefetching instruction, as described above.

For example, when the future time tf falls within the range of the first area or the fourth area, the timing at which the scheduler unit performs scheduling can be indirectly controlled by suspending schedulability evaluation process performed with the schedulability evaluation unit. This is because the scheduler unit performs scheduling in linkage with notification from the schedulability evaluation unit, as described above.

As described above with specific example, the information processing apparatuses according to the second to the fourth embodiments are capable of controlling the prefetching timing and the scheduling timing based on a result of comparison between the time difference between the future time and the current time and one or two or more thresholds. In addition, the information processing apparatuses dynamically updates the thresholds, and can flexibly deal with task scheduling of the operating system changing according to environment and change in delay of the bus.

Accordingly, the information processing apparatuses according to the second to the fourth embodiments enable improvement in a robust property with respect to change in processing time. Specifically, the information processing apparatuses according to the second to the fourth embodiments enhance timing accuracy of dynamic scheduling process based on transmission scheduling information, by virtue of improvement in a robust property, and consequently enable more timely transmission of frames requiring real-time performance.

At least part of the thresholds determining the individual areas is not necessarily calculated or updated dynamically. For example, at least part of the thresholds may be set as a fixed value determined statically in advance by any method. Even when a fixed threshold is used, as long as a proper value is set, the prefetching timing and the scheduling timing can be controlled with certain accuracy. To determine an optimum structure, for example, the structure should be determined in consideration of trade-off between the required accuracy of the application and the design and the implementation cost, and the like.

The embodiments described above have been presented as examples, and are not intended to limit the number of thresholds to be updated statically or dynamically to three (the first threshold th1, the second threshold th2, and the third threshold th3). In addition, the embodiments described above are presented as examples, and are not intended to limit the dealing patterns to two to four (the first area, the second area, the third area, and the fourth area). For example, the structure may have the form in which three dealing patterns (corresponding to the first area, the third area, and the fourth area) are defined using two thresholds corresponding to the first threshold th1 and the third threshold th3.

In addition, in the case of dynamically calculating the threshold, there may be the cases where relation in value between the thresholds is not relation (for example, first threshold th1<second threshold th2<third threshold) to enable definition of the dealing patterns described above. In such cases, the thresholds may be regulated to values to define any of the dealing patterns described above. For example, the third embodiment may have the structure in which, when the first threshold th1 is more than the second threshold th2, the second threshold th2 and the first threshold th1 are regulated to have the same value, to perform processing in accordance with the second embodiment using the first area and the second area.

As explained in each of the second embodiment, the third embodiment, and the fourth embodiment, the new embodiment may be carried out in other various forms, and may be provided with addition of a new threshold and a new dealing pattern, change in method for calculating the thresholds, and/or change in method for calculating the decrease value of the available time for transmission, within the range not departing from the gist of the invention.

Figure 101:
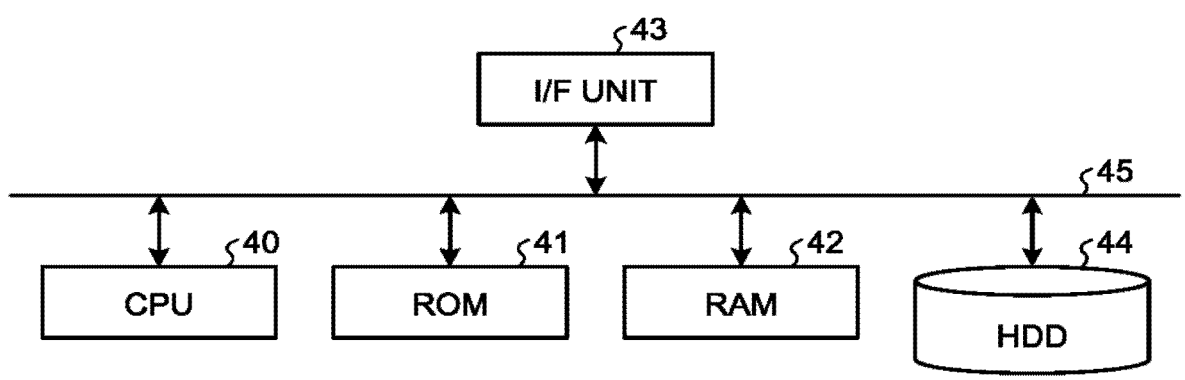
FIG. 101 is a hardware configuration diagram.

The following is an explanation of an example of a hardware configuration of the information processing apparatus 10 according to the present embodiment. FIG. 101 is an example of a hardware configuration diagram of the information processing apparatus 10 according to the present embodiment.

The information processing apparatus 10 according to the present embodiment includes a control device, such as a CPU 40, storage devices, such as a Read Only Memory (ROM) 41, a Random Access Memory (RAM) 42, and a hard disk drive (HDD) 44, an I/F unit 43 serving as an interface with the various devices, and a bus 45 connecting the units, and has a hardware configuration using an ordinary computer.

In the information processing apparatus 10 according to the present embodiment, the CPU 40 reads a computer program from the ROM 41 onto the RAM 42, and executes the program, to achieve the units described above on the computer.

The program executed with the information processing apparatus 10 according to the present embodiment to perform the processes described above may be stored in the HDD 44. As another example, the program executed with the information processing apparatus 10 according to the present embodiment to perform the processes described above may be incorporated in advance in the ROM 41 to be provided.

The program executed with the information processing apparatus 10 according to the present embodiment to perform the processes described above may also be stored in a computer-readable storage medium, such as a CD-ROM, a CD-R, a memory card, a digital versatile disc (DVD), and a flexible disk (FD), as a file of the form that can be installed or executed, to be provided as a computer program product. The program executed with the information processing apparatus 10 according to the present embodiment to perform the processes described above may also be stored on a computer connected to a network, such as the Internet, and provided by being downloaded through the network. The program executed with the information processing apparatus 10 according to the present embodiment to perform the processes described above may also be provided or distributed through a network, such as the Internet.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing apparatus comprising:
one or more processors configured to:
perform a prefetching process that prefetches a scheduling entry corresponding a future time period in advance from scheduling information including one or more scheduling entries, each entry of which at least contains a transmission state and an interval for each of one or more transmission queues; and
perform a scheduling process that determines a starting time of transmission for one or more frames waiting for transmission in each queue, based on the scheduling entry, wherein
at least one of timing of the prefetching process and timing of the scheduling process is determined, based on a result of comparison of a time difference and one or more thresholds, where the time difference is a difference between current time and future time, the future time being a candidate for starting time of transmission, and
the processors are configured to:
evaluate each frame waiting for transmission in each queue and determine one or more schedulable frames, when the time difference is more than a first threshold, and the time difference is not more than a third threshold, wherein the first threshold is equal to or less than the third threshold,
perform no evaluation to determine one or more schedulable frames, when the time difference is equal to or less than the first threshold, or the time difference is more than the third threshold, and
schedule the starting time of transmission of the one or more schedulable frames.

2. The apparatus according to claim 1, wherein the processors are configured to:
measure elapsed time of at least any part of the prefetching process, the scheduling process, schedulability evaluation process, and transmission of the one or more frames that are scheduled; and
calculate the thresholds based on the elapsed time.

3. The apparatus according to claim 1, the processors are configured to start transmission of the one or more frames, based on the starting time of transmission of each frame.

4. An information processing apparatus comprising:
one or more processors configured to:
perform a prefetching process that prefetches a scheduling entry corresponding a future time period in advance from scheduling information including one or more scheduling entries, each entry of which at least contains a transmission state and an interval for each of one or more transmission queues; and
perform a scheduling process that determines a starting time of transmission for one or more frames waiting for transmission in each queue, based on the scheduling entry, wherein
at least one of timing of the prefetching process and timing of the scheduling process is determined, based on a result of comparison of a time difference and one or more thresholds, where the time difference is a difference between current time and future time, the future time being a candidate for starting time of transmission, and
the processors are configured to:
trigger prefetching next entry from the scheduling information, based on an available time for transmission for each and every queue at the future time, and decrease the available time for transmission, when the tune difference is equal to or less than the first threshold.

5. The apparatus according to claim 4, wherein the processors are configured to decrease the available time for transmission based on at least any combination of the current time, the future time, the thresholds and an offset value.

6. The apparatus according to claim 4, wherein the processors are configured to:
evaluate each frame waiting for transmission in each queue and determine one or more schedulable frames, when the time difference is more than the first threshold,
schedule the starting time of transmission of the one or more schedulable frames, and
decrease the available time for transmission, when o schedulable frames exist, and when the time difference is more than the first threshold, and the time difference is not more than a second threshold, where the first threshold is equal to or less than the second threshold.

7. An information processing apparatus comprising:
one or more processors configured to:
perform a prefetching process that prefetches a scheduling entry corresponding a future time period in advance from scheduling information including one or more scheduling entries, each entry of which at least contains a transmission state and an interval for each of one or more transmission queues; and
perform a scheduling process that determines a starting time of transmission for one or more frames waiting for transmission in each queue, based on the scheduling entry, wherein
at least one of timing of the prefetching process and timing of the scheduling process is determined, based on a result of comparison of a time difference and one or more thresholds, where the time difference is a difference between current time and future time, the future time being a candidate for starting time of transmission, and
the processors are configured to update the future time forward, when e time difference is equal to or less than the thresholds.

8. The apparatus according to claim 7, wherein the processors are configured to update the future time, based on at least any combination of the current time, the future time, the thresholds, and an offset value.

9. An information processing method comprising:
performing a prefetching process that prefetches a scheduling entry corresponding a future time period in advance from scheduling information including one or more scheduling entries, each entry of which at least contains a transmission state and an interval for each of one or more transmission queues; and performing a scheduling process that determines a starting time of transmission for one Or more frames waiting for transmission in each queue, based on the scheduling entry, wherein at least one of timing of the prefetching process and timing of the scheduling process is determined, based on a result of comparison of a time difference and one or more thresholds, where the time difference is a difference between current time and future time, the future time being a candidate for starting time of transmission, and the information processing method further comprising:
performing an evaluating process
that evaluates each frame waiting for transmission in each queue and determine one or more schedulable frames, when the time difference is more than a first threshold, and the time difference is not more than a third threshold, wherein the first threshold is equal to or less than the third threshold, and
that performs no evaluation to determine one or more schedulable frames, when the time difference is equal to or less than the first threshold, or the time difference is more than the third threshold wherein
the scheduling process includes a scheduling the starting time of transmission of the one or more schedulable frames.

10. A non-transitory computer-readable medium including programmed instructions, the instructions causing a computer to execute:

performing a prefetching process that prefetches a scheduling entry corresponding a future time period in advance from scheduling information including one or more scheduling entries, each entry of which at least contains a transmission state and an interval for each of one or more transmission queues; and performing a scheduling process that determines a starting time of transmission for one or more frames waiting for transmission in each queue, based on the scheduling entry, wherein at least one of timing of the prefetching process and timing of the scheduling process is determined, based on a result of comparison of a time difference and one or more thresholds, where the time difference is a difference between current time and future time, the future time being a candidate for starting time of transmission, and the instructions causing a computer to further execute:
performing an evaluating process
that evaluates each frame waiting for transmission in each queue and determine one or more schedulable frames, when the time difference is more than a first threshold, and the time difference is not more than a third threshold, wherein the first threshold is equal to or less than the third threshold, and
that performs no evaluation to determine one or more schedulable frames, when the time difference is equal to or less than the first threshold, or the time difference is more than the third threshold, wherein
the scheduling process includes a scheduling the starting time of transmission of the one or more schedulable frames.

11. An information processing method comprising:
performing a prefetching process that prefetches a scheduling entry corresponding a future time period in advance from scheduling information including one or more scheduling entries, each entry of which at least contains a transmission state and an interval for each of one or more transmission queues; and performing a scheduling process that determines a starting time of transmission for one or more frames waiting for transmission in each queue, based on the scheduling entry, wherein at least one of timing of the prefetching process and timing of the scheduling process is determined, based on a result of comparison of a time difference and one or more thresholds, wherein the time difference is a difference between current time and future time, the future time being a candidate for starting time of transmission, and the information processing method further comprising:
performing a notifying process that triggers prefetching next entry from the scheduling information, based on an available time for transmission for each and every queue at the future time, and decreases the available time for transmission, when the time difference is equal to or less than the first threshold.

12. An information processing method comprising:
performing a prefetching process that prefetches a scheduling entry corresponding a future time period in advance from scheduling information including one or more scheduling entries, each entry of which at least contains a transmission state and an interval for each of one or more transmission queues; and performing a scheduling process that determines a starting time of transmission for one or more frames waiting for transmission in each queue, based on the scheduling entry, wherein at least one of timing of the prefetching process and timing of the scheduling process is determined, based on a result of comparison of a time difference and one or more thresholds, wherein the time difference is a difference between current time and future time, the future time being a candidate for starting time of transmission, and the information processing method further comprising:
performing an updating process that updates the future time forward, when the time difference is equal to or less than the thresholds.

13. A non-transitory computer-readable medium including programmed instructions, the instructions causing a computer to execute:

performing a prefetching process that prefetches a scheduling entry corresponding a future time period in advance from scheduling information including one or more scheduling entries; each entry of which at least contains a transmission state and an interval for each of one or more transmission queues; and performing a scheduling process that determines a starting time of transmission for one or more frames waiting for transmission in each queue, based on the scheduling entry, wherein at least one of timing of the prefetching process and timing of the scheduling process is determined, based on a result of comparison of a time difference and one or more thresholds, wherein the time difference is a difference between current time and future time, the future time being a candidate for starting time of transmission, and the instructions causing a computer to further execute:
performing a notifying process that triggers prefetching next entry from the scheduling information, based on an available time for transmission for each and every queue at the future time, and decreases the available time for transmission, when the time difference is equal to or less than the first threshold.

14. A non-transitory computer-readable medium including programmed instructions, the instructions causing a computer to execute:
  performing a prefetching process that prefetches a scheduling entry corresponding a future time period in advance from scheduling information including one or more scheduling entries, each entry of which at least contains a transmission state and an interval for each of one or more transmission queues; and
  performing a scheduling process that determines a starting time of transmission for one or more frames waiting for transmission in each queue, based on the scheduling entry, wherein
  at least one of timing of the prefetching process and timing of the scheduling process is determined, based on a result of comparison of a time difference and one or more thresholds, wherein the time difference is a difference between current time and future time, the future time being a candidate for starting time of transmission, and
  the instructions causing a computer to further execute:
    performing an updating process that updates the future time forward, when the time difference is equal to or less than the thresholds.

\* \* \* \* \*